(12) United States Patent
Smolov et al.

(10) Patent No.: US 12,054,085 B2
(45) Date of Patent: Aug. 6, 2024

(54) COMMERCIAL VEHICLE LOADING AND UNLOADING SYSTEMS AND ASSOCIATED SYSTEMS, DEVICES, AND METHODS

(71) Applicant: Node Systems Inc., Los Angeles, CA (US)

(72) Inventors: Ilia Smolov, Los Angeles, CA (US); Ryan Kemmet, Los Angeles, CA (US); Chris Marion, Los Angeles, CA (US)

(73) Assignee: Node Systems Inc., Los Angeles, CA (US)

( * ) Notice: Subject to any disclaimer, the term of this patent is extended or adjusted under 35 U.S.C. 154(b) by 0 days.

(21) Appl. No.: 18/248,226

(22) PCT Filed: Nov. 10, 2022

(86) PCT No.: PCT/US2022/049573
§ 371 (c)(1),
(2) Date: Apr. 6, 2023

(87) PCT Pub. No.: WO2023/086488
PCT Pub. Date: May 19, 2023

(65) Prior Publication Data
US 2023/0271540 A1    Aug. 31, 2023

Related U.S. Application Data

(60) Provisional application No. 63/278,008, filed on Nov. 10, 2021, provisional application No. 63/335,205, filed on Apr. 26, 2022.

(51) Int. Cl.
*B60P 1/02* (2006.01)
*B60P 1/44* (2006.01)
(Continued)

(52) U.S. Cl.
CPC ............. *B60P 1/022* (2013.01); *B60P 1/4421* (2013.01); *B60P 1/52* (2013.01); *E05F 15/00* (2013.01); *E05Y 2900/516* (2013.01)

(58) Field of Classification Search
CPC ........... B60P 1/022; B60P 1/4421; B60P 1/52; B66F 9/10
(Continued)

(56) References Cited

U.S. PATENT DOCUMENTS 2,432,182 A * 12/1947 Turner .................... B66F 9/195
 414/498
2,635,771 A    4/1953 Black
(Continued)

FOREIGN PATENT DOCUMENTS

AU     2008319162      6/2012
EP     1516779 A2 *   3/2005  ............ B60P 1/4421
(Continued)

OTHER PUBLICATIONS

AliBaba.com "Vehicle Truck Loading Unloading Cargo Steel Aluminum Hydraulic Loading Tail Gate Lift" https://www.alibaba.com/product-detail/Vehicle-truck-loading-unloading-cargo-steel_1600066998367.html Mar. 9, 2023, 8 pages.
(Continued)

*Primary Examiner* — James Keenan
(74) *Attorney, Agent, or Firm* — Perkins Coie LLP

(57) ABSTRACT

The present disclosure is directed to commercial vehicle loading and unloading systems, and associated systems, devices, and methods. In one embodiment, a cargo loading and unloading system includes a cargo loading and unloading assembly and/or a cargo repositioning system. The assembly includes a first mechanical arm and a second mechanical arm that are mountable at opposite sides of an opening of the trailer. Each mechanical arm includes a first
(Continued)

portion and a second portion pivotally coupled to the first portion. The first portions are configured to vertically raise and lower the second portions and move the second portions laterally along the opening of the trailer. The second portions include rollers and are configured to support cargo on the rollers as the mechanical arms are used to hold the cargo off the ground, and to selectively convey the cargo at least partially into or out of the trailer via the rollers.

20 Claims, 32 Drawing Sheets

(51) Int. Cl.
*B60P 1/52* (2006.01)
*E05F 15/00* (2015.01)

(58) Field of Classification Search
USPC .......................................... 414/544; 198/728
See application file for complete search history.

(56) References Cited

U.S. PATENT DOCUMENTS

| | | | | |
|---|---|---|---|---|
| 2,904,196 | A * | 9/1959 | Teixeira | B60P 1/52 |
| | | | | 193/35 R |
| 2,932,380 | A * | 4/1960 | Alvey, Jr. | B65G 47/268 |
| | | | | 198/300 |
| 2,990,941 | A * | 7/1961 | Peras | B65G 19/225 |
| | | | | 198/732 |
| 3,129,830 | A | 4/1964 | Kappen | |
| 3,448,878 | A * | 6/1969 | Schindler | B60P 1/4421 |
| | | | | 187/244 |
| 3,515,299 | A * | 6/1970 | Esser | B60P 1/52 |
| | | | | 254/2 R |
| 3,545,596 | A * | 12/1970 | Schuette | B65G 19/205 |
| | | | | 198/721 |
| 3,650,376 | A * | 3/1972 | Burgis | B65G 47/268 |
| | | | | 198/721 |
| 3,944,057 | A * | 3/1976 | Schuette | B65G 19/02 |
| | | | | 198/721 |
| 3,961,715 | A * | 6/1976 | Ellen | B60R 5/00 |
| | | | | 296/16 |
| 4,009,792 | A | 3/1977 | Sano et al. | |
| 4,091,946 | A | 5/1978 | Kraeft et al. | |
| 5,067,869 | A * | 11/1991 | Reuss | B60P 3/07 |
| | | | | 414/667 |
| 5,203,668 | A | 4/1993 | Marmur | |
| 5,915,912 | A * | 6/1999 | Parnes | B66F 9/10 |
| | | | | 414/667 |
| 6,077,024 | A | 6/2000 | Trueblood | |
| 6,152,674 | A | 11/2000 | Ogrodnick | |
| 6,564,621 | B1 * | 5/2003 | Keaton | B66F 7/0691 |
| | | | | 73/114.06 |
| 6,817,825 | B1 | 11/2004 | O'Hagen | |
| 9,028,195 | B1 | 5/2015 | Heynssens | |
| 2007/0020076 | A1 | 1/2007 | Heynssens | |
| 2007/0212205 | A1 | 9/2007 | Lowecki | |
| 2008/0279664 | A1 | 11/2008 | Eidsmore | |
| 2011/0202199 | A1 | 8/2011 | Crane | |
| 2013/0101375 | A1 | 4/2013 | Dieziger | |
| 2015/0071749 | A1 | 3/2015 | Hambardzumyan et al. | |
| 2016/0304021 | A1 | 10/2016 | Reinert | |
| 2017/0225602 | A1 | 8/2017 | Corrigan et al. | |
| 2021/0039543 | A1 | 2/2021 | Walker et al. | |
| 2022/0009731 | A1 | 1/2022 | Haid | |
| 2022/0219900 | A1 | 7/2022 | Eidsmore | |
| 2022/0281729 | A1 * | 9/2022 | Tsuruta | B66F 9/10 |
| 2022/0379792 | A1 * | 12/2022 | Wehner | B66F 9/195 |

FOREIGN PATENT DOCUMENTS

NL 1019803 C2 7/2003
WO 2022/146447 7/2022

OTHER PUBLICATIONS

International Search Report and Written Opinion for PCT/US2022/049573, dated Mar. 29, 2023, 22 pages.

* cited by examiner

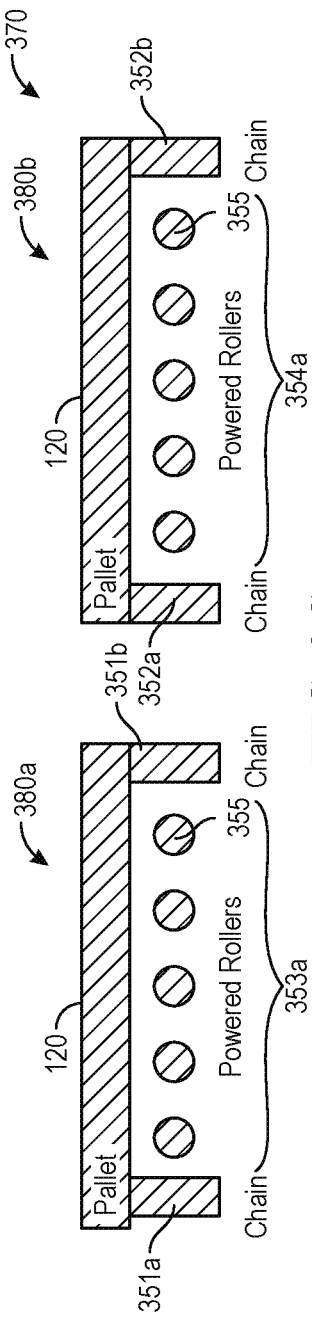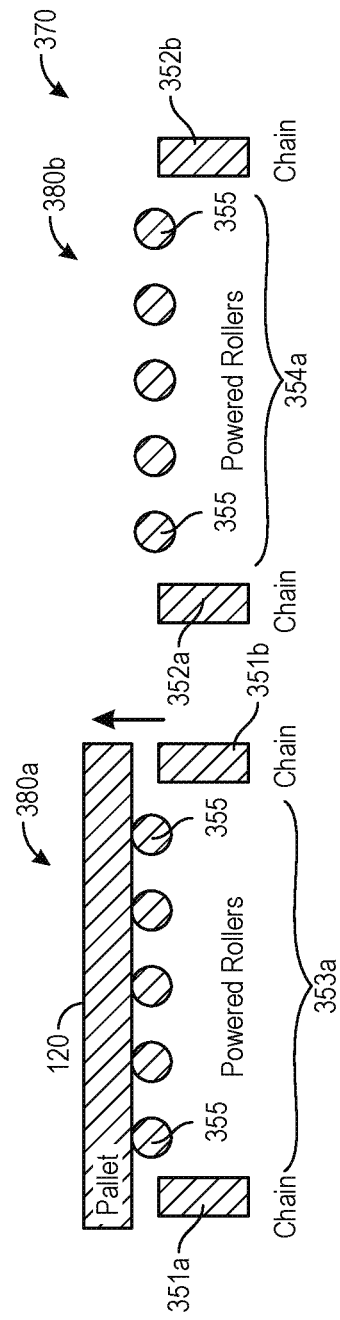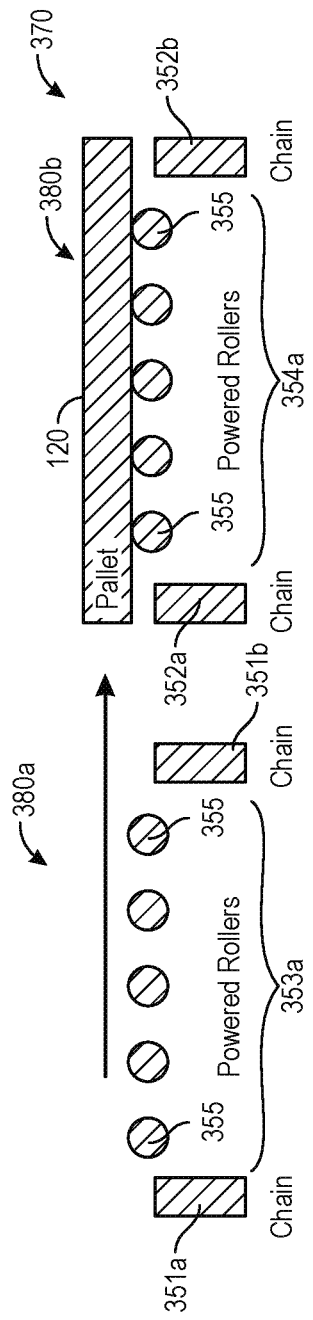

COMMERCIAL VEHICLE LOADING AND UNLOADING SYSTEMS AND ASSOCIATED SYSTEMS, DEVICES, AND METHODS

CROSS-REFERENCE TO RELATED APPLICATION(S)

The present application is a 371 National Phase Application of PCT/US2022/049573 filed Nov. 10, 2022, which claims the benefit of U.S. Provisional Patent Application No. 63/278,008, filed Nov. 10, 2021, and U.S. Provisional Patent Application No. 63/335,205, filed Apr. 26, 2022, all of which are incorporated by reference herein in their entireties.

TECHNICAL FIELD

The present disclosure relates generally to commercial vehicle loading and unloading systems and associated systems, devices, and methods. For example, embodiments of the present technology relate to manual and/or automated systems that can be used to load, store, and/or unload pallets of cargo into and/or out of an autonomous, semi-autonomous, or human-driven commercial truck, trailer, van, or other similar vehicle.

BACKGROUND

The trucking industry serves an essential function of an economy's supply chain by transporting goods and other materials over land, typically from a port or warehouse to either retail distribution centers or consumers' residential addresses. Commonly specialty equipment, such as forklifts and docks, are used to load and unload commercial shipping vehicles. In addition, the load and unload processes often require human supervision and/or intervention. Furthermore, cargo is often loaded onto commercial shipping vehicles in a particular order that aligns with an order in which the cargo is to be unloaded from the commercial shipping vehicles such that the amount of unloading and/or handling of cargo prior to its shipping destination is minimized. Thus, any change in the delivery or unloading order can require temporarily unloading several pieces of cargo from a commercial shipping vehicle simply to unload or deliver a piece of cargo that is not readily accessible in the commercial shipping vehicle.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments shown, but are provided for explanation and understanding.

FIGS. 3A-3E are partially schematic views of a carousel system of the commercial vehicle loading and unloading system of FIG. 1.

DETAILED DESCRIPTION

Figure 1:
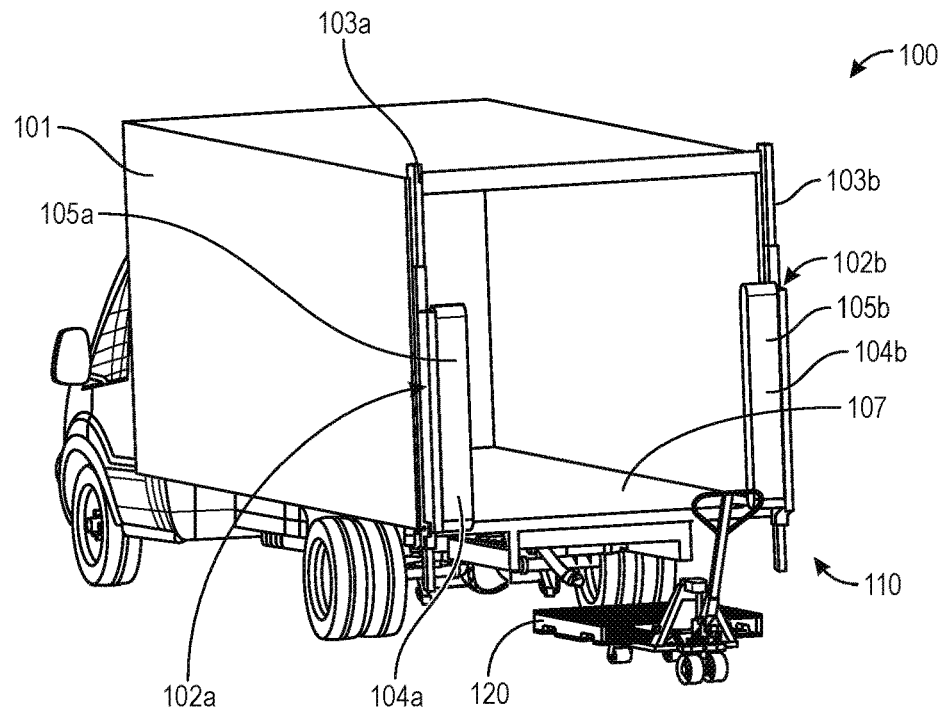
FIG. 1 is a partially schematic perspective view of a commercial vehicle loading and unloading system configured in accordance with various embodiments of the present technology.

The following disclosure describes vehicle loading, storing, and/or unloading systems, and associated systems, devices, and methods. For the sake of clarity and understanding, embodiments of the present technology are discussed in detail below with respect to commercial shipping vehicles (e.g., small moving trucks, shipping vans, semi-trucks, trailers, etc.) loading and/or unloading pallets (and cargo stored thereon). A person of ordinary skill in the art will readily appreciate, however, that other vehicles or structures (e.g., personal, recreational, civilian, etc.) can be used with the systems, devices, methods, and computer-readable mediums of the present technology described herein.

A. Overview

The supply chain industry is approximately a $1.6 trillion industry in which there is a labor and warehouse space shortage despite continual growth of gross domestic product. In addition, specialty equipment (e.g., forklifts and docks) and human supervision and/or intervention are often needed to load and unload many shipping vehicles, but these resources are commonly only available at specific locations. As a result, the cost to (a) ship goods and/or (b) store goods in warehouses continues to spike. Indeed, warehouse rents commonly grow at approximately 15% of inflation. Furthermore, cargo is often loaded onto commercial shipping vehicles in a particular order that aligns with an order in which the cargo is to be unloaded from the commercial shipping vehicles such that the amount of unloading and/or handling of cargo prior to its shipping destination is minimized. Thus, any change in the delivery or unloading order can require temporarily unloading several pieces of cargo from a commercial shipping vehicle simply to unload or deliver a piece of cargo that is not readily accessible in the commercial shipping vehicle.

To address these concerns, commercial vehicle loading and unloading systems (and associated systems, devices, methods, and computer-readable medium) configured in accordance with the present technology integrate mechanical arms onto commercial shipping vehicles and/or associated trailers. The mechanical arms facilitate loading and/or unloading cargo (e.g., pallets, freight, goods, items, etc.) (a) into and/or out of the bed of a trailer and/or commercial vehicle, and/or (b) from another trailer and/or commercial vehicle. As such, the mechanical arms can obviate the use of forklifts, loading docks, or other specialty equipment. In some embodiments, the loading, unloading, transferring, and/or shipping (e.g., driving) procedures can be automated (e.g., performed without human supervision or intervention).

In these and other embodiments, the beds of the trailers and/or the commercial vehicles can include treads, tracks, or carousel-like units to facilitate (a) conveying cargo into or out of the beds, and/or (b) repositioning the cargo within the beds. As a result, systems of the present technology can dynamically respond to changes in the order in which cargo is loaded into and/or unloaded from the trailers or commercial vehicles. In these and still other embodiments, the trailers and/or the commercial vehicles can function as an intermediary or temporary warehouse, thereby alleviating the warehouse shortage and significantly reducing the cost of shipping and/or warehousing goods.

Certain details are set forth in the following description of FIGS. 1-9C to provide a thorough understanding of various embodiments of the present technology. However, other details describing well-known structures and systems often associated with loading and unloading systems and associated systems, devices, methods, and computer-readable mediums are not set forth below to avoid unnecessarily obscuring the description of various embodiments of the technology.

Many of the details, dimensions, angles, and other features shown in FIGS. 1-9C are merely illustrative of particular embodiments of the technology. Accordingly, other embodiments can have other details, dimensions, angles, and features without departing from the spirit or scope of the present technology. In addition, those of ordinary skill in the art will appreciate that further embodiments of the technology can be practiced without several of the details described below.

B. Selected Embodiments of Commercial Vehicle Loading and Unloading Systems, and Associated Systems, Devices, and Methods FIG. 1 illustrates a commercial vehicle loading and unloading system 100 ("the system 100") configured in accordance with various embodiments of the present technology. The system 100 includes a commercial vehicle 101 having a trailer loading and unloading assembly 110 ("the assembly 110") mounted proximate an opening of a trailer 107 (e.g., bed, bay, etc.) of the commercial vehicle 101. In the illustrated embodiment, the commercial vehicle 101 is a van or a small moving truck. In other embodiments, the commercial vehicle 101 can be another type of vehicle (e.g., truck or trailer), such as a semi-truck or semi-trailer.

As shown, the assembly 110 includes a plurality of mechanical arms 102 (identified individually as first mechanical arm 102a and second mechanical arm 102b in FIG. 1) for loading and/or unloading a pallet 120 (and/or cargo stored thereon) or another type of cargo (e.g., individual cases of goods or individual items (e.g., furniture, instruments, etc.)) into and/or out of the trailer 107 of the commercial vehicle 101. Each mechanical arm 102 includes a first portion 103 (shown as first portion 103a and first portion 103b) and a corresponding second portion 104 (shown as second portion 104a and second portion 104b). The second portions 104 are attached at one end to the respective first portions 103 of each mechanical arm 102. As described in greater detail below, each of the first portions 103 are configured to (a) move in a vertical direction to raise and/or lower the corresponding second portion 104, and/or (b) move in a lateral direction to reposition the corresponding second portion 104 along the opening of the trailer 107. In some embodiments, the first portions 103 can include a telescoping or other structure that facilitates lowering or raising the second portions 104 by extending or retracting, respectively, components of the first portions 103.

The second portions 104 are illustrated in a stowed or retracted position in FIG. 1. As described in greater detail below, each of the second portions 104 are configured to pivotably move or articulate away from the corresponding first portions 103 such that they are oriented generally perpendicular to the first portions 103 in an extended or deployed position. (The second portions 104 are illustrated in the extended or deployed position in FIG. 2A.) When deployed, the second portions 104 can be positioned under a pallet 120 or another item to be loaded into or unloaded out of the trailer 107 of the commercial vehicle 101, and can be used to lift or lower the pallet 120 or other item. In some embodiments, the second portions 104 can include rollers 105 (e.g., treads, tracks, etc.) that can be used to convey the pallet 120 or other item onto or off of the second portions 104. Sets of rollers are identified individually in FIG. 1 as rollers 105a and 105b.

As also described in greater detail below, the system 100 can include chains, rollers, and/or other structures (not shown in FIG. 1) within the interior of the trailer 107 of the commercial vehicle 101 that are configured to convey a pallet 120 or another item into and/or out of the trailer 107. For example, the trailer 107 can include a carousel system that can be used to (a) move a pallet 120 or another item into or out of the interior of the trailer 107 and/or (b) reposition the pallet 120 or the other item within the interior of the trailer 107.

The system 100 and/or the assembly 110 can additionally include a door (not shown) at the opening of the trailer 107 to close off access to the interior of the trailer 107. When closed, the door can be positioned between the mechanical arms 102 and the interior of the trailer 107. In some embodiments, the door can at least partially open and close in a generally vertical direction (e.g., in a direction generally parallel with the first portions 103 of the mechanical arms 102). In other embodiments, the door can at least partially open and close in a generally horizontal or lateral direction (e.g., in a direction generally perpendicular to the first portions 103 of the mechanical arms 102). For example, the door can include a first half that can be opened and closed laterally to provide or close off, respectively, access to the left half of the opening of the trailer 107, and a second half that can be opened and closed laterally to provide or close off, respectively access to the right half of the opening of the trailer 107. Additionally, or alternatively, one half or both halves of the door can be used to push against a pallet or other cargo (e.g., to straighten or move the pallet or other cargo in a lateral direction that is generally perpendicular to the first portions 103 of the mechanical arms 102).

In some embodiments, the door can be manually opened and closed (e.g., by an operator or user of the system 100 and/or the assembly 110). In other embodiments, the door can be opened and/or closed using a power opener. For example, the power opener can open and/or closed using hydraulics (e.g., a hydraulically driven rack and pinion system), electronics (e.g., an electric motor, an electrically driven rack and pinion system), or one or more other suitable types of actuator systems (e.g., linear actuators, hydraulic or electric rams, chains and pulleys, etc.). The system 100 and/or the assembly 110 can be configured to open the door (e.g., automatically or in response to an operator's instructions, such as via a press of a hardware or software button) when the system 100 and/or the assembly 110 is powered on, started, or engaged for use. Additionally, or alternatively, the system 100 and/or the assembly 110 can be configured to close the door (e.g., automatically or in response to an operator's instructions, such as via a press of a hardware or software button) when the system 100 and/or the assembly 110 is powered down, idle, or disengaged from use.

Figure 2A:
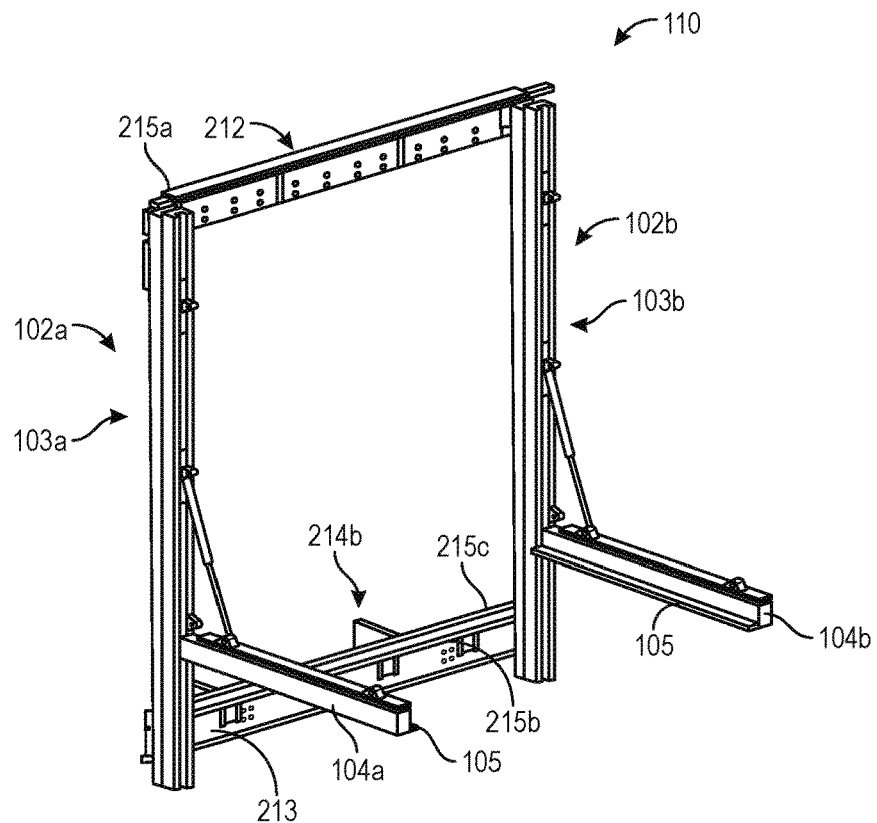
FIGS. 2A-2M are partially schematic views of a trailer loading and unloading assembly of the commercial vehicle loading and unloading system of FIG. 1.
Figure 2B:
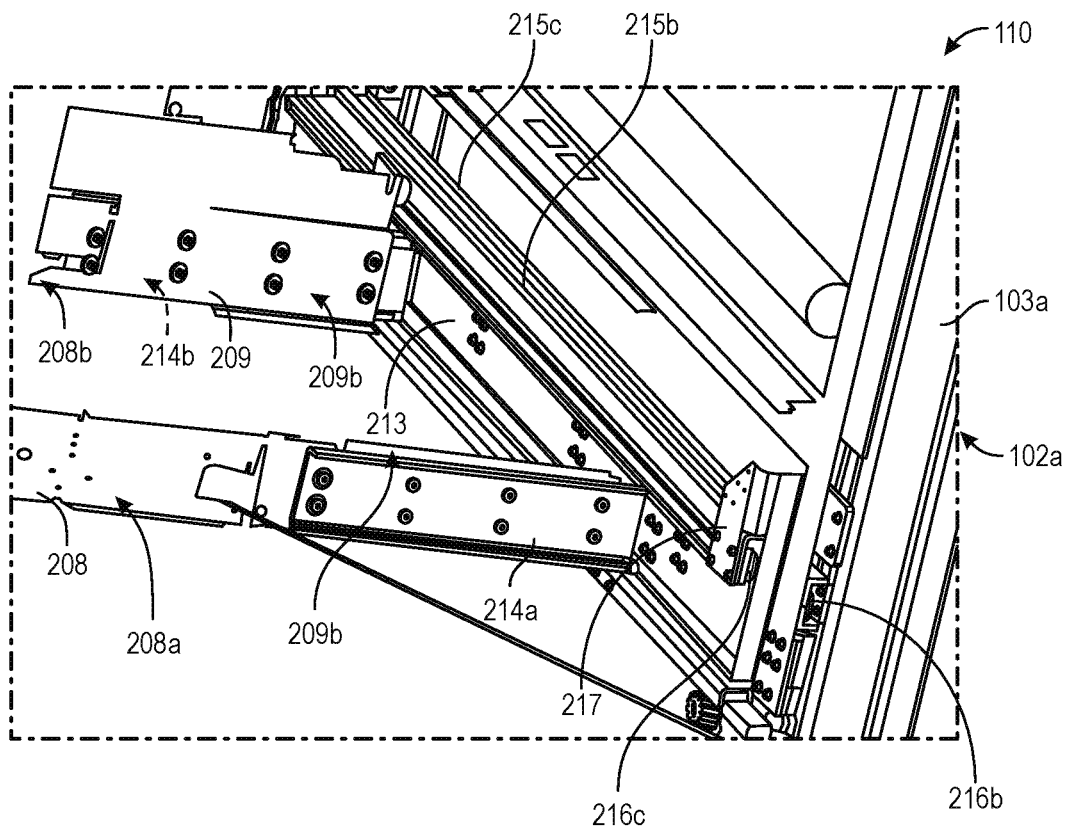
Figure 2C:
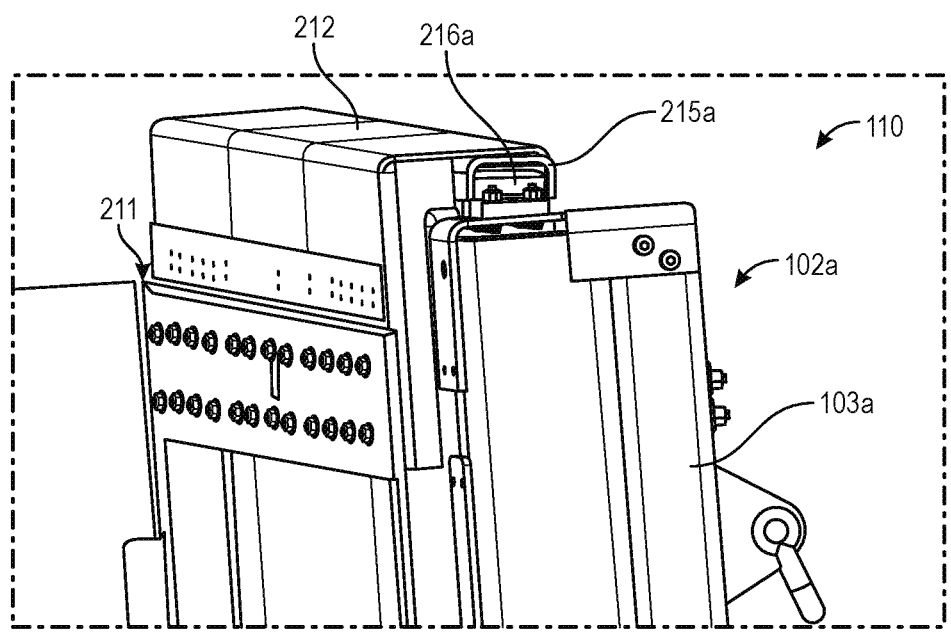

FIGS. 2A-2M provide various partially schematic views of the assembly 110 of FIG. 1. Referring to FIGS. 2A-2C, the assembly 110 includes mounting bracket 212 (FIGS. 2A and 2C) and vehicle frame mounting brackets 213, 214a, and 214b (FIGS. 2A and 2B) that facilitate attachment of the assembly 110 to a commercial vehicle 101 (FIG. 1). More specifically, with reference to FIGS. 2A and 2B, the vehicle frame mounting brackets 213, 214a, and 214b are configured to be attached to a frame of the commercial vehicle 101. For example, the commercial vehicle 101 can include an original equipment manufacturer (OEM) frame 208 installed by the original manufacturer (e.g., Ford Motor Company), and/or the commercial vehicle 101 can include additional frame pieces 209 installed by a secondary manufacturer (e.g., Morgan Truck Body, LLC) that retrofits the commercial vehicle 101 for a specific commercial industry or purpose. Continuing with this example, the vehicle frame mounting brackets 214a and 214b of the assembly 110 are configured to be leveled and attached (e.g., via bolts, welds, etc.) to corresponding portions 208a and 208b of the OEM frame 208 and/or to corresponding portions 209a and 209b of the additional frame pieces 209. Additionally, or alternatively, the vehicle frame mounting bracket 213 can be leveled and attached (e.g., via bolts, welds, etc.) to the end of the OEM frame 208 and/or additional frame pieces 209. In these and other embodiments (as best shown in FIG. 2C), the bracket 212 of the assembly 110 is configured to be attached (e.g., via bolts, welds, etc.) to a top portion 211 of the trailer 107 of the commercial vehicle 101. Together, the mounting brackets 212, 213, 214a, and 214b are configured to mount the assembly 110 to the back of the commercial vehicle 101 and to provide stabilization and support as the assembly 110 is used to load and unload cargo into and/or out of the trailer 107 of the commercial vehicle 101.

With continuing reference to FIGS. 2A-2C, the assembly 110 further includes a plurality of C-channels or guides 215 (identified individually as guide 215a (FIG. 2C) and guides 215b and 215c (FIGS. 2A and 2B)). The guide 215a is attached to the mounting bracket 212 at the top of the assembly 110. In addition, the guides 215a and 215b are positioned back-to-back (e.g., forming an I-beam) and are attached to and/or positioned on top of (e.g., over) the vehicle frame mounting bracket 212.

Figure 2D:
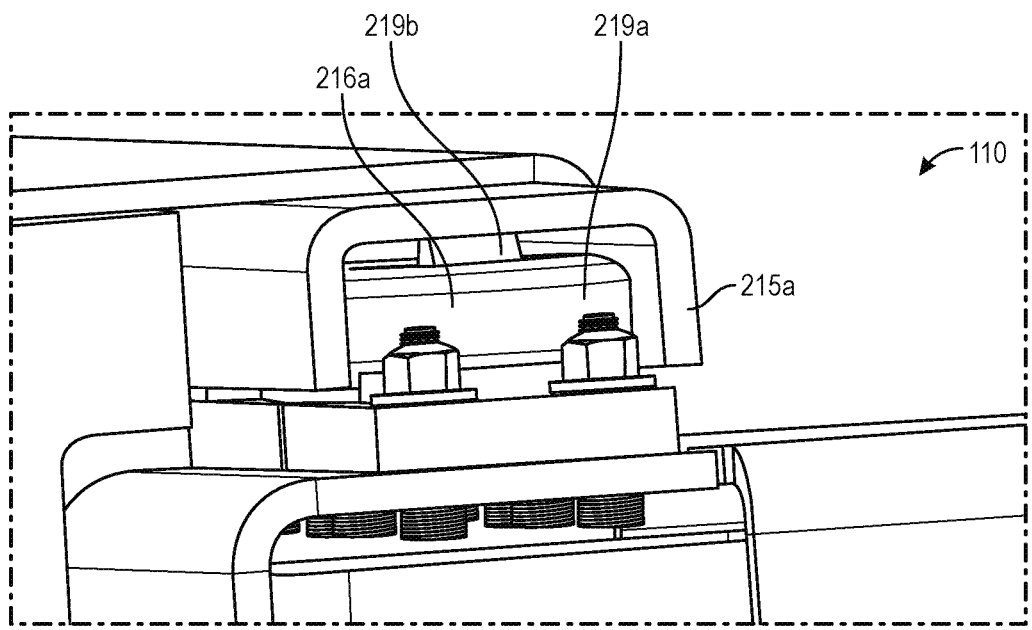
Figure 2E:
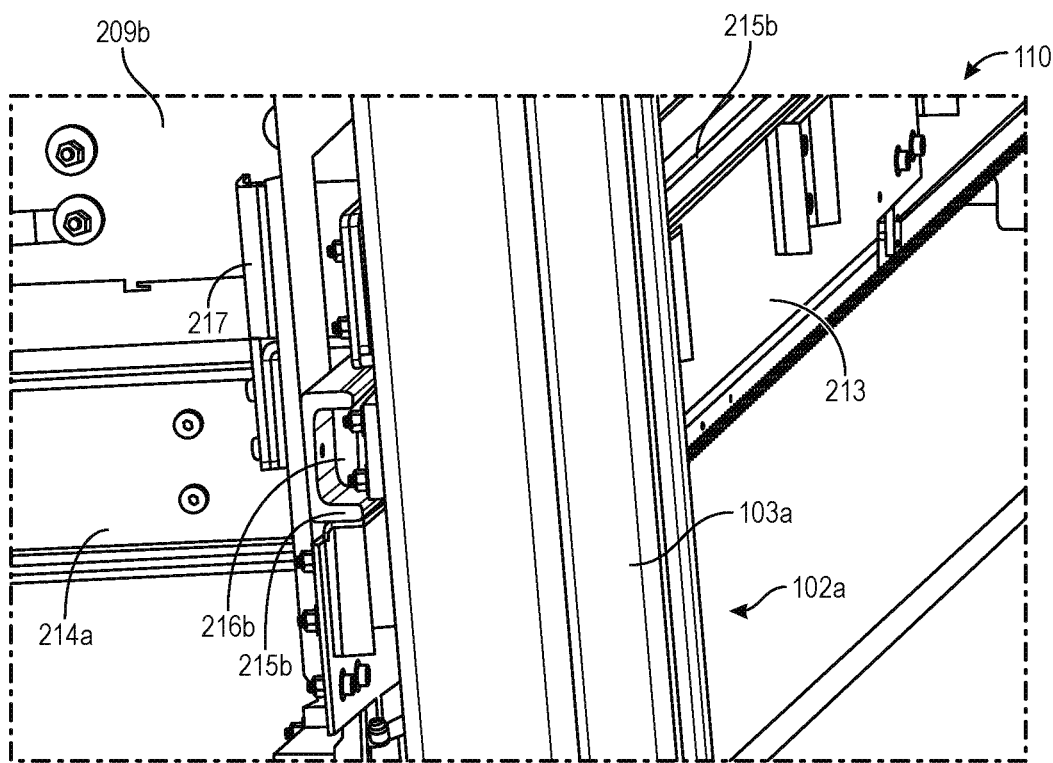

Referring to FIGS. 2B-2E together, each of the guides 215 house one or more linear roller bearings 216 (identified individually as bearing 216a (FIGS. 2C and 2D), bearing 216b (FIGS. 2B and 2E), and bearing 216c (FIG. 2B)). More specifically, as best shown in FIG. 2D, the bearings 216 can include a first bearing portion 219a and/or a second bearing portion 219b. The first bearing portion 219a is configured to interact with (e.g., roll or slide along) sides of a corresponding guide 215 (e.g., guide 215a in FIG. 2D), and the second bearing portion 219b is configured to interact with (e.g., roll or slide along) a back portion of the corresponding guide 215. The bearings 216 correspond to one of the mechanical arms 102 of the assembly 110, are designed for high loads, and facilitate lateral (e.g., horizontal) movement of the first portion 103 of the corresponding mechanical arm 102 across the back of a trailer 107 of a commercial vehicle 101 (FIG. 1). The bearings 216 can additionally, or alternatively, provide structural support. For example, the bearings 216 can provide vertical stiffness to hold the first portions 103 of the mechanical arms 102 in their vertical and upright orientations (FIG. 1).

Figure 2F:
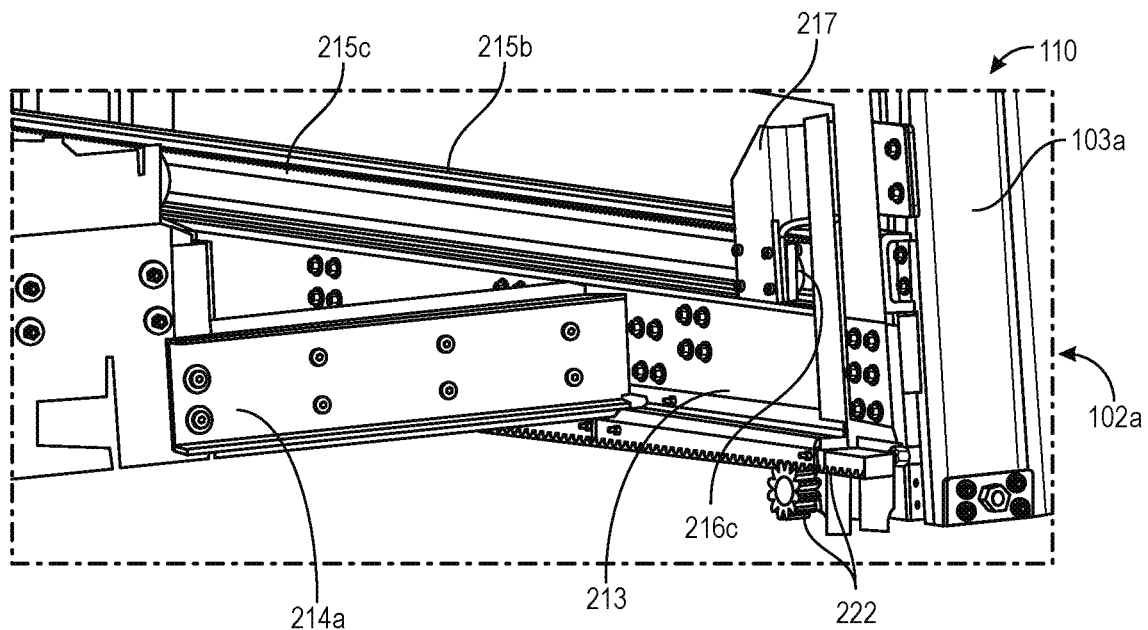

As best shown in FIGS. 2B and 2F, the assembly 110 can include a brace or stop 217. In some embodiments, the stop 217 is configured (a) to provide vertical stiffness to hold the first portions 103 of the mechanical arms 102 in their vertical and uprights orientations, and/or (b) to prevent the bearings 216 from rolling or sliding out the ends of the corresponding guides 215. In these and other embodiments, the assembly 110 can include other stopping mechanisms, such as bolts and/or corresponding nuts, positioned at ends of one or more of the guides 215 (or otherwise positioned at least partially within the guides 215) to prevent the corresponding bearings 216 from rolling or sliding out the ends of the guides 215.

Figure 2G:
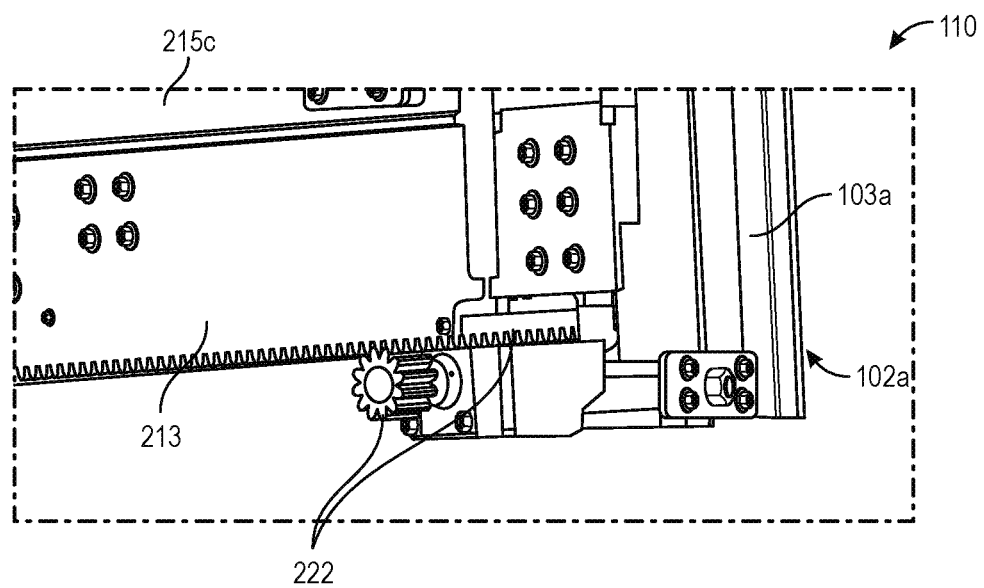

Referring now to FIGS. 2F and 2G, lateral movement of the first portion 103 of each of the mechanical arms 102 can be controlled using a corresponding actuator system 222. In the illustrated embodiment, the actuator system 222 is a hydraulically driven rack and pinion system. In these and other embodiments, the rack and pinion system can be electrically driven (e.g., using an electric motor) or pneumatically driven. In other embodiments, other suitable types of actuator systems (e.g., linear actuators, hydraulic or electric rams, chains and pulleys, etc.) can be used to control lateral movement of the first portion 103 of each mechanical arm 102.

The bearings 216 and the actuator systems 222 facilitate laterally moving the first portions 103 of the mechanical arms 102 in unison and/or independent of one another. For example, the first portion 103a of the first mechanical arm 102a can move laterally in a first direction while the first portion 103b of the second mechanical arm 102b (FIG. 2A) remains stationary, moves in a second direction opposite the first direction, and/or moves in the first direction. Additionally, or alternatively, the first portion 103a of the first mechanical arm 102a can move laterally at the same or a different speed than the first portion 103b of the second mechanical arm 102b.

In some embodiments, lateral movement of the first portions 103 of the mechanical arms 102 can be controlled via delivery of a specific volume of hydraulic fluid to corresponding directional control valves. To move the first portions 103 in unison, equal amounts of hydraulic fluid can be delivered to a directional control valve of each first portion 103 (e.g., using of a flow divider or splitter, and/or using a flow combiner). To move the first portion 103a of the first mechanical arm 102a independently of the first portion 103b of the second mechanical arm 102b, a first amount of hydraulic fluid can be delivered to a directional control valve of the first portion 103a that is different from an amount of hydraulic fluid that is delivered to a directional control valve of the first portion 103b. As discussed in greater detail below, a similar hydraulic process can be used to (a) raise and lower the first portions 103 in unison and/or independently from one another, (b) deploy or retract the second portions 104 of the mechanical arms 102 in unison and/or independently from one another, and/or (c) drive pusher motors on the second portions 104 in unison and/or independently from one another. In other embodiments, lateral movement of the first portions 103, vertical movement of the first portions 103, deployment or retraction of the second portions 104, and/or drive of the pusher motors can be controlled via a master and slave hydraulics arrangement, hot oil shuttle valves, and/or another suitable system.

The ability of the first portions 103 of the mechanical arms 102 to move laterally both in unison and independently of one another provides several advantages. For example, independent lateral movement of the first portions 103 facilitates adjusting the positions of the first portions 103 to load and/or unload pallets 120 and other items of various widths. As another example, independent movement of the first portions 103 can facilitate correcting misalignment of a pallet 120 or another object with a longitudinal axis of the commercial vehicle 101 (FIG. 1) running from the front of the commercial vehicle 101 to the back of the commercial vehicle 101. More specifically, as the first portions 103 are drawn toward one another about a pallet 120, the first portions 103 can exert a clamping force on the pallet 120 that can shift or pivot the pallet 120 to correct any axial misalignment of the pallet 120 with the commercial vehicle 101. This can ensure that the pallet 120 is straight and aligned with the longitudinal axis of the commercial vehicle 101 when the pallet 120 is loaded into and/or unloaded from the interior of the trailer 107 (FIG. 1). As a specific example, independent lateral movement of the first portions 103 of the mechanical arms 102 can correct up to approximately 15 degrees of misalignment in either direction from the longitudinal axis of the commercial vehicle 101.

As still another example, the ability of the first portions 103 to move laterally in unison can facilitate shifting or repositioning a pallet 120 or other item currently loaded onto the second portion 104 of the mechanical arms 102 to another lateral position along the back of the trailer 107. More specifically, assuming that a pallet 120 is loaded onto the second portions 104 of the mechanical arms 102 at a position toward the left side of the trailer 107, the first portions 103 of the mechanical arms 102 can move laterally in unison to shift the pallet 120 (e.g., in the air or along the ground) toward a position that is closer to the right side of the trailer 107. This can facilitate loading a pallet 120 into the interior of the trailer 107 at any position along the back of the trailer 107 independent of where on the ground the pallet 120 was initially loaded onto the second portions 104 of the mechanical arms 102. Additionally, or alternatively, this can facilitate unloading a pallet 120 out of the interior of the trailer 107 and placing the pallet 120 at any location on the ground along the back of the trailer 107 within range of the mechanical arms 102.

Figure 2H:
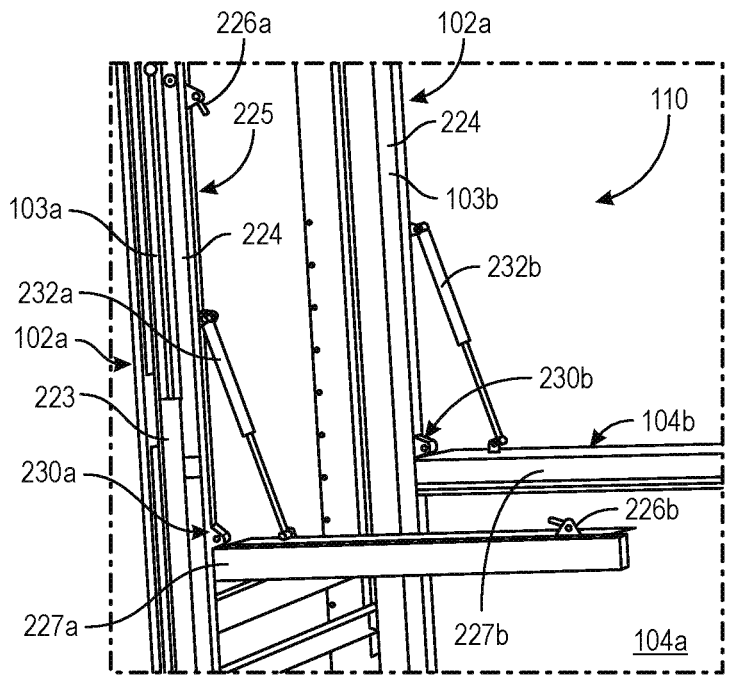

Referring now to FIGS. 2H and 21, each of the first portions 103 of the mechanical arms 102 can include a hydraulic cylinder 223 used to control vertical movement of the second portions 104 of the mechanical arms 102. More specifically, each of the first portions 103 include (a) a guide 224 (e.g., a c-channel, a rectangular tube, etc.) and (b) a corresponding component 225 that slides vertically within the guide 224 as the component 225 is raised or lowered using the hydraulic cylinder 223. In other embodiments, an electric cylinder or a pneumatic cylinder can be used in addition to or in lieu of the hydraulic cylinder 223.

In some embodiments, the component 225 is directly coupled to a top portion of the hydraulic cylinder 223 via a bolt or other attachment mechanism (not shown). In other embodiments, the component 225 is coupled to the hydraulic cylinder 223 via a chain or cord (not shown), and/or is raised or lowered using a corresponding pulley. The guide 224 maintains the corresponding component 225 in its upright and vertical orientation.

Referring to the first mechanical arm 102a as an example, the component 225 of the first portion 103a can include an attachment bracket 226a that can be used to connect the component 225 to a corresponding attachment bracket 226b at a distal end region of the second portion 104a via a chain or cord (not shown). Additionally, or alternatively, the component 225 can be attached to the second portion 104a at a base region 227a of the second portion 104a. As the component 225 slides up or down within the guide 224 using the hydraulic cylinder 223, the guide 224, the component 225, and the corresponding chains/cords (a) raise or lower the second portion 104a with respect to the ground and (b) support the second portion 104a and any load placed onto the second portion 104a. Additionally, or alternatively, the first portions 103 transfer the weight of any load on the second portions 104 to the frame 208 and 209 (FIG. 2B) of the commercial vehicle 101.

In some embodiments, the first portions 103 of the mechanical arms 102 can raise or lower corresponding second portions 104 of the mechanical arms 102 in unison and/or independently of one another. For example, the first portion 103a of the first mechanical arm 102a can raise the second portion 104a while the second portion 104b of the second mechanical arm 102b remains stationary, is lowered, and/or is raised. Additionally, or alternatively, the first portion 103a of the first mechanical arm 102a can raise or lower the second portion 104a at the same or a different speed than the first portion 103b of the second mechanical arm 102b raises or lowers the second portion 104b.

With continuing reference to FIGS. 2H and 21, the second portion 104 of each mechanical arm 102 is deployed and retracted using a corresponding hydraulic piston 232 (identified individually in FIGS. 2H and 21 as hydraulic pistons 232a and 232b). For example, the second portion 104a of the first mechanical arm 102a can rotate about a pivot point 230a as the hydraulic piston 232a is extended (to deploy the second portion 104a) or retracted (to retract the second portion 104a). The chain or cord (not shown) coupled to the attachment bracket 226a of the component 225 of the corresponding first portion 103a and to the attachment bracket 226b of the second portion 104a can support the second portion 104a as it is deployed or retracted and/or can aid in deploying or retracting the second portion 104a. Although hydraulic pistons 232 are used to deploy and retract the second portions 104 of the mechanical arms 102, other suitable actuators (e.g., chain and pulleys) can be used in addition to or in lieu of the hydraulic pistons 232 in other embodiments of the present technology.

In some embodiments, the second portions 104 of the mechanical arms 102 can be deployed or retracted in unison and/or independently of one another. For example, the second portion 104a of the first mechanical arm 102a can be deployed while the second portion 104b of the second mechanical arm 102b remains stationary, is deployed, and/or is retracted. Additionally, or alternatively, the second portion 104a of the first mechanical arm 102a can be deployed or retracted at the same or a different speed than the second portion 104b of the second mechanical arm 102b is deployed or retracted.

Figure 2I:
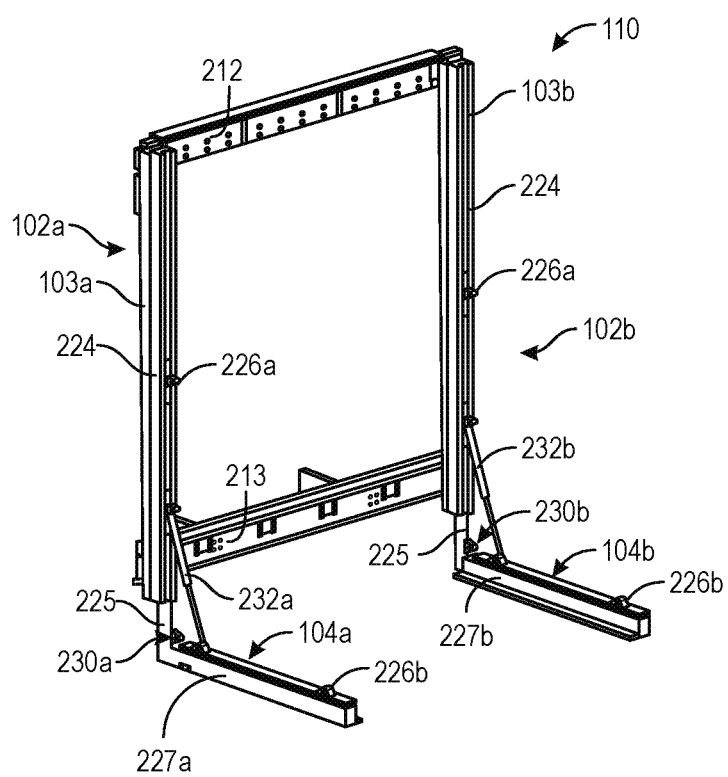
Figure 2J:
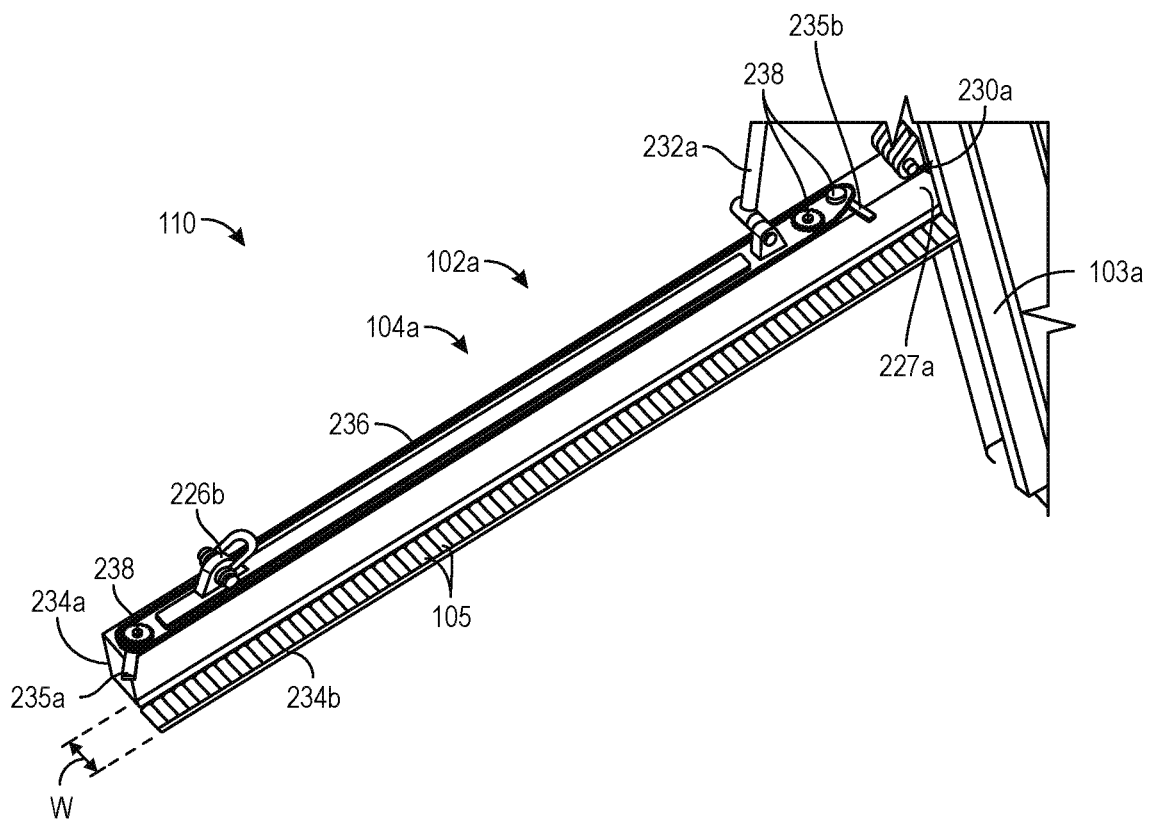
Figure 2K:
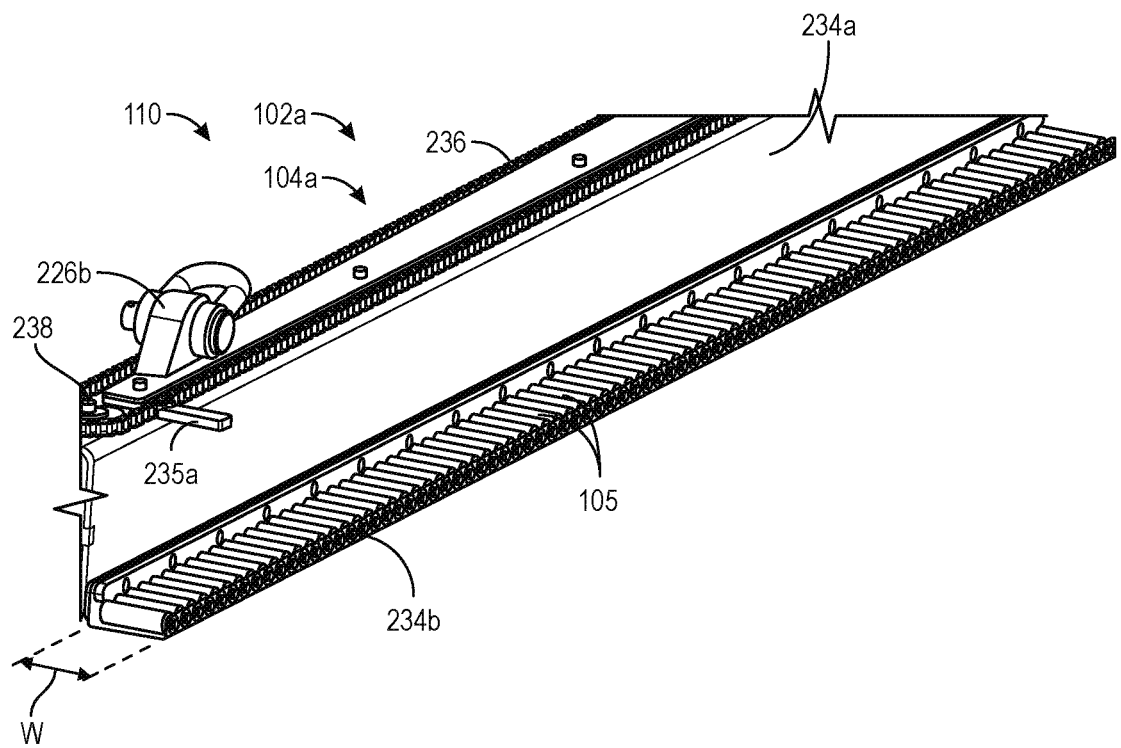
Figure 2L:
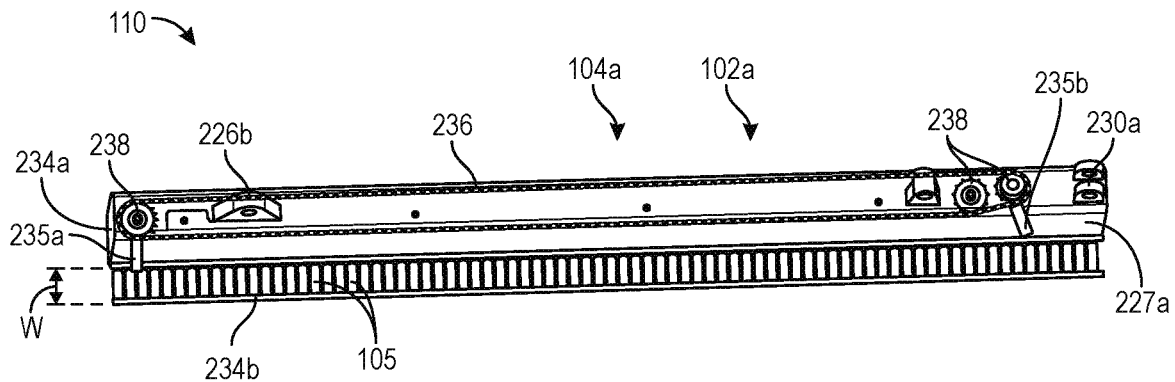

Referring now to FIGS. 2J-2L, the second portion 104 of each of the mechanical arms 102 includes a variety of components for lifting, loading, and/or unloading cargo. Referring to the second portion 104a of the first mechanical arm 102a as an example, the second portion 104a includes a body portion 234a and a lip portion 234b. The lip portion 234b can be (a) positioned under a pallet 120 or other cargo and (b) used to lift and maintain the pallet 120 in the air. The body portion 234a can be used as lateral support to laterally maintain the pallet 120 on the lip portion 234b. As discussed above, the body portion 234a can additionally, or alternatively, be used to apply a clamping force to a side of the pallet 120 to straighten and align the pallet with a longitudinal axis of the commercial vehicle 101.

As shown, the lip portion 234b includes a plurality of rollers 105. In some embodiments. The rollers 105 can be low-friction, passive conveyor rollers that are free rolling and can be used to shift a pallet 120 or other cargo forward or backward along the lip portion 234b (e.g., to convey the pallet 120/cargo into or out of the trailer 107 and/or onto the ground or another platform in front of the second portion 104a). An advantage of using passive rollers includes the ability to reduce or minimize a total height or thickness of the rollers 105. For example, when the second portion 104a is lowered such that the rollers 105 are in contact with the ground, each of the rollers 105 can stand less than three quarters of an inch (less than 1.905 centimeters) off the ground. This can enable fitting the lip portion 234b of the second portion 104b under a pallet 120 or other cargo in a variety of settings. For example, a pallet 120 can be positioned on a block of wood (e.g., a 2×4 piece of wood) on the ground, and the assembly 110 can maneuver the lip portions 234b of the second portions 104 of the mechanical arms 102 underneath the pallet 120 for lifting and loading the pallet 120 into the trailer 107. Similarly, the pallet 120 can be unloaded from the trailer 107 onto a similar block of wood. In other words, the low profile of the rollers 105 can obviate use of specialized equipment, such as a forklift or loading dock.

To shift a pallet 120 or other cargo forward (toward the trailer 107) or backward (away from the trailer 107) while the pallet 120/cargo is positioned on the lip portion 234b of the second portion 104a, the second portion 104a can include a chain 236 that is driven by a pusher motor (not shown) and includes chain pushers 235 (identified individually as chain pusher 235a and 235b in FIGS. 2J-2L). The chain 236 can be tensioned and guided using a chain tensioning system 238. The chain pushers 235 can be configured to interact with the pallet 120/cargo and push the pallet 120/cargo along the rollers 105 toward or away from the trailer 107. In some embodiments, the chain pushers 235 are positioned and/or spaced so as to hinder or prevent the pallet 120/cargo from unintentionally sliding forward (toward the trailer 107) or backward (away from the trailer 107) when the pallet 120/cargo is loaded onto the rollers 105.

Although the rollers 105 are described above as passive rollers, the rollers 105 can be active or driven or can include an actuated tread or belt (e.g., similar to a treadmill) in other embodiments of the present technology. In these embodiments, the driven rollers 105 can actively shift a pallet 120 or other cargo along the lip portion 234b toward or away from the interior of the trailer 107 (FIG. 1) of the commercial vehicle 101. Advantages of actuated or driven rollers 105 include the ability to push a pallet 120 into the trailer 107 and/or pull the pallet 120 out of the trailer even when the driven rollers 105 or treads are in contact with only a small portion of the pallet 120. Additionally, or alternatively, driven rollers can be used to shift a pallet 120 toward or away from the trailer 107 without use of separate actuating components (e.g., the chain 236 and/or the chain pushers 235) and while maintaining the ability to stop the pallet 120 at various locations along the rollers 105 (e.g., after the pallet 120 has begun shifting toward or away from the trailer 107).

Figure 2M:
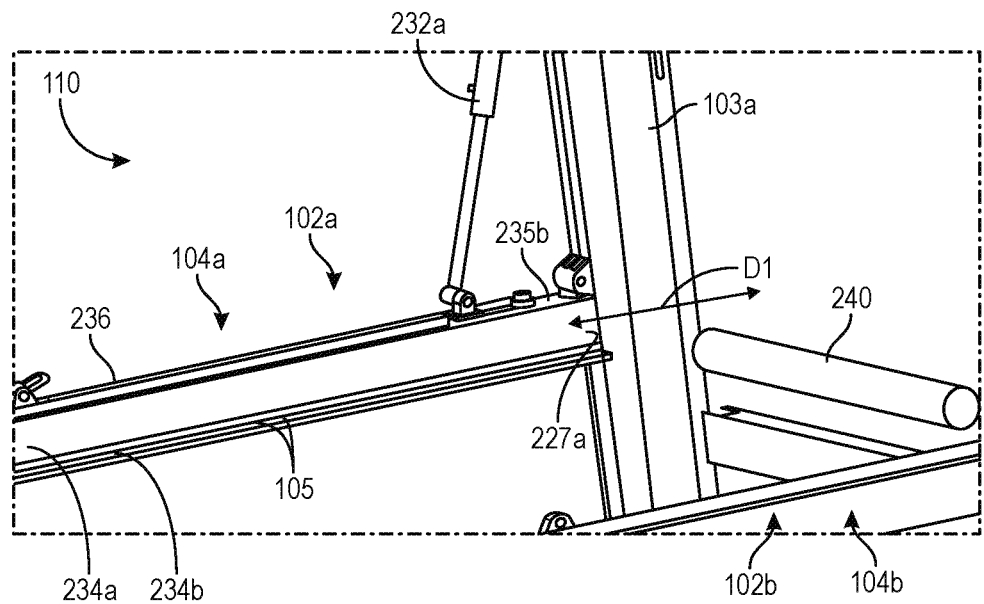

As shown in FIG. 2M, a gap having a distance D1 can exist between (a) the end of the chain 236, the chain pusher 235b, and/or the end of the rollers 105 of the lip portion 234b at the base region 227a of the second portion 104a, and (b) the interior of the trailer 107 at which chain sections or other components (not shown) of the system 100 of FIG. 1 are positioned to draw a pallet 120 into the trailer 107 and/or to push a pallet 120 out of the trailer 107. (Components of the system 100 that can be included in the interior of the trailer 107 are described in greater detail below with respect to FIG. 3A-5.) In some embodiments (e.g., in embodiments including passive rollers 105 on the lip portions 234b of the second portions 104 of the mechanical arms 102), the assembly 110 can include a freely spinning passive roller 240 positioned outside of the door of the trailer 107 and within the gap described above. In these embodiments, while loading a pallet 120 into the trailer 107, the pallet 120 can be pushed off of the rollers 105 of the second portions 104 of the mechanical arms 102 (e.g., using the chain 236 and chain pushers 235), onto the passive roller 240, and into the interior of the trailer 107 to a point at which the chain sections or other components in the trailer 107 can pull the pallet 120 into the trailer 107.

While unloading a pallet 120 from within the trailer 107, the chain sections or other components within the trailer 107 can push the pallet 120 out of the trailer 107, onto the passive roller 240, and at least partially onto the second portions 104 of the mechanical arms 102. Once the pallet 120 can no longer be pushed out via the chain sections/components within the trailer 107, an internal hydraulic or electric ram/arm (not shown) of the assembly 110 and/or of the components within the trailer 107 can flip out and/or be used to push the pallet 120 the remaining distance onto the rollers 105 of the second portions 104 of the mechanical arms 102 (e.g., to a point at which the chain pushers 235 can engage the pallet 120 and hold or move the pallet 120 on or along the rollers 105). Additionally, or alternatively, the chain sections or other components (e.g., rollers) in the interior of the trailer 107 can be extended out of the trailer 107 (e.g., on a drawer) to shorten or eliminate the gap described above and/or to facilitate pushing the pallet 120 all the way onto the rollers 105 of the second portions 104 of the mechanical arms 102.

Although not shown in FIGS. 2A-2M, in some embodiments the assembly 110 includes one or more sensors and/or other technology to facilitate execution of various tasks related to loading and/or unloading a pallet 120 or other cargo into or out of the trailer 107. For example, the assembly 110 can include proximity sensors, momentary switches, retroreflective sensors, photoelectric sensors, and/or other suitable sensors for detecting a pallet 120, an unloading platform, and/or another vehicle behind the commercial vehicle 101 (FIG. 1) and/or for determining whether the commercial vehicle 101 is properly aligned with (e.g., is close enough to, is laterally aligned with, is axially aligned with, etc.) the pallet 120, the unloading platform, and/or the other vehicle. A backup camera with a custom software overlay can be used to provide feedback to a driver of the commercial vehicle 101 to aid with this determination. Additionally, or alternatively, the other vehicle or a human operator can convey alignment information to the driver and/or to the commercial vehicle 101. For example, proximity sensors can be mounted on the sides of the commercial vehicle (e.g., on the sides of the trailer 107) and/or on the sides of the other vehicle and can be used to convey alignment information back to the driver of the commercial vehicle 101 and/or to the commercial vehicle 101 (e.g., in the event the commercial vehicle 101 is an autonomous vehicle). Proximity sensors mounted on or towards the sides of the trailer can aid in aligning vehicles such that their trailers are parallel with one another.

As another example, the assembly 110 can include proximity detectors (e.g., photoelectric, ultra-sonic, radar, or other suitable types of proximity sensors) to detect the ground and/or determine a height of the rollers 105 on the second portions 104 of the mechanical arms 102 relative to the ground and/or to a reference point (e.g., within the interior of the trailer 107). In these and other embodiments, the assembly 110 can include computer vision and/or artificial intelligence systems to detect the ground and determine how far off the ground (a) a bottom of a pallet 120 to be loaded onto the second portions 104 of the mechanical arms 102 is currently positioned and/or (b) a top of the pallet 120 (or of cargo on the pallet 120) is currently positioned. In these and still other embodiments, the assembly can include proximity sensors, computer vision, or other sensors to determine (e.g., via detection of sides or corners of a pallet 120) when the second portions 104 of the mechanical arms are approaching, are positioned beneath, and/or are contacting the pallet 120. In some embodiments, the assembly 110 can include hydraulic pressure sensors, proximity sensors, computer vision, and/or other types of sensors to determine the occurrence of specific events. For example, the system 100 can monitor hydraulic pressure to determine when the mechanical arms initially contact the pallet 120, can use proximity sensors and/or machine vision to determine (e.g., via detection of one or more sides and/or corners of the pallet 120) whether the pallet 120 is properly aligned with the commercial vehicle 101, and/or can monitor hydraulic pressure to determine when a clamping force applied by the mechanical arms 102 to the sides of a pallet 120 to align the pallet 120 with the commercial vehicle is pushing on the pallet 120 and is no longer shifting the pallet 120 (e.g., indicating that the pallet 120 is aligned with the longitudinal axis of the commercial vehicle 101).

In some embodiments, the system 100 can track a pallet 120 as it is loaded and/or unloaded from the trailer 107. For example, when a pallet 120 is loaded into the trailer 107, a powered RFID tag can be placed on the pallet 120 (or on the cargo on the pallet 120) that can be used to (a) identify the pallet 120, (b) determine the location of the pallet 120 within the trailer 107, and/or (c) identify when the pallet 120 has been unloaded from the trailer 107. Additionally, or alternatively, the system 100 can use computer vision, bar codes, or another tracking system to identify a pallet 120, track the position of the pallet 120 within the trailer 107, and/or track when the pallet 120 is unloaded form the trailer 107. This can facilitate unloading a pallet 120 from the trailer 107 regardless of the position of the pallet 120 within the trailer 107 (e.g., using a carousel system 370 within the trailer, as described in greater detailer below with respect to FIGS. 3A-5). In some embodiments, the pallet tracking system of the system 100 can be integrated with another company's tracking system such that the pallet 120 and any data (e.g., height and width data of the pallet 120 and/or cargo on the pallet 120) associated with that pallet 120 can maintained, tracked, and updated after pickup and delivery of the pallet 120 using the system 100. As described in greater detail below, the height and width data can also be used to aid in the loading and/or unloading processes of the pallet 120 into and/or out of the trailer 107, such as by using the width data to properly align the second portions 104 of the mechanical arms to receive the pallet 120 as the pallet 120 is conveyed out of the trailer 107.

Figure 3A:
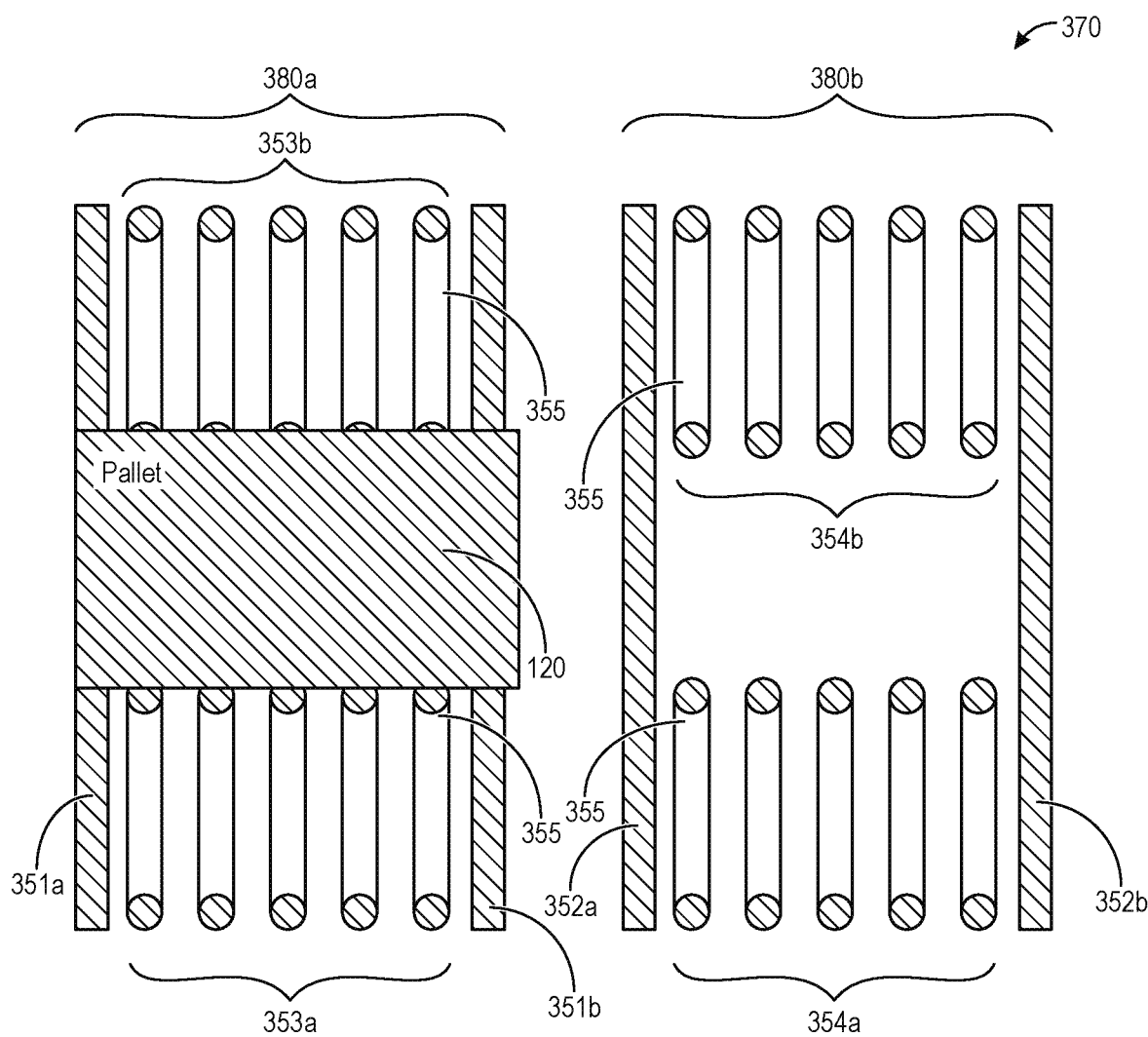

FIGS. 3A-3E are various views of a pallet repositioning or carousel system 370 ("the carousel system 370") configured in accordance with various embodiments of the present technology. As discussed above, the carousel system 370 can be included within the trailer 107 of the commercial vehicle 101 of FIG. 1 (a) to help convey a pallet 120 into and/or out of the trailer 107 and/or (b) to reposition the pallet 120 within the trailer 107. FIG. 3A, for example, is a partially schematic plan view looking down at the carousel system 370 (e.g., from the top of the commercial vehicle 101). As shown, the carousel system 370 is arranged in a plurality of pallet columns 380. Two pallet columns 380a and 380b are shown in FIG. 3A, but carousel systems configured in accordance with other embodiments of the present technology can include a single pallet column 380 or more than two pallet columns 380.

Each pallet column 380 of FIG. 3A includes internal chains 351 or 352 and rollers 355. More specifically, a first pallet column 380a of the carousel system 370 includes a pair of internal chains 351 (identified individually as internal chain 351a and internal chain 351b), and a second pallet column 380b of the carousel system 370 includes a pair of internal chains 352 (identified individually as internal chain 352a and internal chain 352b). Additionally, each of the pallet columns 380 includes corresponding sets 353 and/or 354 of rollers 355 proximate ends of the internal chains 351 and/or 352 and/or proximate ends of the pallet columns 380.

Figure 3B:
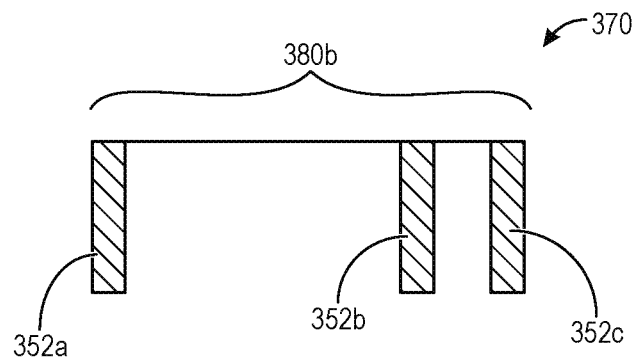

Although each pallet column 380 is illustrated with a pair of internal chains 351 and/or 352 in FIG. 3A, one or more of the pallet columns 380 of the carousel system 370 can include a different number of internal chains (e.g., one internal chain or more than two internal chains) in other embodiments of the present technology. For example, FIG. 3B illustrates the second pallet column 380b with three internal chains 352a, 352b, and 352c. The internal chain 352b is offset from the internal chain 352a by a first distance to accommodate pallets 120 having 36-inch (91.44-centimeter) widths (e.g., pallets commonly used in the beverage industry), and the internal chain 352c is offset from the internal chain 352a by a second distance to accommodate pallets 120 having 40-inch (101.6-centimeter) widths (e.g., grocery manufacturers association (GMA) pallets). Thus, the three-chain pallet column 380b illustrated in FIG. 3B offers the ability to convey pallets 120 having differing widths into and/or out of the trailer 107 and/or the ability to reposition pallets 120 of differing widths within the trailer 107. The first pallet column 380a can additionally, or alternatively, include three internal chains 351 in some embodiments. Furthermore, although two internal chains 352b and 352c are shown aligned on the right side of the pallet column 380b (proximate an edge or sidewall of the interior of the trailer 107), the arrangement of the internal chains 352 can differ in other embodiments of the present technology. For example, the internal chain 352b can be positioned the first distance away from the internal chain 352c in some embodiments such that the arrangement of the internal chains 352 in the pallet column 380b illustrated in FIG. 3B is essentially flipped.

The internal chains 351/352 can be freely movable and/or driven. For example, as a pallet 120 is initially loaded into the trailer 107 along the first pallet column 380a, the internal chains 351 of the first pallet column 380a can be freely moving (e.g., to minimize friction or other forces working against conveying the pallet 120 into the trailer 107). Continuing with this example, as the pallet 120 is conveyed a set distance into the trailer 107, the internals chains 351 can be driven such that the internal chains 351 draw the pallet 120 into the trailer 107 and toward the front of the commercial vehicle 101. When the pallet 120 is unloaded from the trailer 107 along the first pallet column 380a, the internal chains 351 can be driven such that the pallet 120 is pushed toward to opening of the trailer 107, onto the passive roller 240 (FIG. 2M), and/or onto the rollers 105 of the second portions 104 of the mechanical arms 102 of the assembly 110 (FIGS. 1-2M). In some embodiments, at least a portion of the internal chains 351 can be extended out of the trailer 107 to reduce or eliminate a gap that exists between (a) the end of the rollers 105/chain pusher 235b on the second portions 104 of the assembly 110 and (b) the carousel system 370 within the trailer 107. Thus, the internal chains 351/352 of the carousel system 370 can be used to convey pallets into and/or out of the trailer 107 generally along the longitudinal axis of the commercial vehicle 101.

In some embodiments, the carousel system 370 can be configured to accommodate oversized pallets (e.g., pallets with 90-inch (228.6 centimeter) widths) that are larger than a single pallet column 380. For example, an oversized pallet 120 can be loaded into the trailer 107 and/or conveyed along the longitudinal axis of the commercial vehicle using internal chains 351/352 from multiple pallet columns 380.

The rollers 355 of the carousel system 370 can be lifted and actuated to reposition a pallet 120 laterally and/or across pallet columns 380. For example, FIGS. 3C-3E are side views of the carousel system 370 looking at the carousel system 370 along the longitudinal axis of the commercial vehicle 101 (e.g., from the opening of the trailer 107). As shown in FIG. 3C, the rollers 355 can be retracted or disengaged such that the rollers 355 do not contact pallets 120 while the pallets 120 are supported by the internal chains 351/352. Referring next to FIGS. 3D and 3E, to reposition the pallet 120 from the first pallet column 380a (as shown in FIG. 3D) to the second pallet column 380b (as shown in FIG. 3E), the first set 353a of rollers 355 can be actuated to engage the pallet 120 and lift the pallet 120 off the internal chains 351 of the first pallet column 380a. In addition, the first set 354a of rollers 355 of the second pallet column 380b can be actuated to a lifted position to receive the pallet 120. At this point, the rollers 355 of the first set 353a and/or the rollers 355 of the first set 354a can be driven to transfer the pallet 120 from the first pallet column 380a to the second pallet column 380b. After the transfer, the rollers 355 of the first set 353a can be lowered to their retracted or stowed position. Additionally, or alternatively, the rollers 355 of the first set 354a can be lowered to their retracted or stowed position such that the pallet 120 is lowered onto and is supported by the internal chains 352 of the second pallet column 380b.

Figure 4A:
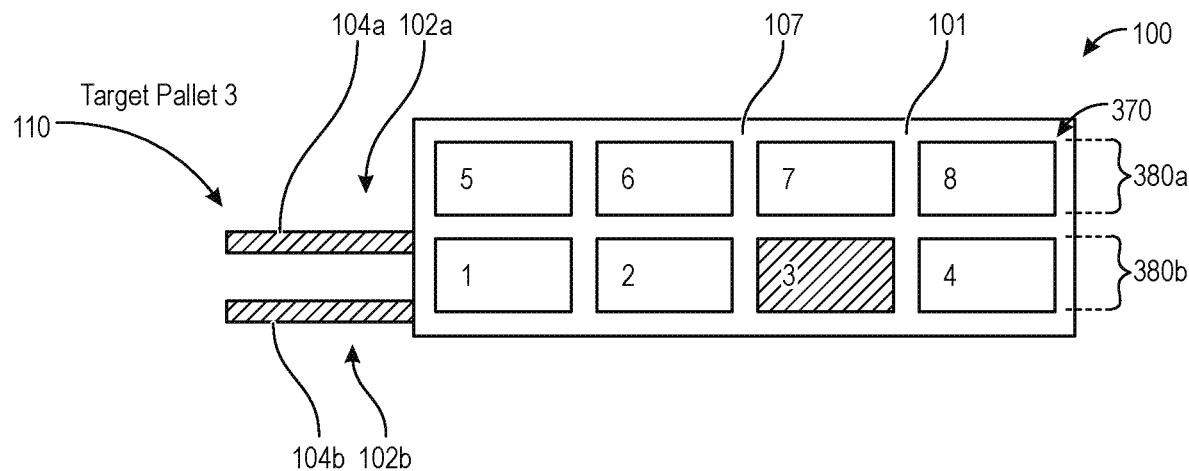
FIGS. 4A-4E are partially schematic views of a method of repositioning a pallet of cargo within a trailer of a commercial vehicle using the commercial vehicle loading and unloading system of FIG. 1, in accordance with various embodiments of the present technology.
Figure 4B:
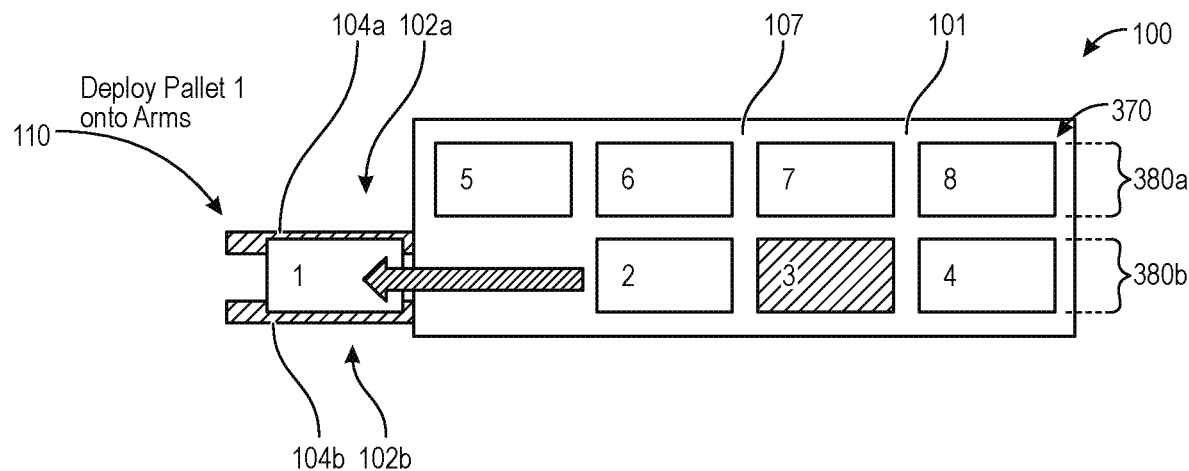

The internal chains 351/352 and the rollers 355 of the carousel system 370 can be used to reposition one or more pallets within the trailer 107 and/or without unloading a pallet 120 onto the ground, regardless of how many pallet positions within the trailer 107 are occupied or are vacant. For example, FIGS. 4A-4E illustrate a carousel method of repositioning or rearranging eight pallets (labeled 1-8) currently loaded into the trailer 107 of a commercial vehicle 101 amongst eight pallet positions arranged in the two pallet columns 380a and 380b of the carousel system 370. More specifically, FIGS. 4A-4E illustrate a method of repositioning pallet 3 at or proximate the opening of the trailer 107 (e.g., for unloading the pallet 3 from the trailer 107). Referring to FIG. 4A, the method begins by (a) determining a position of a pallet of interest (pallet 3), and (b) positioning the second portions 104 of the mechanical arms 102 of the assembly 110 at a position to receive the pallet 1 from within the trailer 107. The position of pallet 3 can be determined using a powered RFID attached to the pallet 3, computer vision, and/or another suitable tracking method, as discussed above. At FIG. 4B, the method continues by conveying the pallet 1 out of the trailer 107 and onto the second portions 104 (e.g., using the internal chains 352 (FIG. 3A) of the pallet column 380b) to open up a pallet position within the trailer 107.

Figure 4C:
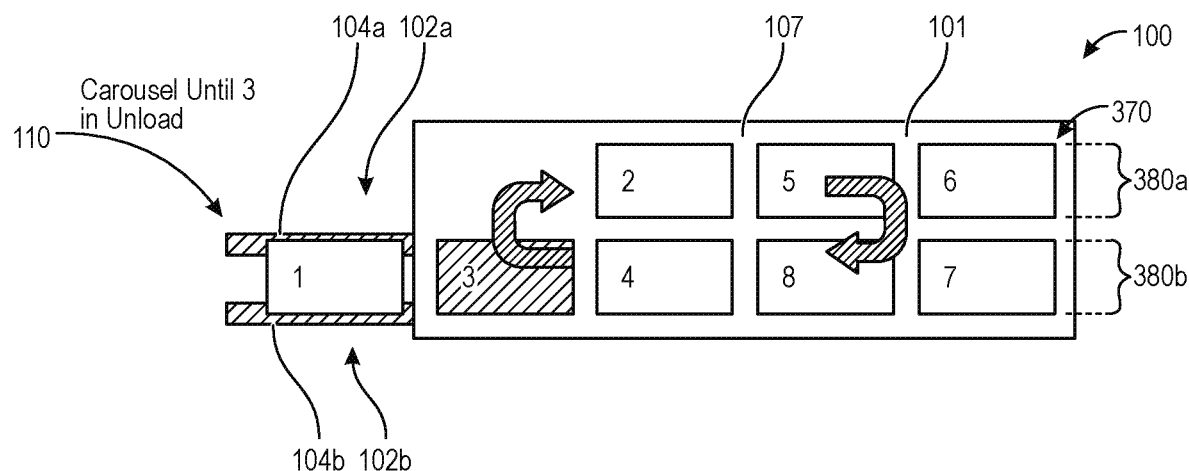
Figure 4D:
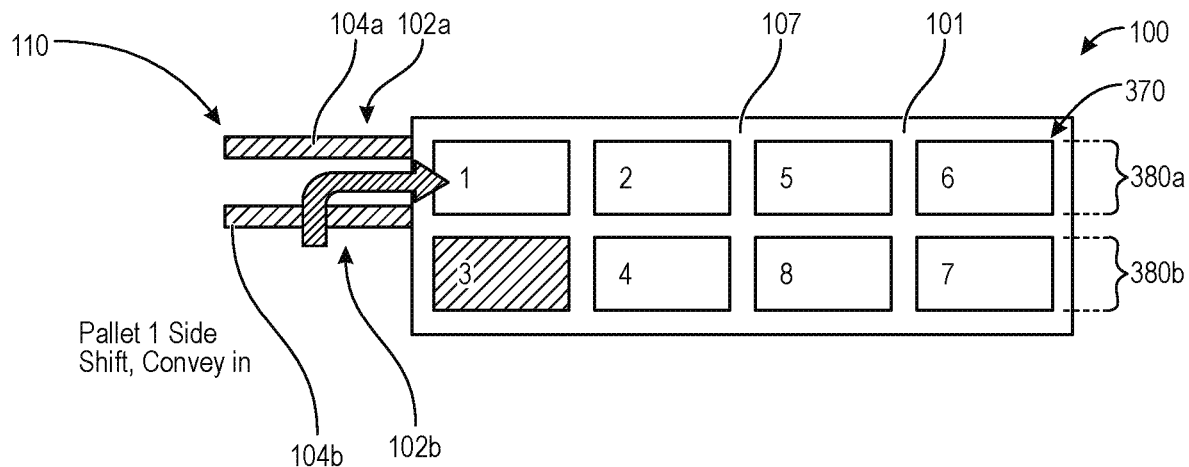

Referring to FIG. 4C, the method continues by shifting the pallets 2-8 around in a circular carousel manner (e.g., using the internal chains 351/352 (FIG. 3A) and the rollers 355 (FIG. 3A) of the pallet columns 380a and 380b) until the pallet 3 is positioned at or proximate the opening of the trailer 107. As shown in FIG. 4D, the mechanical arms 102 of the assembly 110 can be laterally moved along the opening of the trailer 107 until they are aligned with the first column 380a of the carousel system 370, and can be used to convey the pallet 1 back into the trailer 107 at the open pallet position. Alternatively, pallet 3 can be laterally moved from the second pallet column 380b to the first pallet column 380a using the rollers 355 of the carousel system 370, and the second portions 104 of the assembly can convey the pallet 1 back into the trailer 107 at the open pallet position in the second column 380b that was vacated by pallet 3.

Figure 4E:
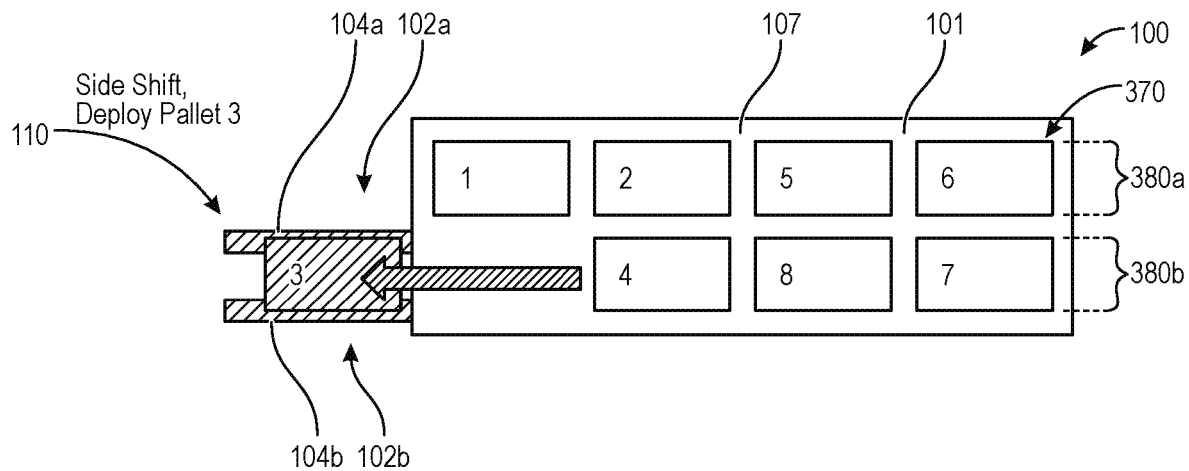

At FIG. 4E, the method can continue by laterally moving the mechanical arms 102 of the assembly 110 until they are aligned with the pallet 3, and conveying the pallet 3 out of the trailer 107 and onto the second portions 104 of the mechanical arms 102 (e.g., using the internal chains 352 (FIG. 3A) of the pallet column 380b) for unloading of the pallet 3 at a deployment site or platform. In this manner, the carousel system 370 of the system 100 of FIG. 1 can be used to reposition pallets within the trailer 107, thereby enabling loading and/or unloading pallets into and/or out of the trailer 107 in any order. Thus, the system 100 of the present technology facilitates using dynamic routing for pallet pickup and/or delivery, as discussed in greater detail below.

Figure 5:
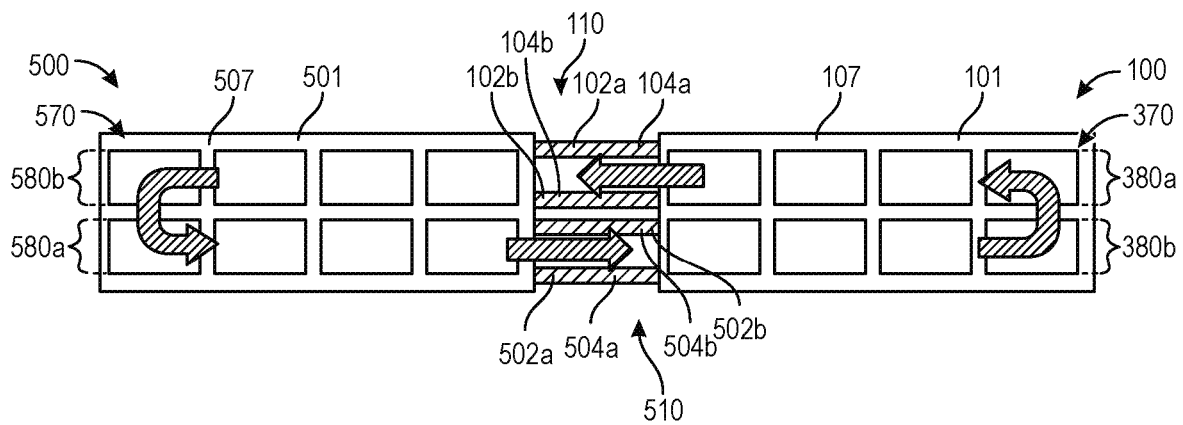
FIG. 5 illustrates a method of transferring a pallet of cargo between trailers of two vehicles using the using the commercial vehicle loading and unloading system of FIG. 1, in accordance with various embodiments of the present technology.
Figure 6A:
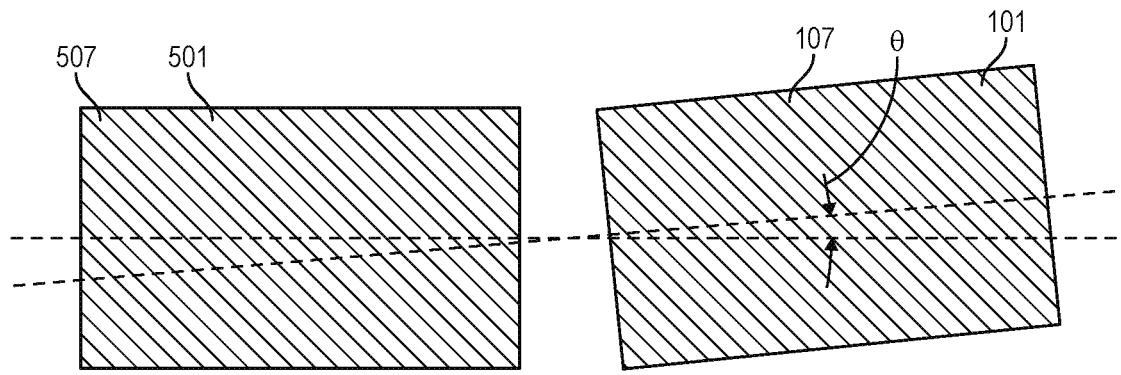
FIGS. 6A-6C are partially schematic views of alignments between two vehicles in accordance with various embodiments of the present technology.
Figure 6B:
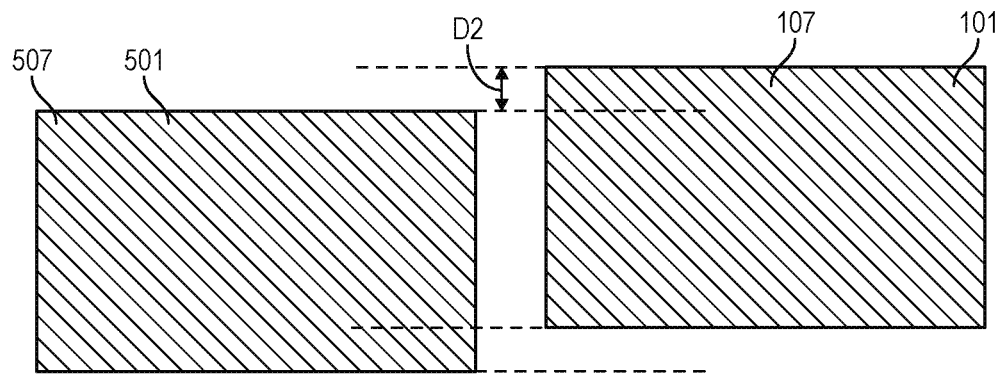
Figure 6C:
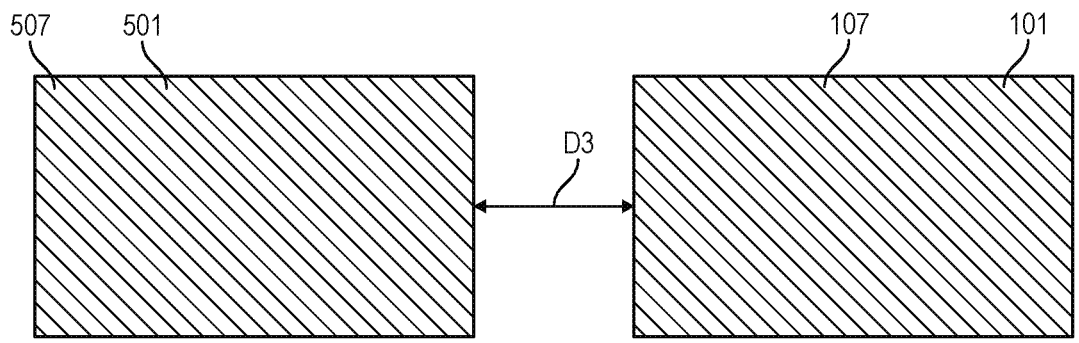

In some embodiments, the carousel system 370 of the system 100 can be leveraged to transfer cargo between two vehicles. For example, FIG. 5 illustrates a carousel method of transferring cargo between two vehicles 101 and 501 in accordance with various embodiments of the present technology. The vehicle 501 can be another commercial vehicle similar to the commercial vehicle 101 of FIG. 1. Alternatively, the vehicle 501 can be a semi-truck, a semi-truck trailer, or another suitable vehicle. As shown, the vehicle 501 is similar to the vehicle 101 in that the vehicle 501 also includes a commercial vehicle loading and unloading system 500 having (a) a carousel system 570 within a trailer 507 of the vehicle 501 and that includes two pallet columns 580a and 580b, and (b) an assembly 510 having two mechanical arms 102 with corresponding second portions 504a and 504b.

The vehicles 101 and 501 can be positioned such that the opening of their trailers 107 and 507, respectively, face one another. Additionally, the second portions 104a and 104b of the assembly 110 can be aligned with the first pallet column 380a of the carousel system 370 and with the second pallet column 580b of the carousel system 570. Similarly, the second portions 504a and 504b of the assembly 510 can be aligned with the first pallet column 580a of the carousel system 570 and with the second pallet column 380b of the carousel system 370. In some embodiments, alignment of the vehicles 101 and 501 can be accomplished using parking blocks and/or various sensors of the system 100 of FIG. 1. For example, the vehicle 501 can be stationary while the vehicle 101 is backed (autonomously or with a human driver) toward the vehicle 501. Continuing with this example, parallel alignment of the vehicles 101 and 501 can be achieved via proximity detectors positions on the outer edges of the trailer 107 and/or the trailer 507. As another example, the proximity or other sensors of the vehicles 501 can broadcast alignment information to the vehicle 101 and/or to the driver of the vehicles 101 to verify alignment information generated by the proximity or other sensors of the vehicle 101.

In some embodiments, pallets 120 can be transferred between the vehicles 101 and 501 even when the vehicles 101 and 501 are not fully aligned with one another. For example, referring to FIG. 6A, the present technology facilitates transferring pallets 120 between the vehicles 101 and 501 when parallelism between the vehicles 101 and 501 is within +0 degrees from full parallelism. In some embodiments, 0 degrees can be approximately 5 degrees, and/or can depend on a width W (FIGS. 2J-2L) of the rollers 105 on the second portions 104 of the mechanical arms 102 of the assembly 110 discussed above with respect to FIGS. 1-2M. In these and other embodiments, referring to FIG. 6B, the present technology facilitates transferring pallets 120 between the vehicles 101 and 501 when the vehicle 101 is axially misaligned with the vehicle 501 by a distance D2. For example, tolerable axial misalignment between the vehicles 101 and 501 can include up to approximately a third of the width of the opening of the trailer 107 and/or of the opening of the trailer 507, and/or can depend on and/or be corrected by a range of lateral motion of the mechanical arms 102 of the assembly 110. As still another example, referring to FIG. 6C, the present technology facilitates transferring pallets 120 between the vehicles 101 and 501 when the vehicle 101 axially spaced apart from the vehicle 501 by a distance D3. For example, the present technology can facilitate transferring pallets between the vehicles 101 and 501 when the distance D3 is within six inches (15.24 centimeters) of (e.g., the ends of the second portions 504 of) the vehicle 501.

Referring again to FIG. 5, internal chains and rollers (not shown in FIG. 5) of each of the carousel system 370 and 570 in the illustrated embodiments can work together to transfer pallets 120 from one of the vehicles 101 and 501 to the other. Although shown in FIG. 5 with an assembly 510, the commercial vehicle 501 in other embodiments of the present technology can lack the assembly 510. For example, the assembly 110 of the vehicle 101 can be used both (a) to load and/or unload pallets 120 into and/or out of the trailer 107, and/or (b) to load and/or unload pallets 120 into and/or out of the trailer 507 (e.g., by interfacing with the carousel system 570).

In this manner, the present technology is expected to offer several advantages over conventional systems. For example, because the commercial vehicle 101 can load and/or unload cargo into or out of the trailer 507 of the vehicle 501, the vehicle 501 can function as a mobile warehouse obviating, at least in part, the practice of using conventional delivery, intermediary, and/or receiving (pick-up) warehouses. In addition, the vehicles 501 and 101 can meet anywhere, and do not need additional physical facilities or conventional loading docks to facilitate loading/unloading of cargo between the vehicles. Thus, for example, the vehicle 501 (e.g., a driven or autonomous vehicle) can be used to transport a pallet 120 various distances along a route, and the commercial vehicle 101 (e.g., a driven or autonomous vehicle) can meet the vehicle 501 at any location along the route (e.g., outside of a populous area) to unload the pallet 120 from the vehicle 501 and deliver the pallet 120 to a destination location (e.g., within the populous area using a human driver). Additionally, or alternatively, the commercial vehicle 101 can transfer a pallet 120 from within its trailer 107 into the trailer 507 of the vehicle 501 for the vehicle 501 to transport the pallet 120 to another location. The location at which pallets 120 are transferred between the vehicles 101 and 501 can depend on several factors, such as available locations for transfer (e.g., leased, owned, and/or available land at which to perform the transfer), a distance between the two vehicles 101 and 501, additional potential cargo transfers with other vehicles, and/or utilization (maximum loading) of each of the vehicles 101 and 501.

The present technology is expected to (a) enable national-scale, less than truckload freight shipping (e.g., without use of intermediary warehouses), (b) alleviate warehouse capacity constraints, (c) obviate, at least in part, the use of specialized loading and/or unloading equipment (e.g., a forklift) and/or infrastructure (e.g., loading dock, building, warehouse, etc.), and (d) reduce the occurrence of employee injury (e.g., via less frequent use of specialized equipment, loading docks, conventional warehouse, drivers, and/or manual human labor to load and/or unload trailers). Furthermore, the ability to rearrange pallets 120 within the trailer 107, within the trailer 507, and/or across the trailers 107 and 507 is expected to enable dynamic pickup and delivery routing (e.g., including the ability to implement real-time changes to the pickup and/or delivery schedules, and/or the ability to comingle pickup and delivery pallets within the same trailer 107).

Moreover, the present technology is expected to enable, enhance, and/or easily integrate into the autonomous commercial vehicle industry as commercial autonomous vehicles become more prevalent and widely used. As a specific example, the present technology is expected to enable semi-autonomous trucking (or platooning) in which several autonomous vehicles follow a vehicle driven by a human who is present to intervene and/or address various scenarios (e.g., bad weather, driving conditions, hazards, etc.) that can arise when transporting cargo. As the platoon approaches a populous or congested destination area for cargo being transported by the platoon, the platoon of autonomous vehicles can pull of the interstate freeway system (e.g., into a parking lot or other transfer area) and transfer the cargo using the present technology onto human-driven vehicles. The cargo can then be delivered to the destination area using the human-driven vehicles, keeping humans present in cities or congested areas to respond to driving scenarios that can arise in such setting but otherwise keeping these drivers at home and/or away from the long hours driving on the interstate highway system. Additionally, or alternatively, the human-driven vehicles can transfer cargo to the semi-autonomous platoon vehicles to transport the cargo to the location from which the semi-autonomous platoon vehicles traveled and/or to another location.

Figure 7A:
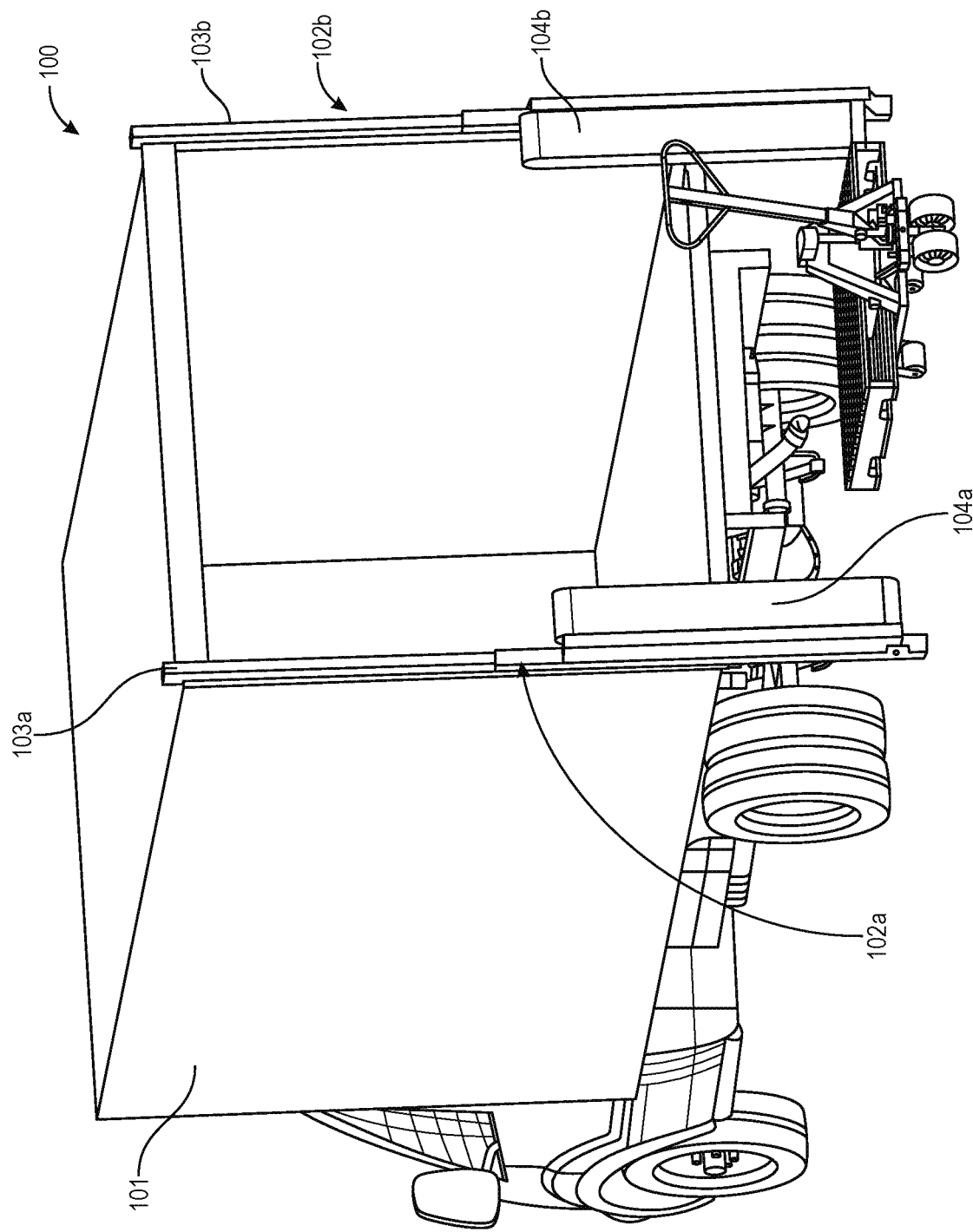
FIGS. 7A-7G illustrates a method of loading a pallet of cargo in accordance with various embodiments of the present technology.

For the sake of clarity and understanding, several methods associated with the present technology will now be described in greater detail. FIGS. 7A-7G, for example, illustrate a method of loading a pallet 120 into the trailer 107 of the commercial vehicle 101 of FIG. 1 using the system 100 of FIG. 1, the assembly 110 of FIGS. 1-2M, and/or the carousel system 370 of FIGS. 3A-5. Referring to FIG. 7A, the pallet 120 can be positioned in an area accessible to the assembly 110 mounted on the commercial vehicle 101. For example, the pallet 120 can be placed so that a side of the pallet (e.g., its long side) is roughly aligned with a longitudinal axis of the commercial vehicle 101 (e.g., a center axis that extends along the length of the commercial vehicle 101)

and is within a specified distance (e.g., approximately fifteen inches or approximately 38 centimeters) of the back of the trailer 107 or commercial vehicle 101. In some embodiments, the system 100 of FIG. 1 can be configured to project a light or image onto the ground behind the commercial vehicle 101 to delineate an area in which (or a location at which) to position the pallet 120 for loading into the trailer 107. In these and other embodiments, the system 100 can be configured to provide human machine interface feedback (e.g., lights and/or sounds) to indicate when the pallet 120 has been correctly placed relative to the assembly 110.

In other embodiments, placing the pallet 120 in an area accessible to the assembly 110 can include placing the pallet 120 in an area that can be accessed by the assembly 110 when the commercial vehicle 101 is backed toward the pallet 120. In these embodiments, the commercial vehicle 101 and/or a driver of the commercial vehicle can use a variety of sensors (e.g., proximity sensors, computer vision, etc.) of the system 100 to (a) locate the pallet 120 (or an area at which the pallet 120 will be positioned) and (b) back the commercial vehicle 101 toward the pallet 120/area such that the assembly 110 is able to access the pallet 120. In some embodiments, a backup camera and/or a custom software overlay can be used to (a) aid the driver in locating the pallet 120/area, (b) aid the driver in backing the commercial vehicle 101 toward the pallet 120/area, and/or (c) aid the driver in aligning the commercial vehicle 101 with the pallet 120/area. In these and other embodiments, markers (e.g., retroreflective markers) can be attached to the pallet 120 and/or to the area to aid the commercial vehicle 101 and/or the driver in detecting and tracking the pallet 120/area during the alignment and/or loading process.

In these and other embodiments, placing the pallet 120 in an area accessible to the assembly 110 can include raising the pallet 120 to at least a minimum height off the ground so that the rollers 105 of the second portions 104 of the mechanical arms 102 on the assembly 110 can be positioned under the pallet 120. For example, the pallet 120 can be lifted to or above the minimum height using a pallet jack. As another example, the pallet 120 can be positioned on a loading platform (e.g., a 2×4 piece of wood) that provides the minimum amount of clearance for the rollers 105 to be positioned under the pallet 120.

Figure 7B:
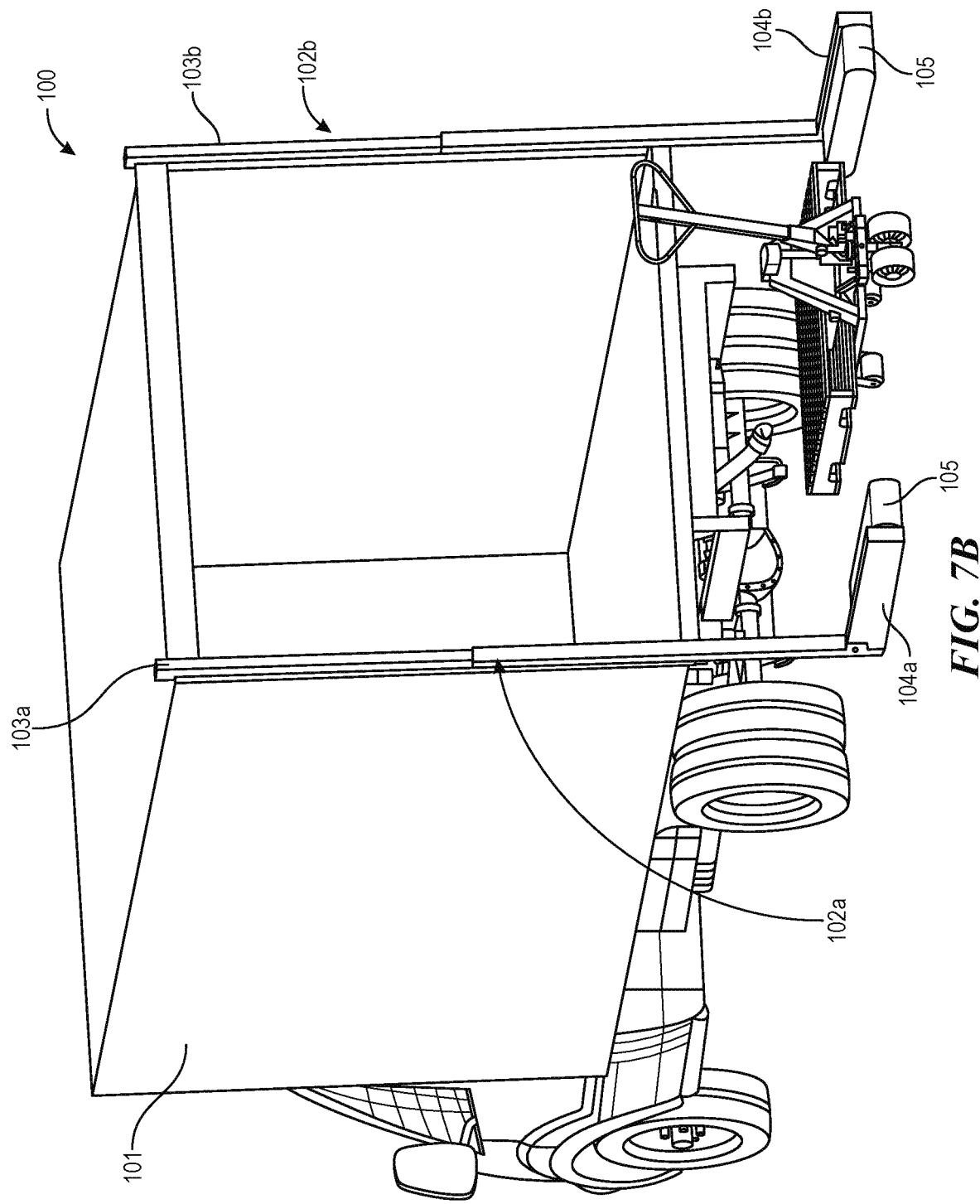

The method continues by lowering the second portions 104 of the mechanical arms 102 using the first portions 103 of the mechanical arms 102. In some embodiments, the second portions 104 can be lowered in their retracted or stowed positions as shown in FIG. 7A. Alternatively, one or more of the second portions 104 can be lowered toward the ground while the second portions 104 are in their deployed positions (e.g., as shown in FIG. 2I). In these and other embodiments, the second portions 104 can be lowered with the first portions 103 of the mechanical arms 102 at their widest positions (e.g., with the mechanical arms 102 at the ends of the width of the trailer 107 and/or the commercial vehicle 101) or at another location along the opening of the trailer 107. The second portions 104 can be lowered to a specified height (e.g., just above the ground; until the tops of the rollers 105, when the second portions 104 are in their deployed positions, are positioned at a height below the bottom surface of the pallet 120; etc.). In some embodiments, the system 100 can detect the ground using proximity sensors, computer vision, and/or other suitable sensors. In these and other embodiments, the system 100 can determine the height of the bottom surface and/or of the top surface of the pallet 120 (or of cargo on the pallet 120) off of the ground using, for example, computer vision and/or a comparison of the height of the rollers 105 to the top or bottom surfaces of the pallet 120 (or of cargo on the pallet 120). As shown in FIG. 7B, if the second portions 104 are not already positioned in their extended or deployed positions, the method can continue by deploying the second portions 104 by pivoting the second portions 104 away from the first portions 103 (e.g., until the second portions 104 are generally perpendicular to the first portions 103).

Figure 7C:
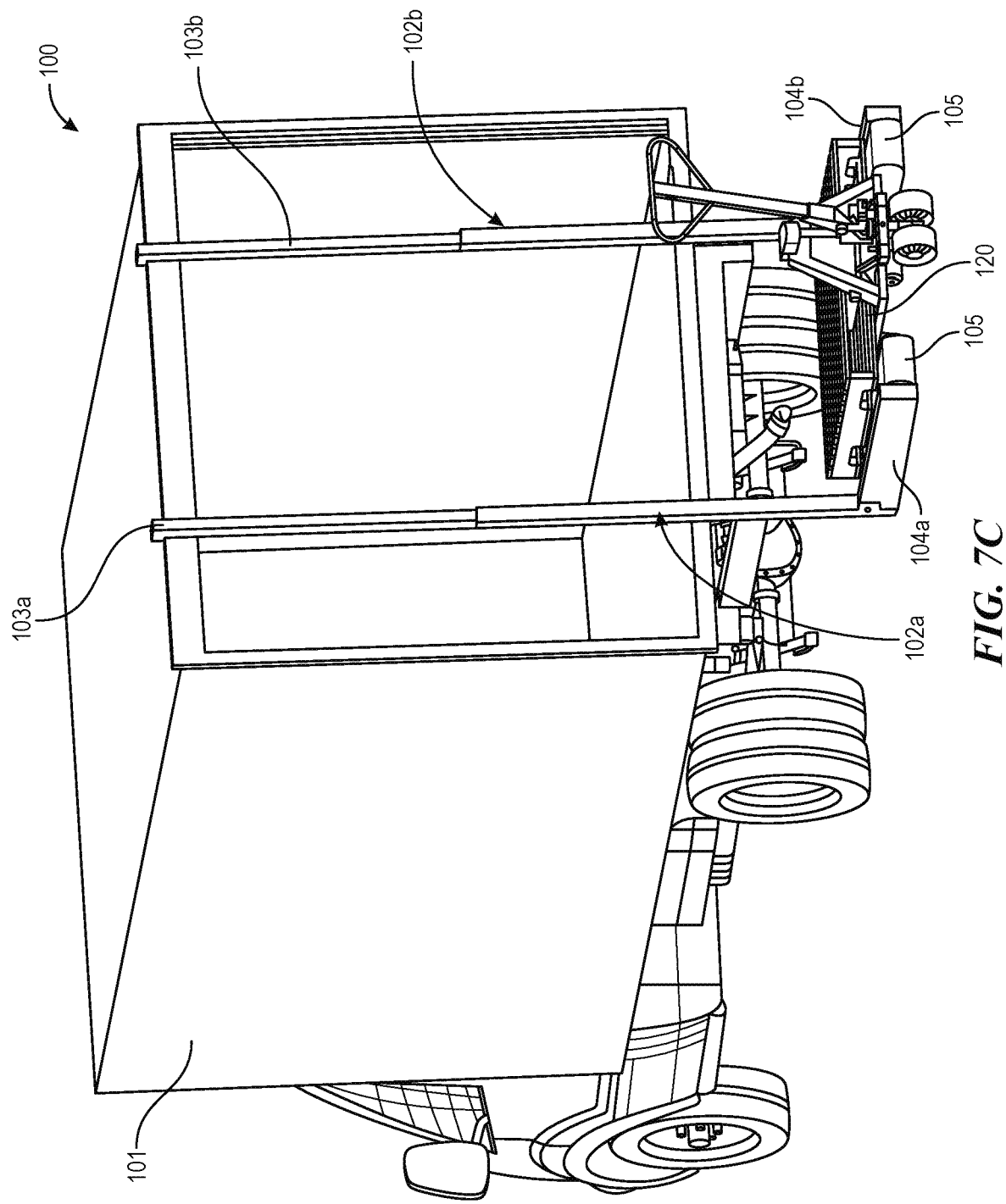

Referring now to FIG. 7C, the method can continue by laterally moving the first portions 103 of the mechanical arms 102 toward the pallet 120 until the rollers 105 are positioned underneath the pallet 120. This process may utilize proximity sensors, momentary switches, computer vision, artificial intelligence vision, hydraulic pressure sensors, and/or other suitable sensors or techniques for locating the pallet 120 and positioning the rollers 105 beneath the pallet 120. For example, laterally moving the first portion 103a of the first mechanical arm 102a toward the pallet 120 can include laterally moving the first portion 103a toward the pallet 120 while using proximity sensors, momentary switches, computer vision, hydraulic pressure sensors, and/or other suitable sensors to detect when the first mechanical arm 102 is within a threshold distance from the pallet 120. Continuing with this example, the first portion 103a can be laterally moved toward the pallet 120 until a corner of the pallet 120 is detected by the assembly 110 or the system 100 and/or until the sensors detect contact between (e.g., a body portion 234a (FIGS. 2J-2M) of) the second portion 104a and (e.g., a corner or side) of the pallet 120. The first portion 103b of the second mechanical arm 102b can be laterally moved toward the pallet 120 in a similar manner. When the assembly 110 and/or the system 100 has detected a corner of the pallet 120 proximate both of the mechanical arms 102a and 102b, the second portions 104 can be lifted to reduce a distance (e.g., to within one inch or 2.54 centimeters) between the top of the rollers 105 and the bottom of the pallet 120.

Continuing with the above example, the first portions 103 of the mechanical arms 102 can be laterally moved further toward the pallet 120 to exert a clamping force on the pallet 120. Assuming there is axial misalignment between the pallet 120 and the commercial vehicle 101, the clamping force is expected to rotate or shift the pallet 120 into alignment with the longitudinal axis of the commercial vehicle 101. This can ensure that the pallet 120 is straight when loaded into (and eventually unloaded out of) the trailer 107. As part of the process of exerting a clamping force on the pallet 120, the system 100 can monitor one or more sensors to determine when the pallet 120 is aligned with the longitudinal axis of the commercial vehicle 101. For example, the system 100 can monitor proximity sensors, hydraulic pressure sensors, momentary switches, computer vision, and/or other suitable switches to detect a second corner of the pallet 120 at each of the mechanical arms 102 and/or to otherwise determine when the mechanical arms 102 are pushing against the sides of the pallet 120 (indicating that the pallet 120 is no longer rotating or shifting into alignment with the longitudinal axis). At this point, lateral movement of the first portions 103 of the mechanical arms 102 toward the pallet 120 can be stopped.

The method can continue by lifting the second portions 104 of the mechanical arms 102 until the pallet 120 is resting on the rollers 105 of the second portions 104. The system 100 can detect loading of the pallet 120 onto the rollers 105 by monitoring hydraulic pressure sensors (e.g., in a hydraulic lifting circuit of the system 100). In some embodiments, the chain pushers 235 (FIGS. 2J-2M) on each of the second portions 104 can be positioned to engage with the pallet 120. For example, a chain pusher 235a can be positioned to engage the pallet 120 toward a back side (relative to the trailer 107) of the pallet 120 (e.g., to prevent the pallet 120 from sliding or shifting on the rollers 105 away from the trailer 107). As another example, a chain pusher 235b can be positioned to engage the pallet 120 toward a front side (relative to the trailer 107) of the pallet 120 (e.g., to prevent the pallet 120 from sliding or shifting on the rollers 105 toward the trailer 107). In some embodiments, the chain pushers 235 can be positioned to engage the pallet 120 before lifting the rollers 105 of the second portions 104 into contact with the pallet 120. After the pallet 120 is loaded onto the rollers and/or after the chain pushers 235 are positioned to engage the pallet 120, the method can optionally continue by instructing a user to remove the pallet jack (assuming one was used).

Figure 7D:
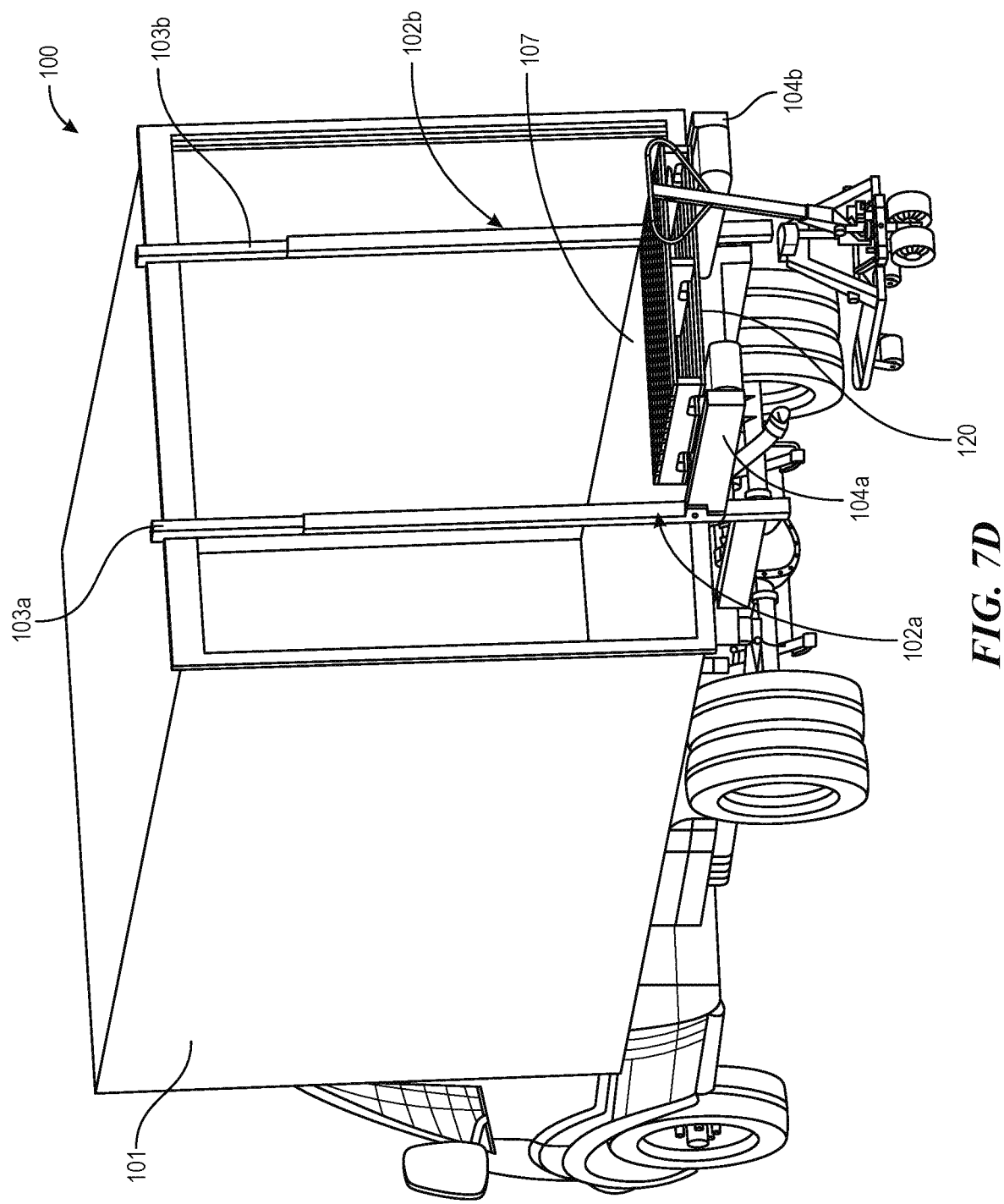

Referring to FIG. 7D, the method continues by lifting the second portions 104 of the mechanical arms 102 (using the first portions 103) to lift the pallet 120 to a height aligning with an opening of the trailer 107. Lifting the pallet 120 can include tracking (e.g., using computer vision, AI vision, and/or other suitable sensors) the height of the second portions 104 relative to a reference point or object (e.g., a reference point or object internal the trailer 107). In these and other embodiments, lifting the pallet 120 can include tracking the height of a top or bottom surface of the pallet 120 (or of cargo on the pallet 120).

Figure 7E:
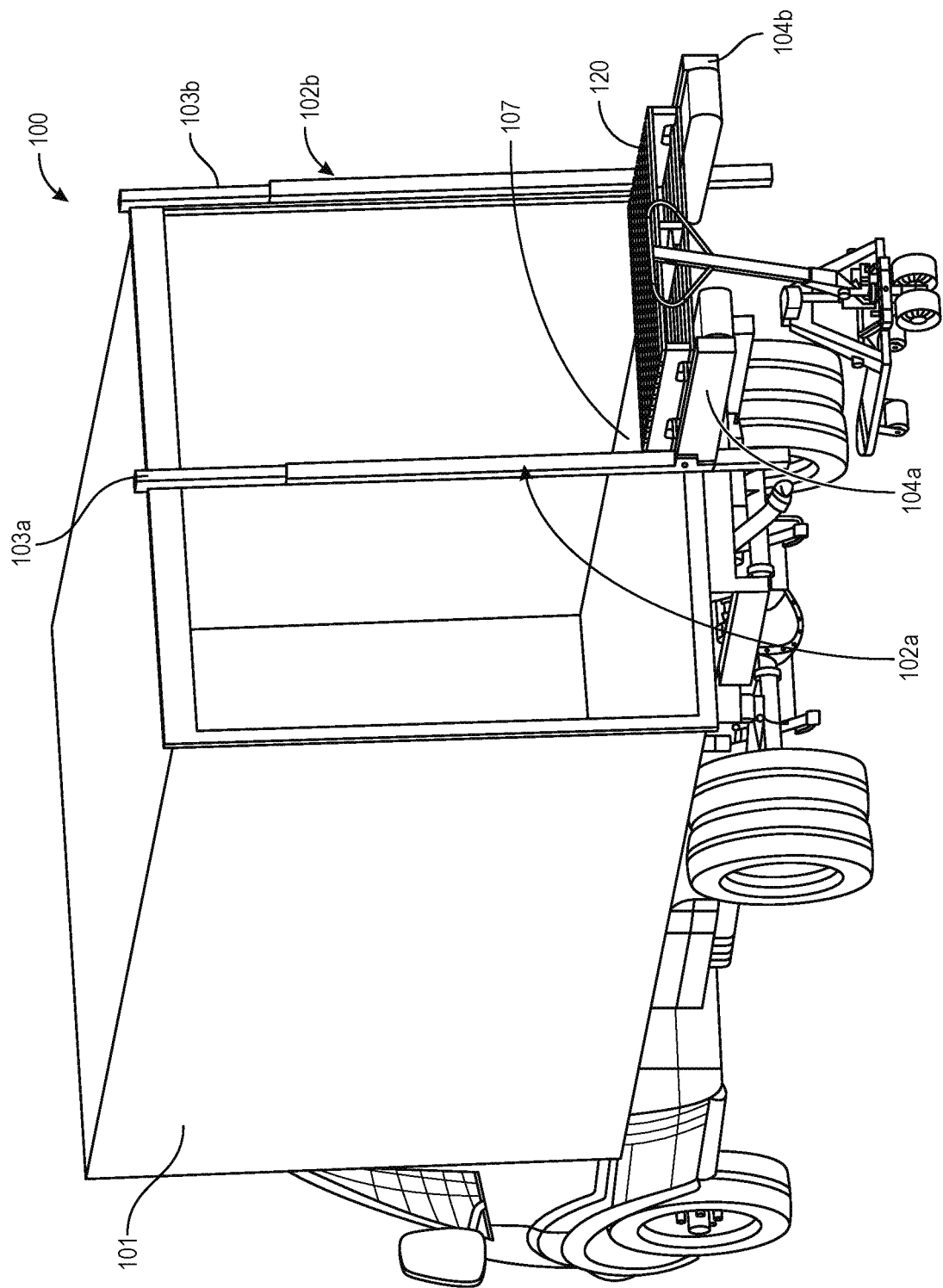

Referring to FIG. 7E, the method can optionally continue by laterally repositioning the pallet 120 with respect to the opening of the trailer 107, such as by laterally shifting or moving the first portions 103 of the mechanical arms 102 in unison and in the same direction. As discussed above, the interior of the trailer 107 can include and/or be arranged in one or more pallet columns 380 (FIG. 3A), and/or the system 100 can track positions of pallets (not shown) already loaded into the trailer 107. As such, in some embodiments, the system 100 can be aware of which pallet column 380 in the trailer 107 has an open position for the pallet 120. Additionally, or alternatively, the interior of the trailer 107 can include the pallet carousel system 370 (FIG. 3A) that can rearrange pallets within the trailer 107 so as the vacate an opening in one of the pallet columns 380 near the opening of the trailer 107 for the pallet 120 to be transferred into the trailer 107. Thus, the method can include laterally shifting the mechanical arms 102 to laterally align the pallet 120 with an opening in one of the pallet columns 380 of the trailer 107.

Figure 7F:
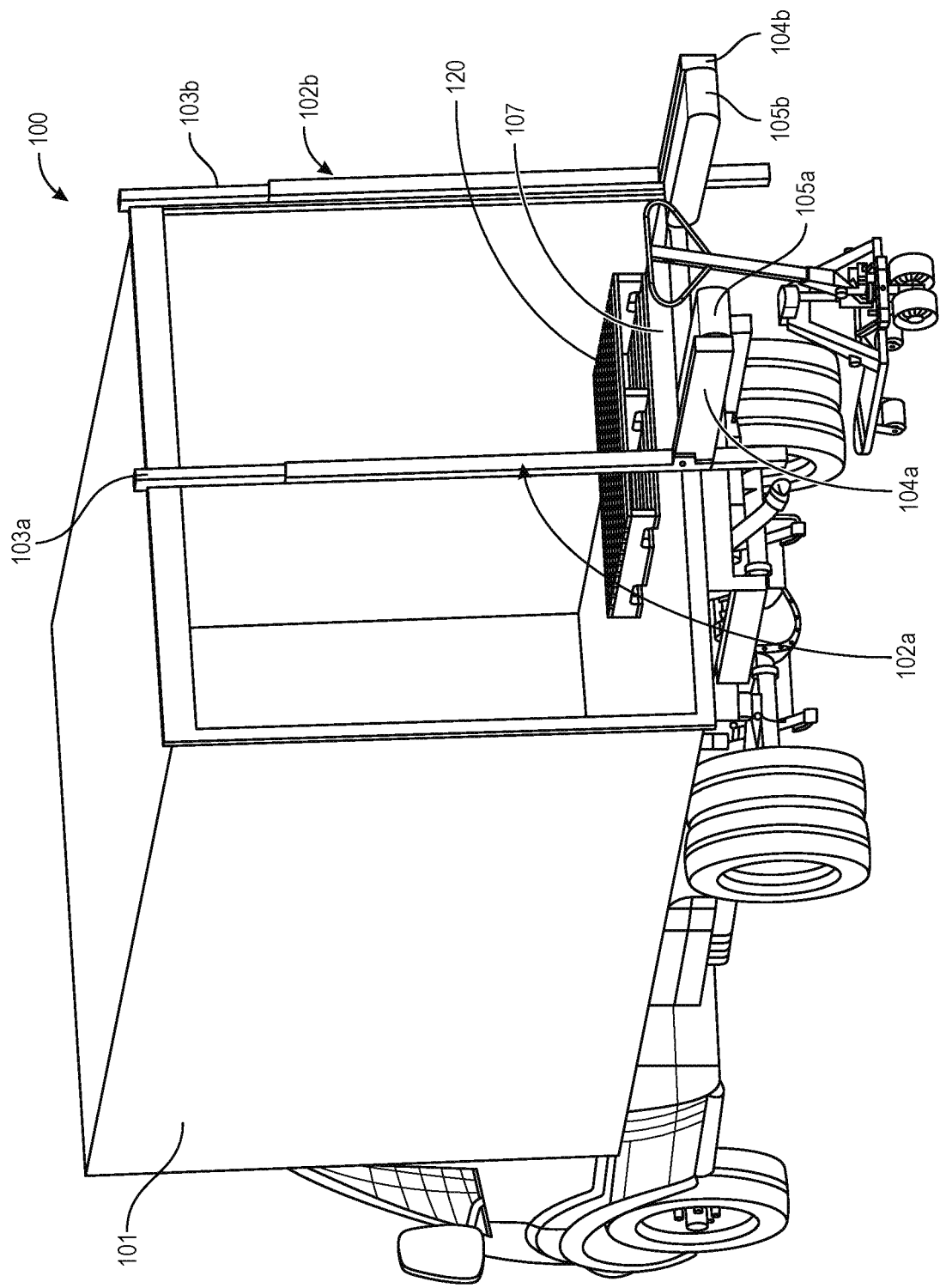
Figure 7G:
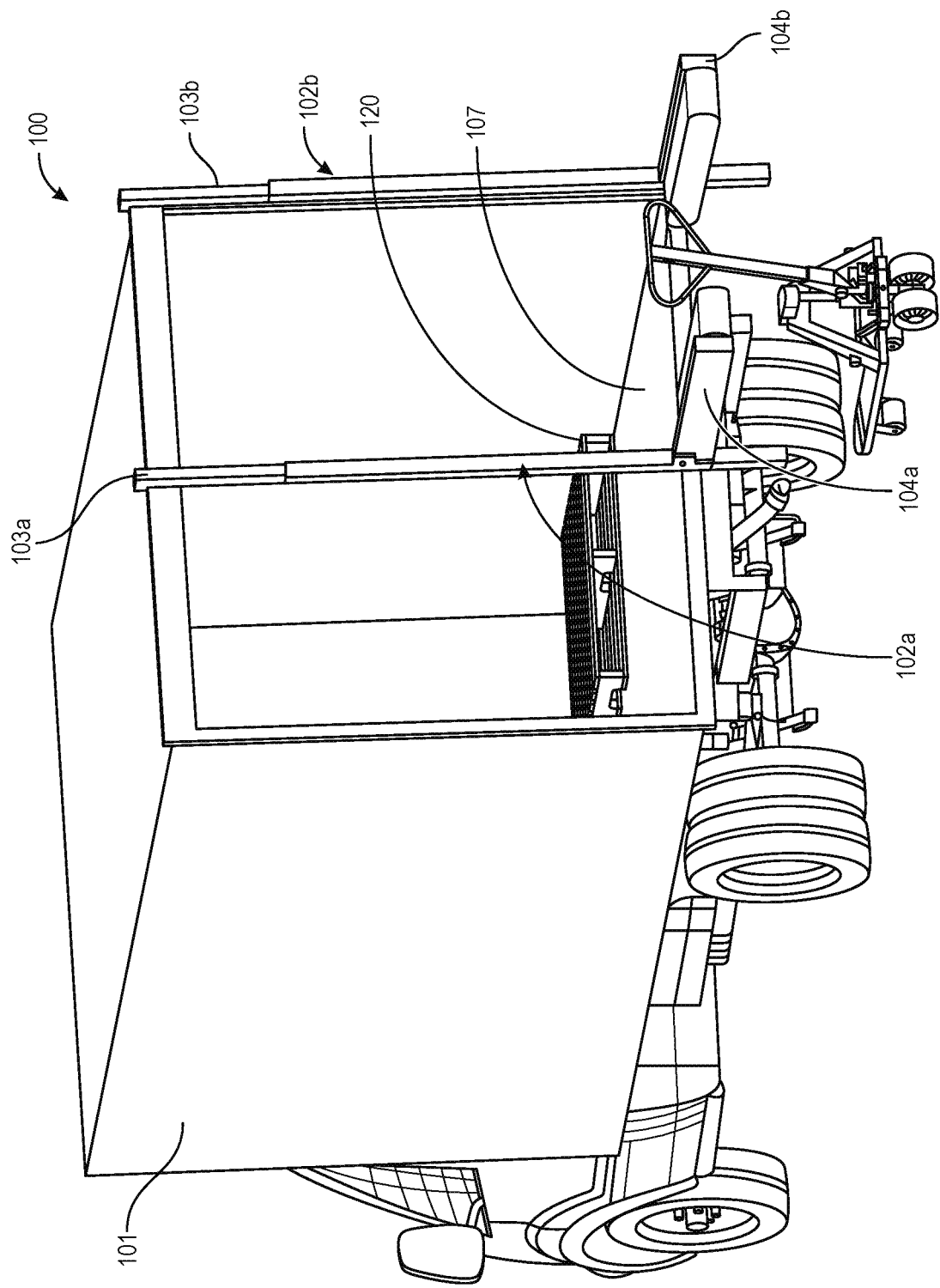

Referring to FIG. 7F, the method can continue by conveying the pallet 120 into the trailer 107. In some embodiments, conveying the pallet 120 into the trailer 107 includes driving the chains 236 (FIGS. 2J-2M) of the second portions 804 to push, using the chain pushers 235 (FIGS. 2J-2M) of the second portions 104, the pallet 120 along the rollers 105 of the second portions 104 and at least part of the way into the trailer 107 and/or onto the internal chains 351 and/or 352 (FIG. 3A) corresponding to the selected pallet column 380 (e.g., while the internal chains 351 and/or 352 can freely move). Alternatively, in embodiments having active rollers 105, conveying the pallet 120 into the trailer 107 can include driving the rollers 105 to shift the pallet 120 at least part of the way into the trailer 107 and/or onto the internal chains 351 and/or 352 corresponding to the selected pallet column 380 (e.g., while the internal chains 351 and/or 352 can freely move). In some embodiments, conveying the pallet 120 into the trailer 107 can include conveying the pallet 120 into the trailer 107 using a passive roller 240 (FIG. 2M) positioned between the rollers 105 and the interior of the trailer 107. In these and other embodiments, after the pallet 120 has been conveyed a set distance into the interior of the trailer 107, the internal chains 351 and/or 352 corresponding to the selected pallet column 380 within the trailer 107 can be used to convey the pallet 120 the rest of the way into the trailer 107, as discussed above. The method can optionally include conveying the pallet 120 deeper into the trailer (as shown in FIG. 7G) and/or to another position within the trailer 107, such as using the carousel system 370 discussed above. In some embodiments, the method continues by (a) retracting the second portions 104 of the arms (e.g., until the second portions 104 are oriented generally parallel with the first portions 103 of the arms 102) and/or (b) laterally moving one or more of the arms 102 (e.g., such that the arms 102 are positioned at (or are returned to) the sides of the opening to trailer 107 of the commercial vehicle 101, as shown in FIG. 1).

In some embodiments, one or more operations of the method described above can be autonomously executed by the system 100. Additionally, or alternatively, one or more operations of the method described above can be executed at the direction of an operator or user of the system 100 (e.g., in response to commands input and/or received form the operator or user). In these and still other embodiments, one or more operations of the method can be performed by the operator or user, and/or using inputs entered by and received from the operator or user.

A method of unloading the pallet 120 from the trailer 107 can be similar to the above method of loading the pallet 120 into the trailer 107, but in reverse. For example, a method of unloading the pallet 120 can include (a) rearranging pallets within the trailer 107 and/or positioning the pallet 120 proximate the opening of the trailer 107 (e.g., using the carousel system 370 within the interior of the trailer 107); (b) deploying the second portions 104 of the arms 102; (c) raising or lowering the second portions 104 of the arms 102 such that the rollers 105 of the second portions 104 are positioned at a height above the ground at which the pallet 120 can be pushed out of the trailer 107 and onto the rollers 105; and/or (d) laterally shifting the first portions 103 of the mechanical arms 102 such that the rollers 105 of the second portions 104 are aligned with the width of the pallet 120. As discussed above, the position of the pallet 120 within the trailer 107 and/or other information of the pallet 120 (e.g., width and/or height information of the pallet 120 and/or cargo on the pallet 120) can be tracked (e.g., using powered RFID tags, barcodes, retroreflective sensors, proximity sensors, computer vision, etc.). In these embodiments, the position and/or other information can be used by the system 100 to align the first portions 103 and the second portions 104 of the mechanical arms 102 (a) along the opening of the trailer 107 and (b) with the correct pallet column 380 in the trailer 107 to receive the pallet 120 from within the trailer 107.

In some embodiments, the method of unloading the pallet 120 can include (a) extending the internal chains 351 and/or 352 corresponding to the selected pallet column 380 toward the rollers 105 of the second portions 104 of the mechanical arms 102; (b) pushing the pallet 120 out of the trailer 107 (e.g., onto a passive roller 240 (FIG. 2M)) and onto the rollers 105 of the second portions 104 using the internal chains 351 and/or 352; (c) using a hydraulic or electric ram/arm to push the pallet 120 fully onto the rollers 105 (e.g., in embodiments implementing passive rollers 105); (c) driving the rollers 105 away from the trailer 107 to pull the pallet 120 fully onto the rollers 105 in embodiments implementing driven rollers 105; and/or (d) positioning and engaging chain pushers 235 to maintain the pallet 120 on the rollers 105. In these and other embodiments, the method of unloading the pallet 120 can include (i) laterally shifting the pallet 120 (e.g., to align the pallet 120 with a deployment site or platform on or near the ground), such as by laterally shifting or moving the first portions 103 of the mechanical arms 102 in unison and in the same direction; and/or (ii) lowering the second portions 104, using the first portions 103, toward the ground and/or toward a deployment site. In some embodiments, laterally shifting the pallet 120 using the mechanical arms 102 and/or lowering the second portions 104/the pallet 120 toward the ground can include aligning the mechanical arms 102 with the deployment site/platform such that the deployment site/platform is positioned between the second portions 104 to enable setting the pallet 120 onto the deployment site/platform. In these and other embodiments, laterally shifting the pallet 120 using the mechanical arms 102 and/or lowering the second portions 104/the pallet 120 toward the ground can include (a) aligning the mechanical arms 102 in front of the deployment site/platform such that the pallet 120 can be rolled away from the trailer 107 and onto deployment site/platform, or (b) lowering the pallet 120 to a specific height at a location at which a pallet jack or other lifting device can be placed through or under the pallet 120.

In these and other embodiments, the deployment site can be identified using various sensors (e.g., computer vision, proximity sensors, etc.) of the system 100, and/or the system 100 can determine lateral and axial distance between the mechanical arms 102 and the deployment site/platform. If the system 100 determines that the axial distance to the deployment site/platform is too great (e.g., indicating that the deployment site/platform is positioned too far away from the commercial vehicle 101) or determines that the deployment site/platform is outside of the lateral range of motion of the assembly 110, the system 100 can prevent loading the pallet 120 onto the rollers 105, prevent lowering of the pallet 120 toward the ground, and/or prevent lateral moving the pallet 120 using the mechanical arms 102. Additionally, or alternatively, the system 100 can notify an operator or user of the error (e.g., through human machine interface alerts, such as lights and/or sounds). The system 100 can perform a similar process when the system 100 determines that the deployment site/platform is too wide for the pallet 120, or is too wide for the second portions 104 to set the pallet 120 onto the deployment site/platform. For example, the system 100 can prevent manipulation of the pallet 120 and/or can notify an operator or user of the system 100 when the system 100 determines that the deployment site/platform is greater than approximately 36 inches (91.5 centimeters) wide for a pallet 120 having a width of approximately 40 inches (101.6 centimeters) and/or that the deployment site/platform is greater than approximately 32 inches (81.3 centimeters) wide for a pallet 120 having a width of approximately 36 inches (91.5 centimeters).

The method of unloading the pallet 120 can additionally, or alternatively, include transferring the pallet 120 onto the deployment site/platform by lowering the second portions 104 such that the weight of the pallet 120 is no longer on the rollers 105 of the second portions 104, and/or by shifting or rolling the pallet 120 off of the rollers 105 (e.g., by driving the rollers 105 and/or by driving the chain 236 to push the pallet 120 off of the rollers 105 using the chain pushers 235). In these and other embodiments, the method of unloading the pallet 120 can include laterally moving the second portions 104 away from pallet 120, lifting the second portions 104 away from the ground, retracting the second portions 104 to their stowed positions, and/or laterally shifting the first portions 103 to their stowed positions at the edges of the trailer 107.

In some embodiments, one or more operations of the method of unloading a pallet 120 described above can be autonomously executed by the system 100. Additionally, or alternatively, one or more operations of the method of unloading the pallet 120 described above can be executed at the direction of an operator or user of the system 100 (e.g., in response to commands input and/or received form the operator or user). In these and still other embodiments, one or more operations of the method of unloading the pallet 120 can be performed by the operator or user, and/or using inputs entered by and received from the operator or user.

Figure 8A:
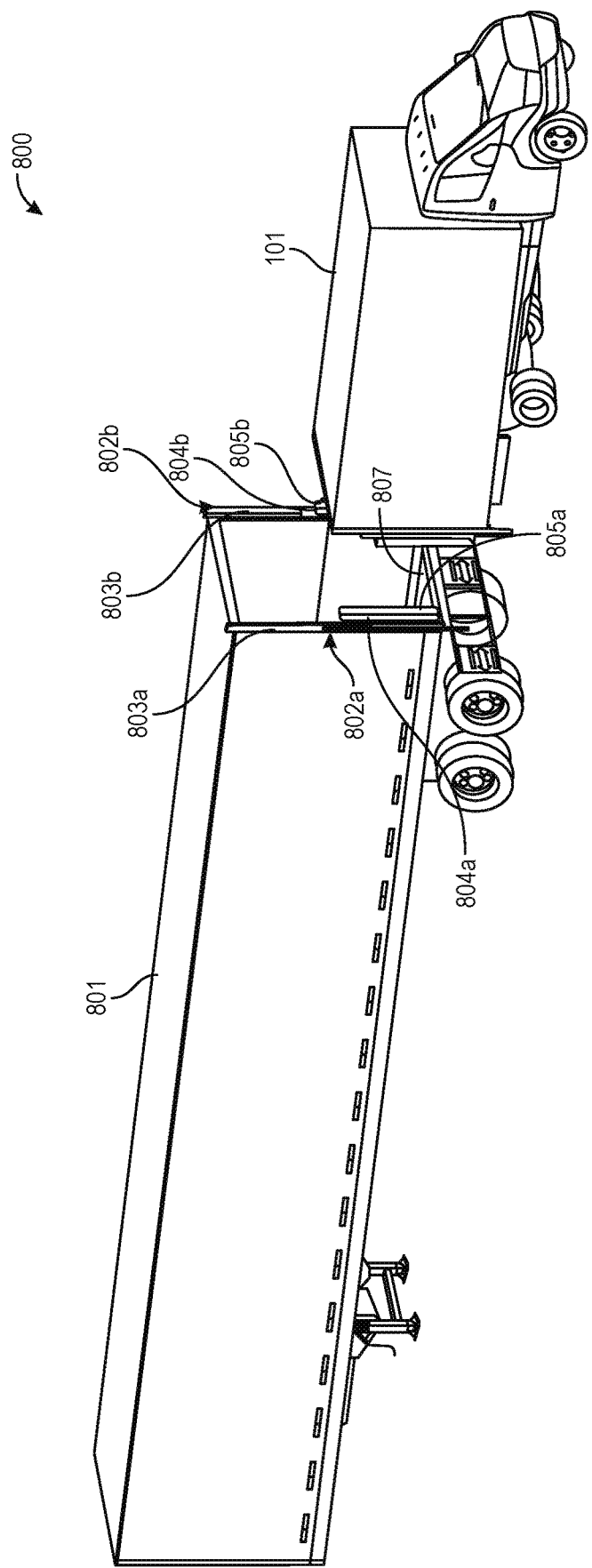
FIGS. 8A-8K illustrate a method of transferring a pallet of cargo between commercial vehicles in accordance with various embodiments of the present technology.
Figure 8B:
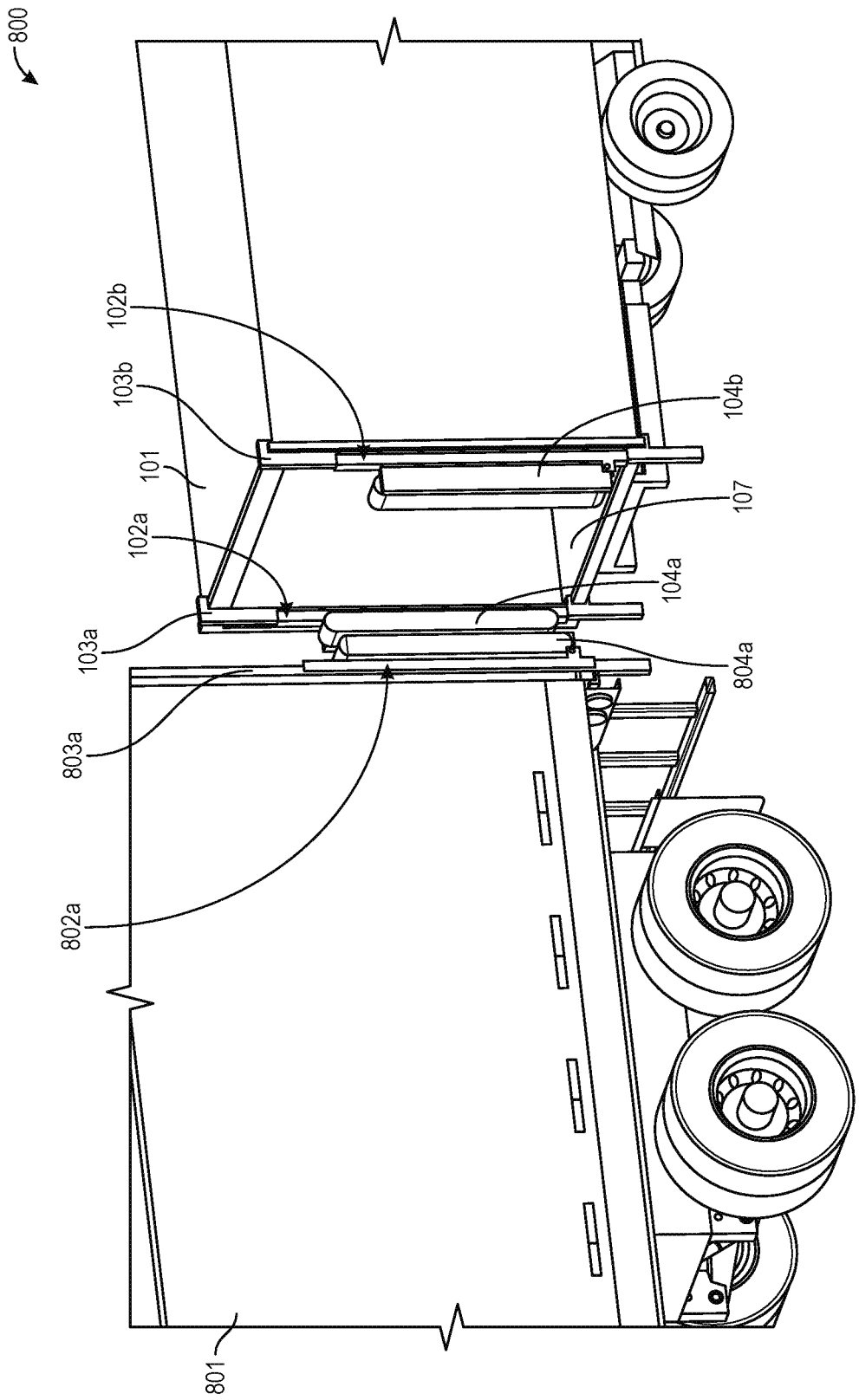

FIGS. 8A-8K illustrate (a) another commercial vehicle loading and unloading system 800 ("the system 800") configured in accordance with various embodiments of the present technology, and (b) a method of transferring a pallet of cargo between commercial vehicles in accordance with various embodiments of the present technology. Referring to FIG. 8A, the system 800 is similar to the system 100 of FIGS. 1-1H described above except that the system 800 includes a second commercial vehicle 801 (e.g., a semi-truck trailer, small moving truck, van, or other suitable commercial vehicle) having respective mechanical arms 802 with first portions 803, second portions 804, and rollers 805. The mechanical arms 802 of the second commercial vehicle 801 are generally similar to the mechanical arms 102 of the commercial vehicle 101, and can be used to load and/or unload pallets and/or other items into or out of a trailer 807 of the second commercial vehicle 801 in a manner generally similar to the system 100 of FIGS. 1-2M. In some embodiments, the mechanical arms 802 of the second commercial vehicle 801 can be omitted, or the mechanical arms 102 of the commercial vehicle 101 can be omitted.

A method of transferring a pallet of cargo between commercial vehicles 801 and 101 will now be described with reference to FIGS. 8A-8K. Referring to FIG. 8A, a commercial vehicle 101 can back up toward a second commercial vehicle 801 such that an opening into a trailer 107 of the commercial vehicle 101 is generally aligned with an opening to a trailer 807 of the second commercial vehicle 801. Another view of such general alignment is provided in FIG. 8B.

Figure 8C:
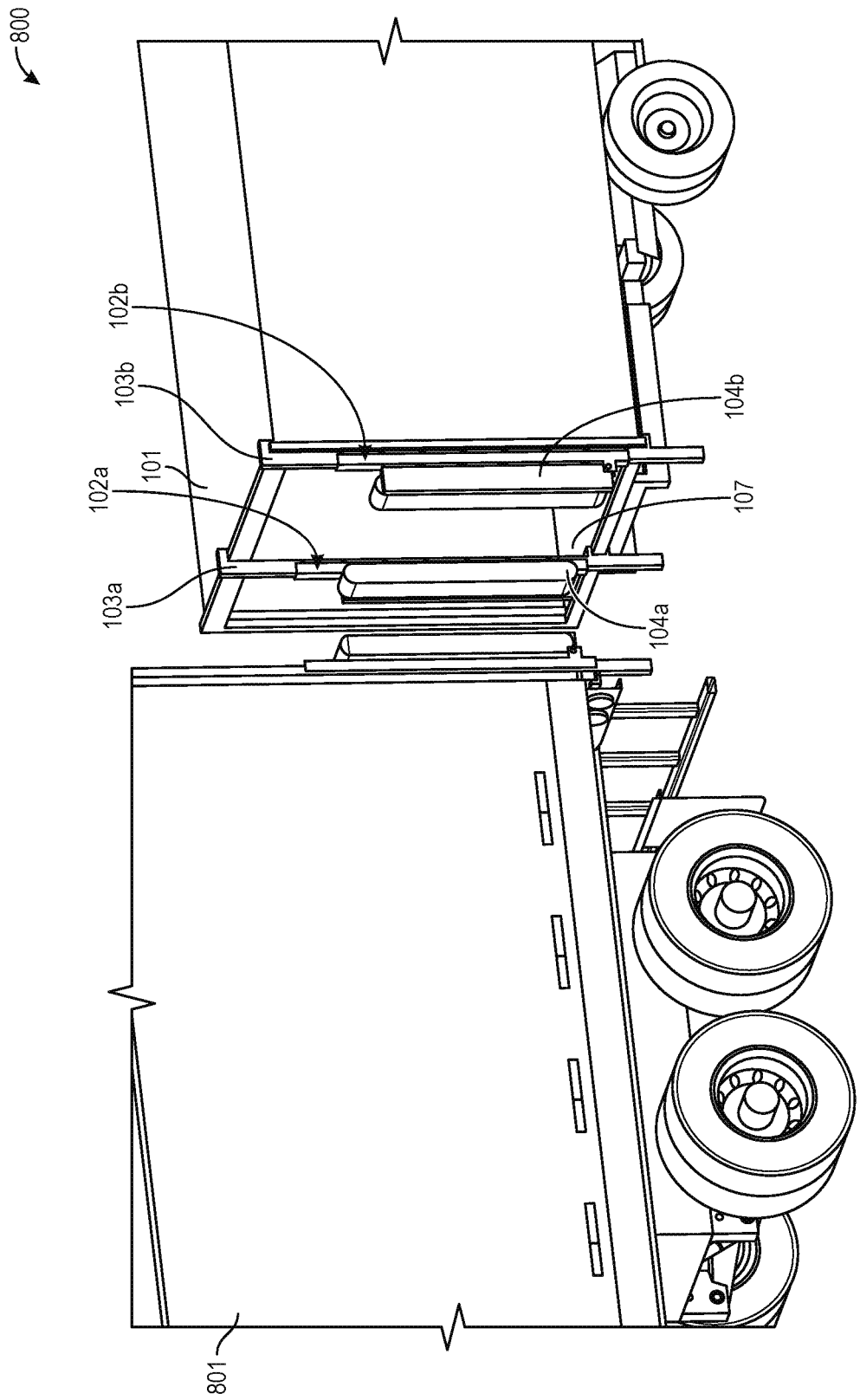
Figure 8D:
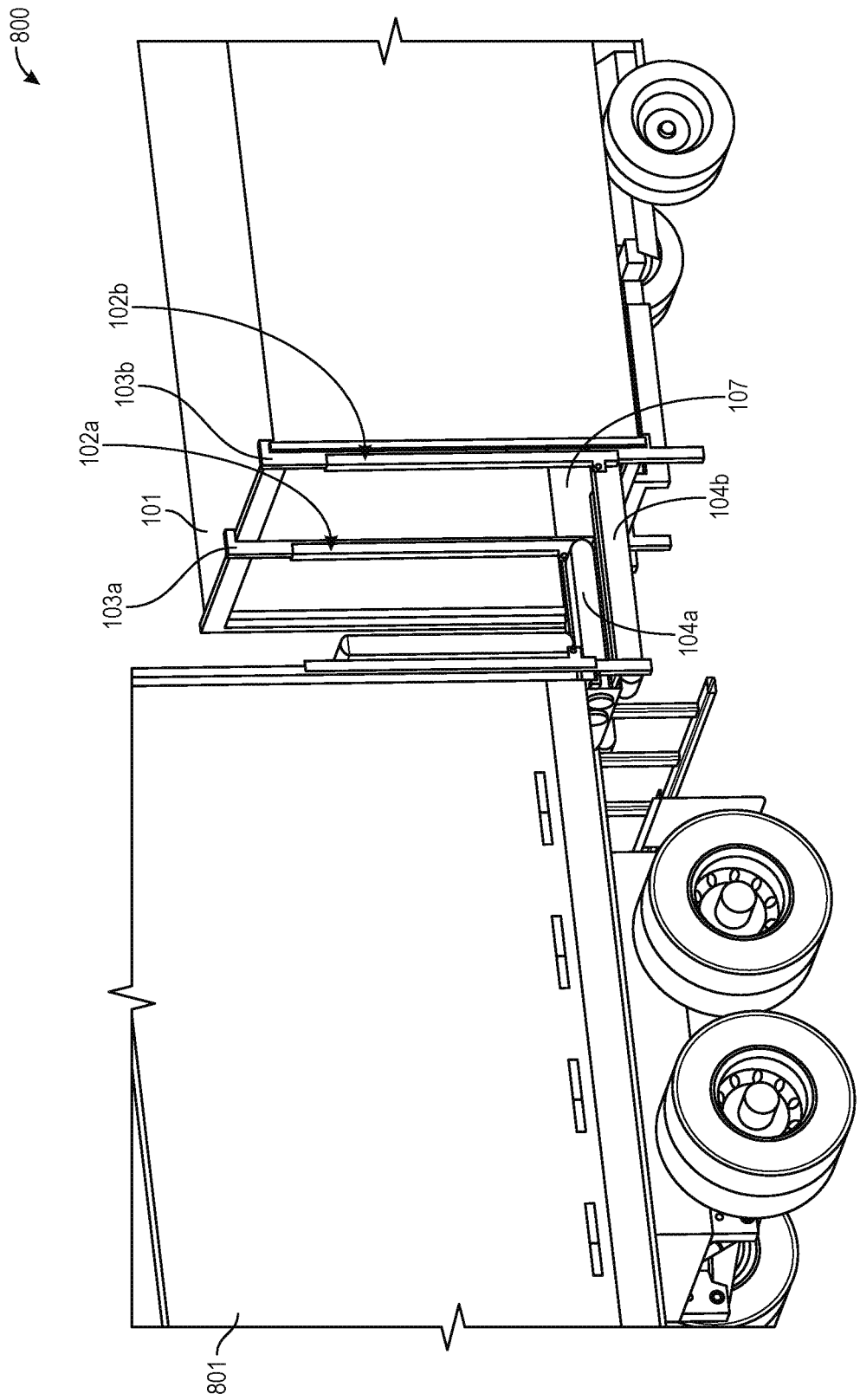

As shown in FIG. 8C, one of both of the first portions 103 of the mechanical arms 102 on the commercial vehicle 101 can be moved laterally. In the illustrated embodiment, only one of the first portions 103 are moved laterally to reposition the corresponding mechanical arm 102. In some embodiments, the mechanical arm(s) 102 can be moved laterally such that the second portions 104 of the arms 102 are generally aligned with a width of a pallet or other item to be unloaded from the trailer 807 of the second commercial vehicle 801. As shown in FIG. 8D, the second portions 104 of the arms 102 can be deployed by pivoting the second portions 104 away from the first portions 103 (e.g., until the second portions 104 are oriented generally perpendicular to the first portions 103). In some embodiments, the second portions 104 can be deployed before moving the first portions 103 of the arms 102 laterally.

Figure 8E:
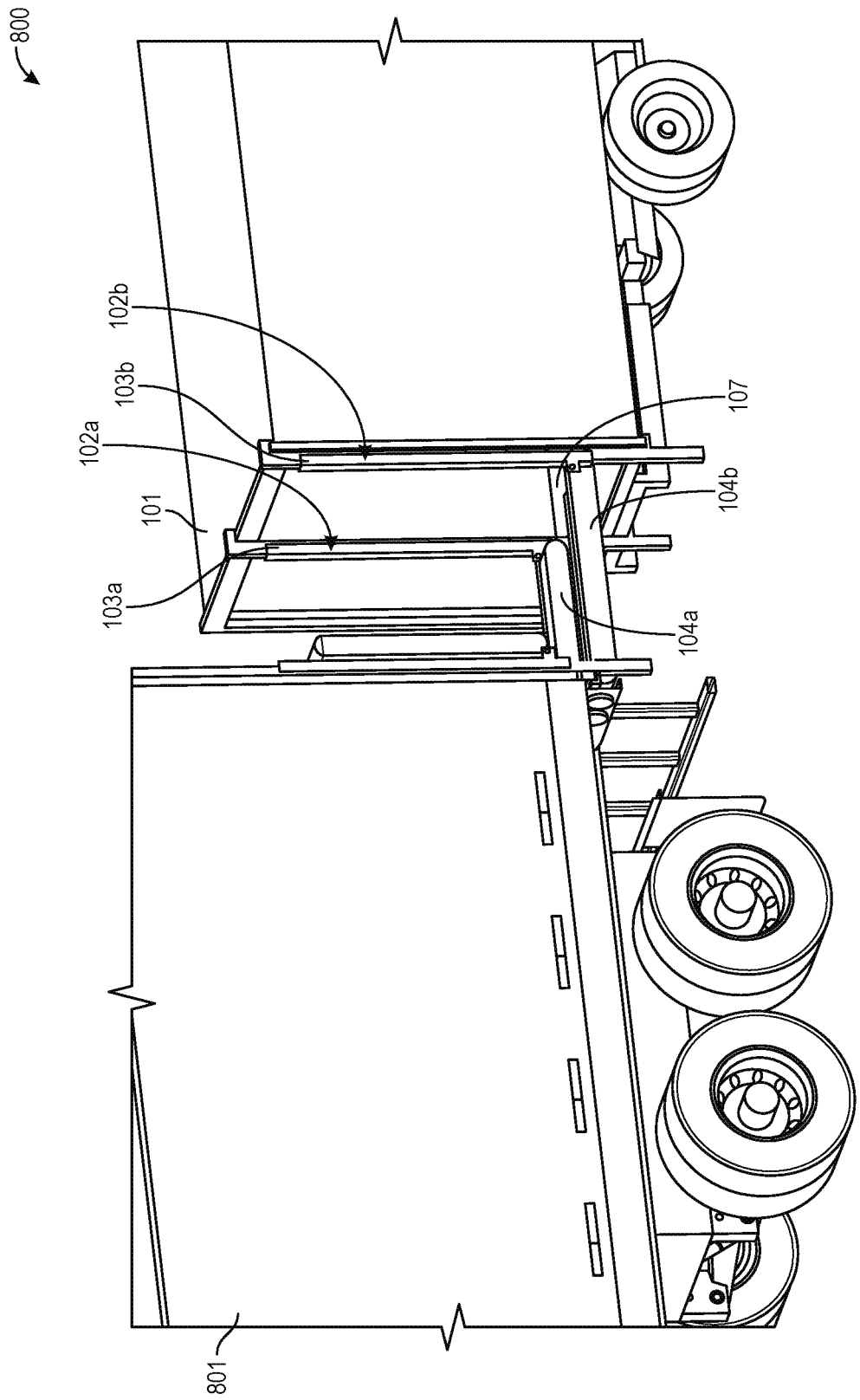

The second portions 104 of the arms 102 can be aligned with a height of the pallet to be unloaded from the trailer 807 of the second commercial vehicle 801. For example, as shown in FIG. 8E, the second portions 104 of the arms can be raised until they are generally level with the bottom of the opening into the trailer 807 of the second commercial vehicle 801. The second portions 104 can be aligned using the first portions 103 of the arms 102. In some embodiments, ends of the second portions 104 of the arms 102 opposite the ends that are attached to the first portions 103 of the arms 102 can be positioned immediately adjacent or within a specified distance of the opening into the trailer 807 of the second commercial vehicle 801 such that there is not a gap (or there is a small or negligible gap) between the ends of the second portions 104 and the trailer 807 of the second commercial vehicle 801.

Figure 8F:
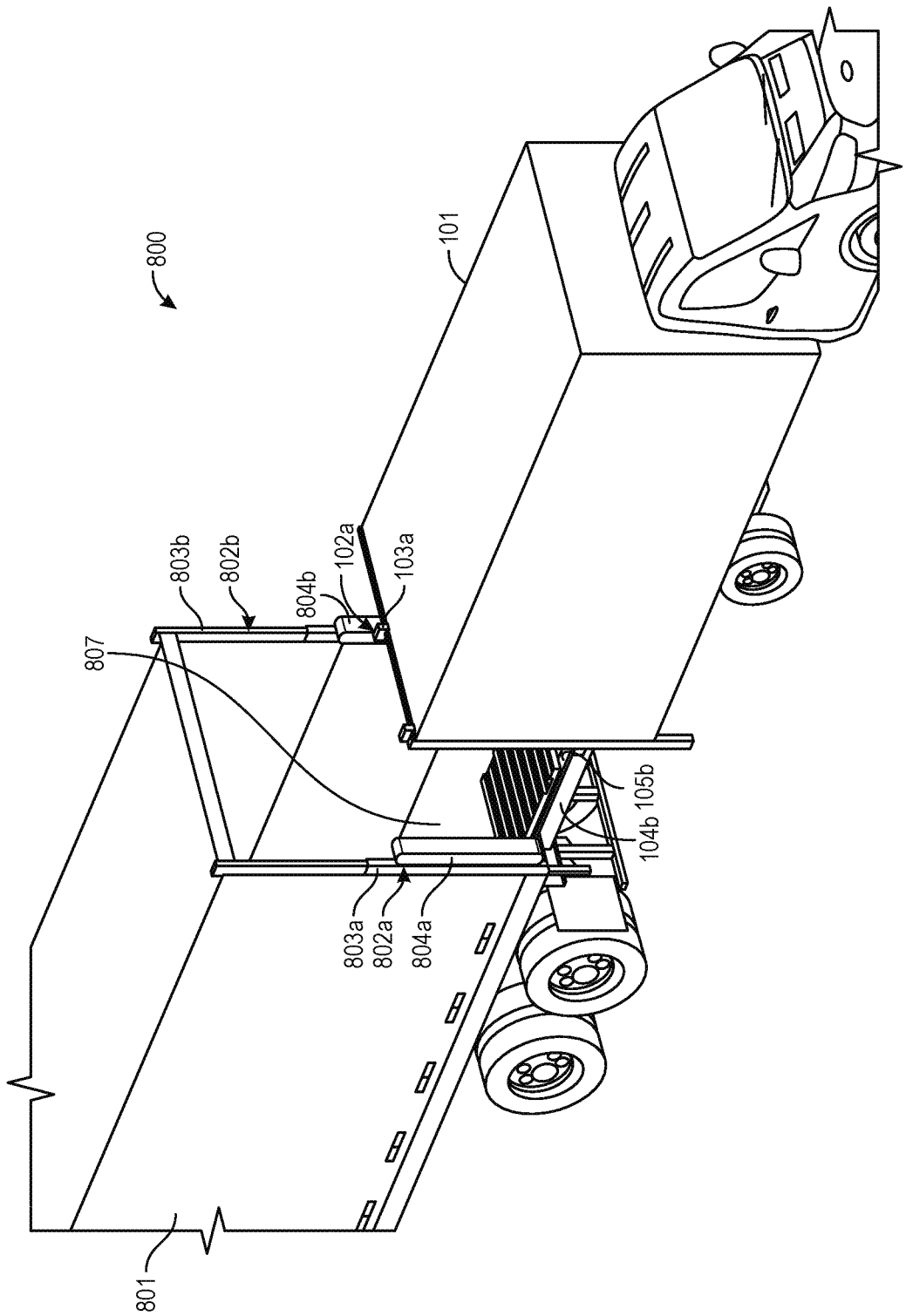

As shown in FIG. 8F, a pallet can be conveyed out of the trailer 807 of the second commercial vehicle 801 onto the second portions 104 of the arms 102 of the commercial vehicle 101. In some embodiments, the pallet can be conveyed out of the trailer 807 using a carousel system (not shown) within the trailer 807 similar to the carousel system 370 described above with reference to FIGS. 3A-5. In these and other embodiments, the pallet can be conveyed out of the trailer 807 using rollers 105 on the second portions 104 of the arms 102, using a passive roller (not shown) of the second commercial vehicle 801 positioned between the second portions 104 and the carousel system in the trailer 807, and/or using a hydraulic or electric ram/arm of the second commercial vehicle 801.

Figure 8G:
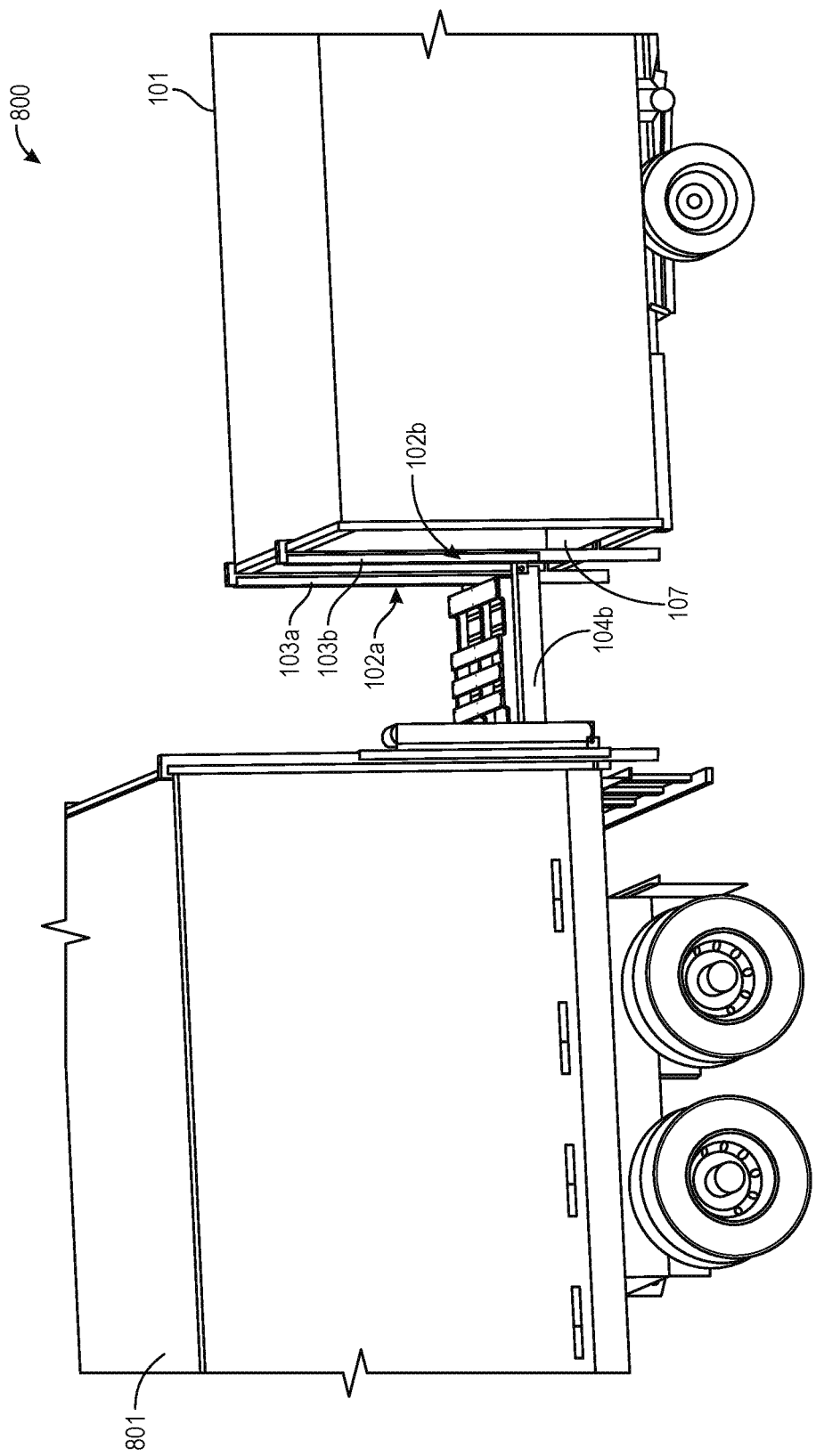
Figure 8H:
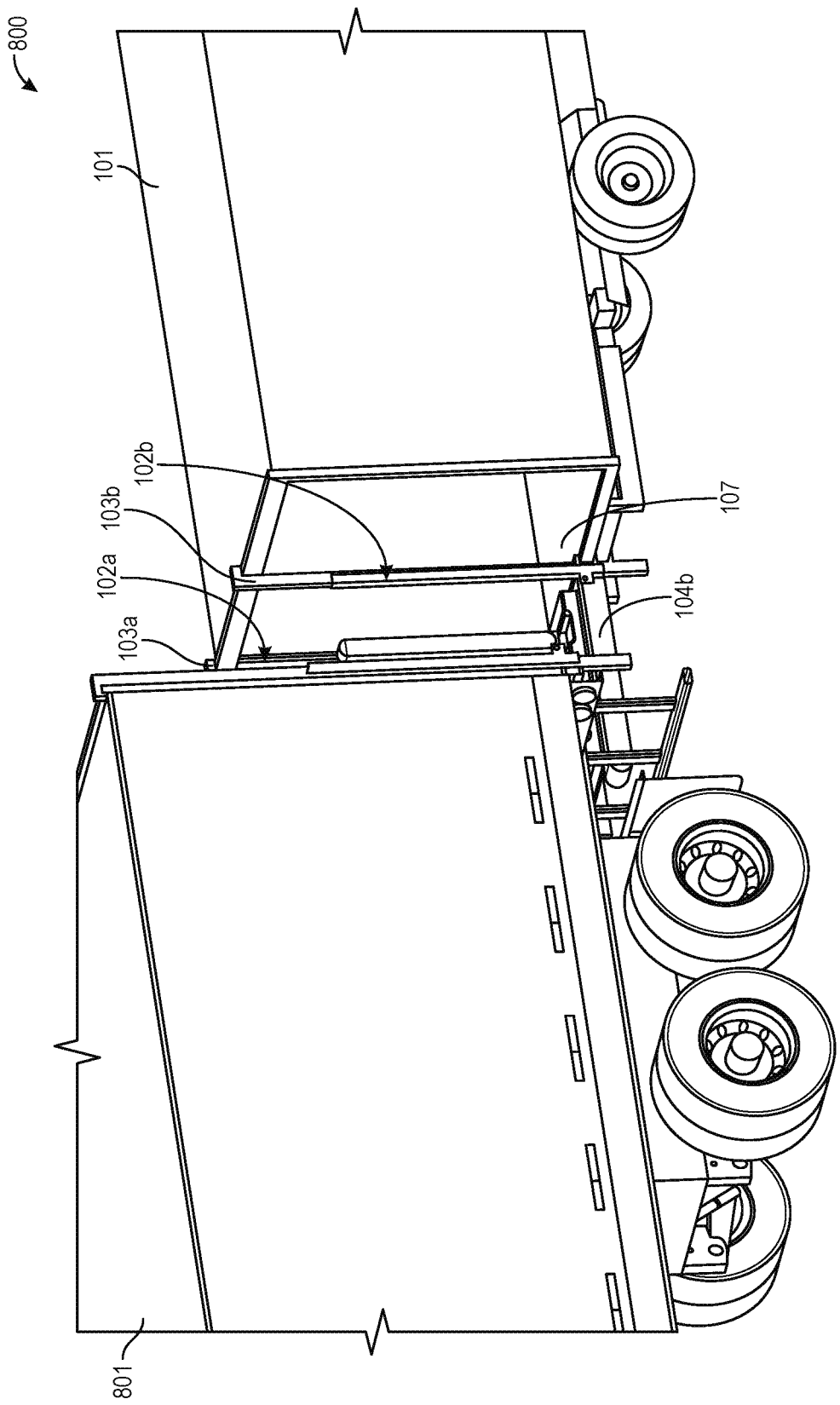

As shown in FIG. 8G, the method can optionally include laterally repositioning the pallet with respect to the opening of the trailer 107 of the commercial vehicle 101, such as by shifting or moving the first portions 103 of the mechanical arms 102 laterally. In the event that the bottom of the trailer 807 of the second commercial vehicle 801 is located at a height that differs from the height at which the bottom of the trailer 107 of the commercial vehicle 101 is positioned, the pallet can be raised or lowered by retracting or extending the first portions 103 of the mechanical arms 102 of the commercial vehicle 101 such that the pallet is aligned with the opening into the trailer 107 of the commercial vehicle 101, as shown in FIG. 8H.

Figure 8I:
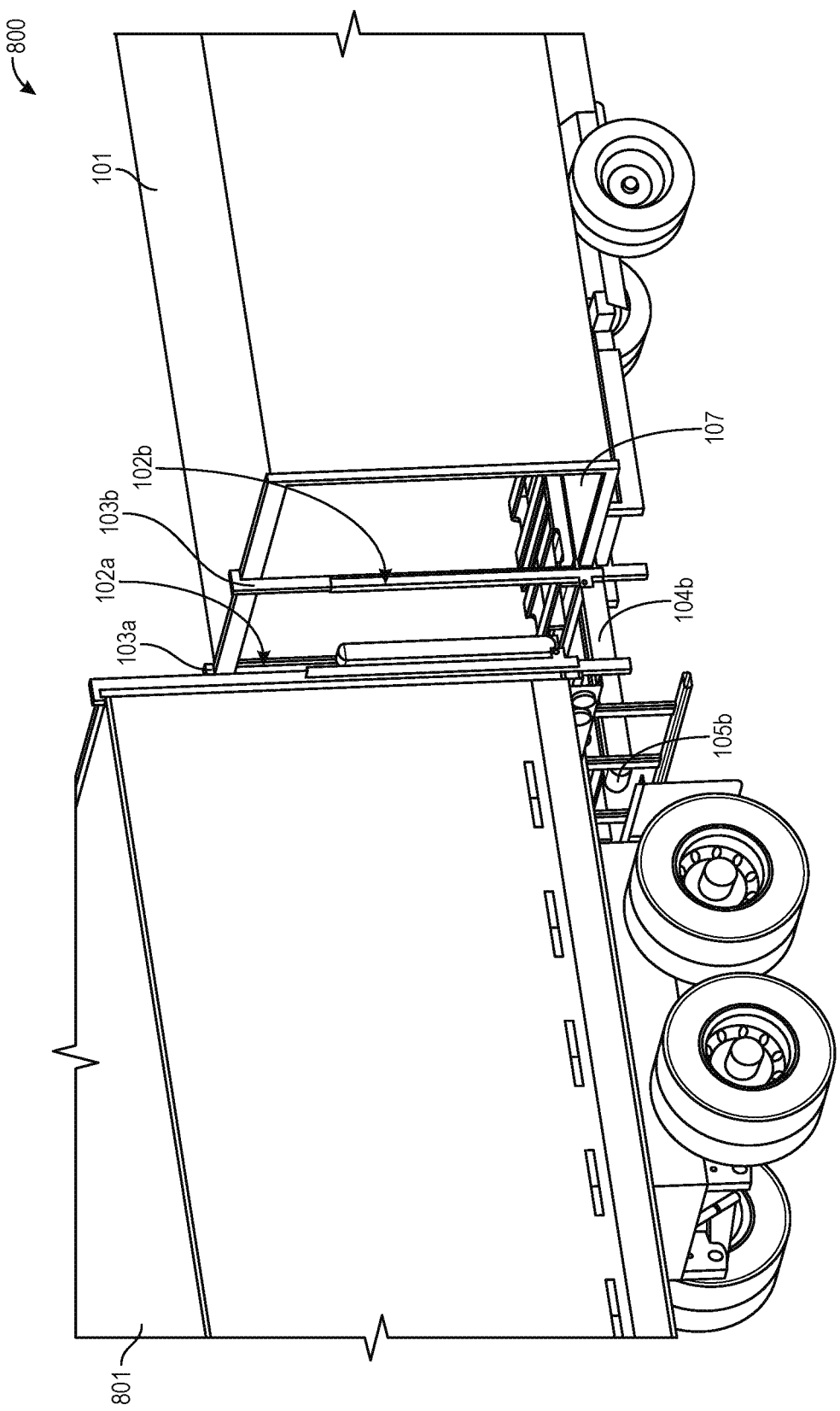
Figure 8J:
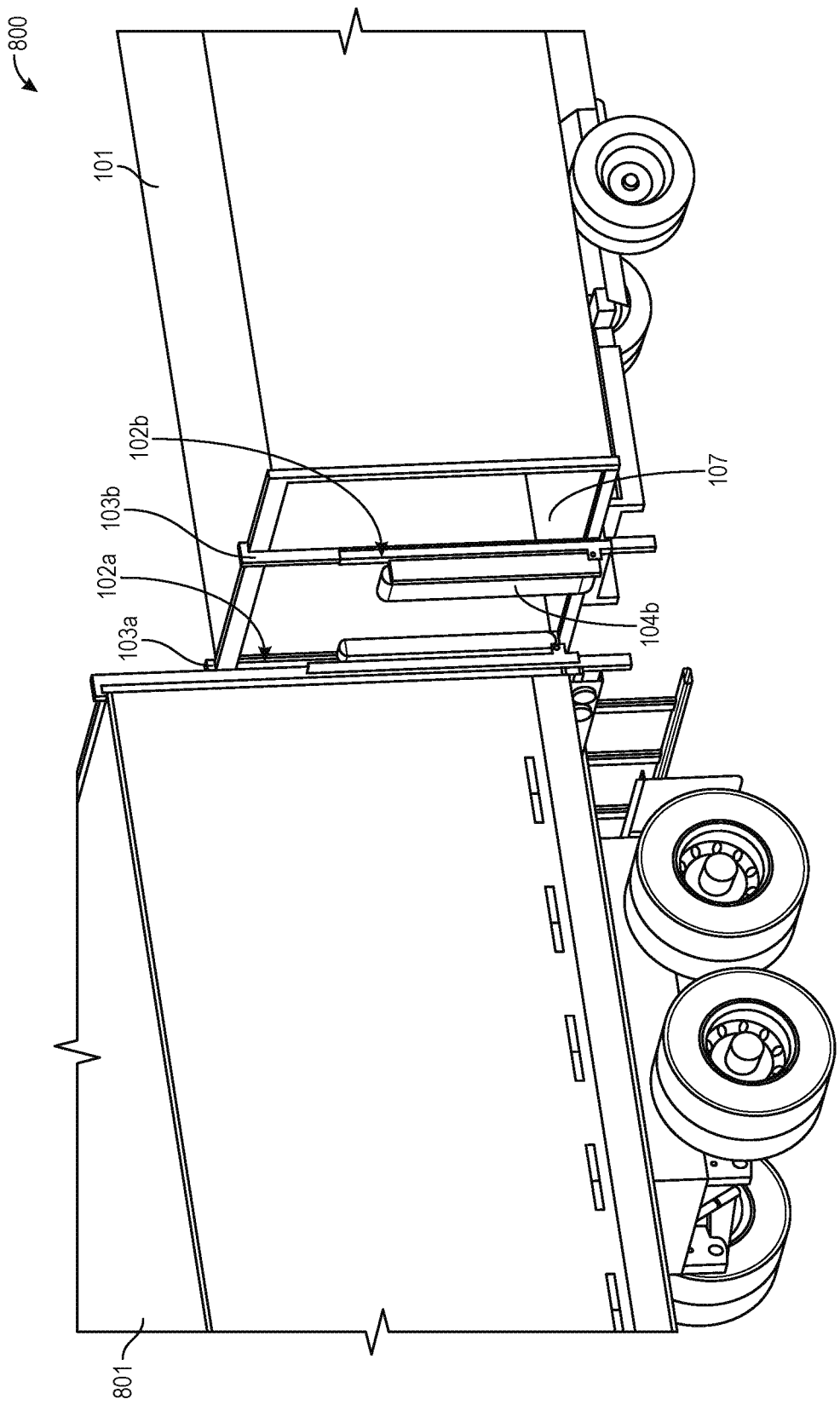
Figure 8K:
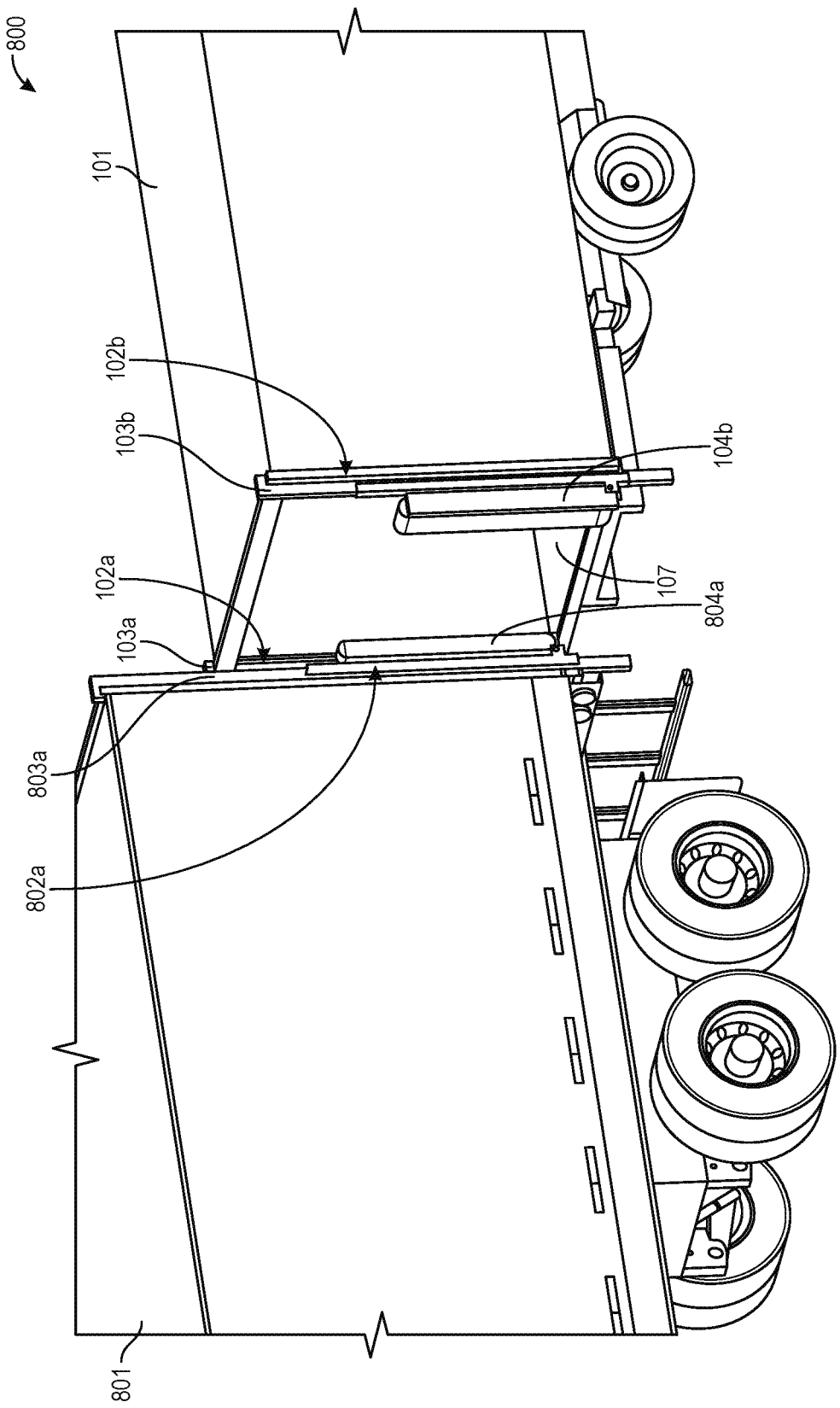

Referring next to FIG. 8I, the pallet can be conveyed into the trailer 107 of the commercial vehicle 101 (e.g., using the rollers 105 of the second portions 104 of the arms, using the carousel system 370 (not shown) within the trailer 107, and/or using the passive roller 240 (not shown) positioned between the second portions 104 and the carousel system 370). Alternatively, the second portions 104 of the arms can be lowed using the first portions 103 to place the pallet on the ground. As shown in FIG. 8J, the second portions 104 of the arms 102 can be pivoted toward the first portions 103 (e.g., until the second portions 104 are oriented generally parallel with the first portions 103) to retract or undeploy the second portions 104. As shown in FIG. 8K, one or more of the first portions 103 of the arms 102 can be moved laterally such that the arms 102 are aligned with the sides of the trailer 107 of the commercial vehicle 101 and do not obstruct the opening to the trailer 107. In some embodiments, the first portions 103 can be moved laterally before retracting the second portions 104 of the arms 102. In these and other embodiments, the first portions 103 can be positioned at other lateral locations along the opening to the trailer 107, such as at the middle of the opening to the trailer 107.

Although the arms 102 of the commercial vehicle 101 are used to convey the pallet out of the trailer 807 of the second commercial vehicle 801 and into the trailer 107 of the commercial vehicle 101 in FIGS. 8A-8K, the arms 802 of the second commercial vehicle 801 can be used in lieu of the arms 102 in other embodiments of the present technology. Additionally, or alternatively, a pallet can be transferred from within the trailer 107 of the commercial vehicle 101 to within the trailer 807 of the second commercial vehicle 801.

Variations of the embodiments illustrated in FIGS. 1-8K exist and are within the scope of the present technology. For example, cargo can be (a) transferred from a trailer to one or more commercial vehicles (e.g., trucks); (b) transferred between trailers, between trucks, and/or between trailers and trucks; (c) transferred from one or more commercial vehicles (e.g., trucks) to a trailer; and/or (d) repositioned within a commercial vehicle or within a trailer (e.g., to accommodate a change of delivery or pickup schedule, and/or an order in which cargo is loaded into or out of the commercial vehicle or trailer). As another example, the present technology includes methods for transferring cargo between more than two commercial vehicles, such as between three commercial vehicles that meet at a transfer location, swap cargo with one another, and then return to the locations from which they originally departed. Additionally, or alternatively, trailers and/or other commercial vehicles can serve as small warehouses (e.g., intermediary warehouses, temporary warehouses, etc.) that can be parked or positioned temporarily or permanently at almost any available location. In these and other embodiments, commercial vehicles of the present technology can be autonomous (e.g., capable of loading, unloading, transferring, transporting cargo, and/or performing other tasks described herein without or with limited human supervision and/or intervention), semi-autonomous, and/or human-driven or human-managed. Furthermore, a collection of trailers and/or commercial vehicles can form an interconnected network, and/or the commercial vehicles can be powered by dynamic, real-time routing.

Figure 9A:
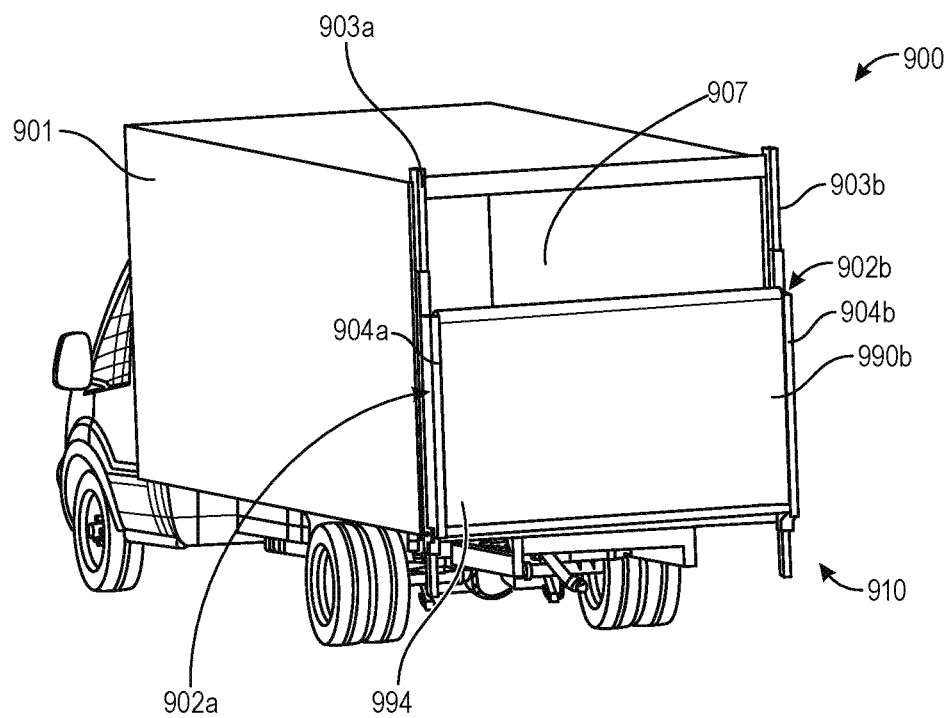
FIGS. 9A-9C illustrate another commercial vehicle loading and unloading system configured in accordance with various embodiments of the present technology.
Figure 9B:
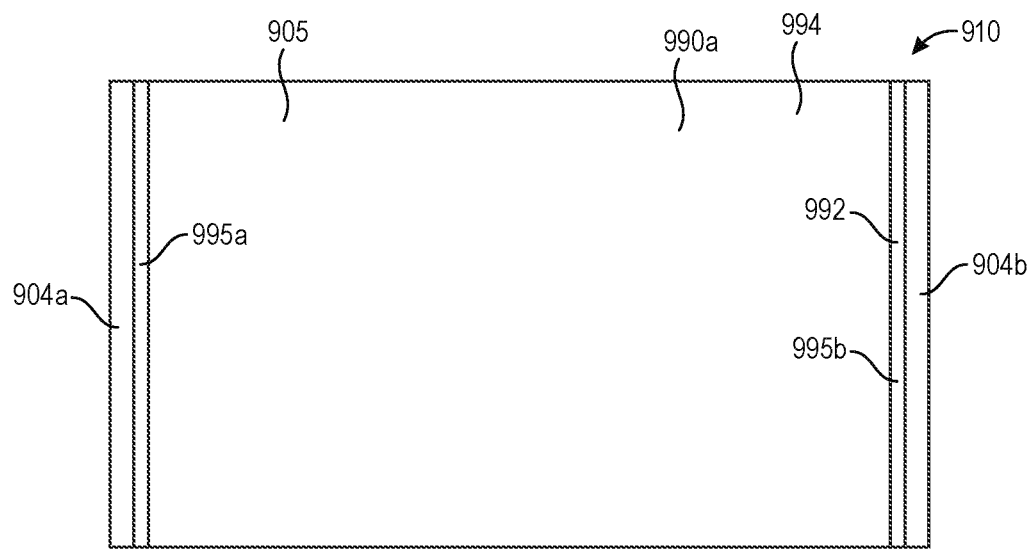
Figure 9C:
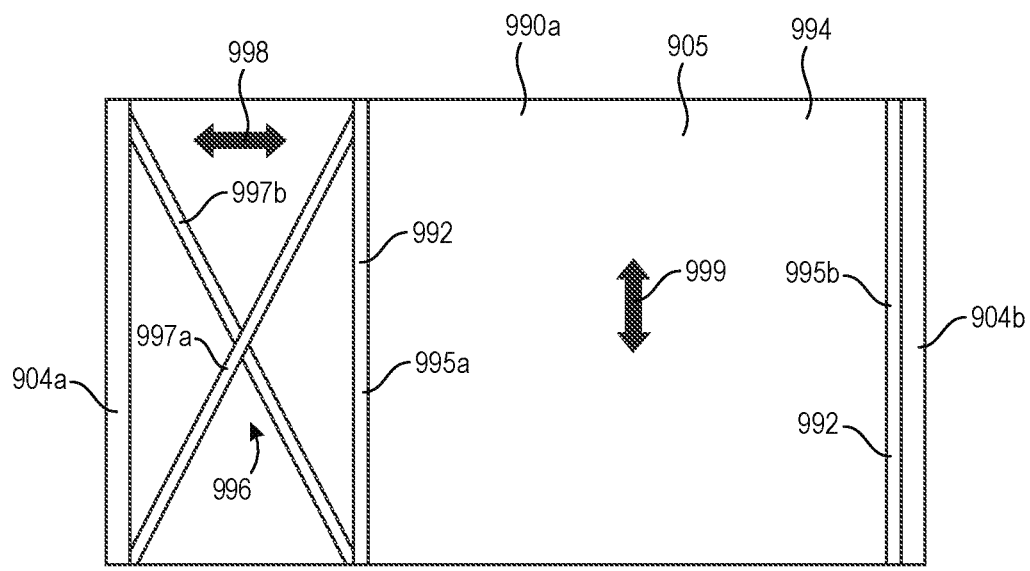

FIGS. 9A-9C illustrate another commercial vehicle loading and unloading system 900 ("the system 900") configured in accordance with various embodiments of the present technology, representing a variation of the embodiments illustrated in FIGS. 1-8K. As shown in FIG. 9A, the system 900 includes a commercial vehicle 901 having a trailer loading and unloading assembly 910 ("the assembly 910") mounted proximate an opening of a trailer 907 (e.g., bed, bay, etc.) of the commercial vehicle 901. The assembly 910 is similar to the assembly 110 of FIG. 1 in that the assembly 910 includes a plurality of mechanical arms 902 (identified individually as first mechanical arm 902a and second mechanical arm 902b in FIG. 9A) for loading and/or unloading a pallet (not shown) and/or other cargo into and/or out of the trailer 907 of the commercial vehicle 901. Each mechanical arm 902 includes a first portion 903 (shown as first portion 903a and first portion 903b) and a corresponding second portion 904 (shown as second portion 904a and second portion 904b) that is attached at one end to the respective first portion 903. Each of the first portions 903 are configured to move in a vertical direction to raise and/or lower the corresponding second portion 904 (e.g., via a telescoping or other structure that facilitates lowering or raising the second portions 904 by extending or retracting, respectively, components of the first portions 903). And each of the second portions 904 are configured to pivotably move or articulate away from the corresponding first portions 903 such that they are oriented generally perpendicular to the first portions 903 in an extended or deployed position (not shown). The second portions 904 are illustrated in a stowed, undeployed, or retracted position in FIG. 9A.

Unlike the assembly 110 of FIG. 1, however, the assembly 910 of FIG. 9A includes a liftgate 994 connecting the second portions 904 to one another. As the second portions 904 pivotably move or articulate away from the corresponding first portions 903 of the mechanical arms 902, the liftgate 994 similarly pivotably moves or articulates away from the opening of the trailer 907 of the commercial vehicle 901 such that it is oriented generally perpendicular to the first portions 903 of the mechanical arms 902 in an extended or deployed position (not shown). The liftgate 994 is illustrated in a stowed, undeployed, or retracted position in FIG. 9A. Thus, in contrast with the first portions 103 of the assembly 110 of FIG. 1, neither the first portions 903 nor the second portions 904 of the assembly 910 move laterally with respect to the opening of the trailer 907.

The liftgate 994 includes a top side or surface 990a (FIGS. 9B and 9C) opposite a bottom side or surface 990b (FIG. 9A). When the liftgate 994 is deployed, the top side 990a of the liftgate 994 can be positioned beneath a pallet or other cargo such that the liftgate 994 can be used (a) to lift and/or lower the pallet or other cargo in a vertical direction generally parallel to the first portions 903 of the mechanical arms 902 (e.g., as the first portions 903 of the mechanical arms 902 are extended or retracted in the vertical direction), and/or (b) to convey the pallet or other cargo in a direction toward or away from the front of the commercial vehicle 901 (e.g., to convey the pallet or other cargo into or out of the interior of the trailer 907).

Referring now to FIGS. 9B and 9C, at the top side 990a, the liftgate 994 includes pushing mechanisms 995 (identified individually as first pushing mechanism 995a and second pushing mechanism 995b in FIGS. 9B and 9C) and one or more rollers 905. As best shown in FIG. 9C, each of the pushing mechanisms 995 includes a pusher portion 992 and a scissor mechanism 996. The scissor mechanisms 996 each include a pair of crossing braces 997 (identified individually as first brace 997a and second brace 997b in FIG. 9C). Each scissor mechanism 996 is configured to extend and retract the respective pusher portion 992 in a direction away from and toward, respectively, the corresponding second portion 904 (e.g., in a direction generally parallel to arrow 998). Thus, in operation, a pallet or other cargo can be positioned on the top side 990a of the liftgate 994, and the pushing mechanisms 995 can be used to laterally move the pallet or other cargo in a direction generally parallel to the arrow 998 (e.g., to reposition the pallet of other cargo at a different location along to the opening of the trailer 907 of FIG. 9A) and/or to rotate the pallet or other cargo.

For example, the pusher portion 992 of one of the pushing mechanisms 995 can be extended away from the corresponding second portion 904 using the corresponding scissor mechanism 996 until the pusher portion 992 is placed in contact with a pallet or other cargo position on the top side 990a of the liftgate 994. At this point, the scissor mechanism 996 can continue to extend the pusher portion 992 away from the corresponding second portion 904, thereby (a) pushing the pallet or other cargo away from the corresponding second portion 904 in a direction generally parallel to the arrow 998 and/or (b) laterally repositioning the pallet or other cargo to another location along the opening of the trailer 907 (FIG. 9A). As another example, the pusher portion(s) 992 of one or both of the pushing mechanism(s) 995 can be extended away from the corresponding second portion(s) 904 until the pusher portions 992 of both pushing mechanisms 995 are in contact with the pallet or other cargo. At this point, the scissor mechanism(s) 996 of the pushing mechanism(s) 995 can continue to extend the pusher portion(s) 992 away from the corresponding second portion (s) 904, thereby exerting a clamping or squeezing force on the pallet or other cargo. Assuming there is axial misalignment between the pallet or other cargo and the commercial vehicle 901, the clamping force is expected to rotate or shift the pallet or other cargo into alignment with the longitudinal axis of the commercial vehicle 901. This can ensure that the pallet or other cargo is straight when loaded into (and eventually unloaded out of) the trailer 907. As part of the process of exerting a clamping force on the pallet or other cargo, the system 900 can monitor one or more sensors to determine when the pallet or other cargo is aligned with the longitudinal axis of the commercial vehicle 901, as discussed in greater detail above. At this point, lateral movement of the pusher portion(s) 992 of the pushing mechanism(s) 995 toward the pallet or other cargo can be stopped.

Although shown with two pushing mechanisms 995 in FIGS. 9B and 9C, the first pushing mechanism 995a or the second pushing mechanism 995b can be omitted in some embodiments of the present technology. In these embodiments, the liftgate 994 can include a face or lip positioned at or near whichever of the second portions 904 lacks a corresponding pushing mechanism 995 such that a pallet or other cargo can be pushed against the face or lip (e.g., using the pushing mechanism 995 corresponding to the other of the second portions 204, and/or to exert a clamping force on the pallet or other cargo to rotate the pallet or other cargo into alignment with the commercial vehicle 901).

As discussed above, the liftgate 994 can include one or more rollers 905 (e.g., treads, tracks, etc.) at the top side 990a of the liftgate 994. In some embodiments, at least a subset of the rollers 905 can be used to convey a pallet or other cargo in a direction toward or away from the front of the commercial vehicle 901 (e.g., to convey the pallet or other cargo into or out of the interior of the trailer 907) in a direction generally parallel to arrow 999 (FIG. 9C). In these and other embodiments, at least a subset of the rollers 905 can be used to laterally shift a pallet or other cargo in a direction generally parallel to the arrow 998 (FIG. 9C). In these and still other embodiments, the liftgate 994 can include (i) a first set of rollers 905 that can be used to move a pallet or other cargo in a direction generally parallel to the arrow 999 and (ii) a second set of rollers 905 that can be used to move a pallet or other cargo in a direction generally parallel to the arrow 998. The first set of rollers 905 and the second set of rollers 905 can be operated in a manner similar to how the rollers 355 and the internal chains 351 and 352 of FIGS. 3A-3E are operated (e.g., the first set of rollers 905 and/or the second set of rollers 905 can be raised or lowered to engage a pallet or other cargo and move the pallet or other cargo in a desired direction).

All or a subset of the rollers 905 at the top side 990a of the liftgate 994 can be passive rollers. Additionally, or alternatively, all or a subset of the rollers 905 at the top side 990a of the liftgate 994 can be active rollers. In some embodiments, the rollers 905 can be generally similar to the rollers 105 discussed in detail above with reference to FIGS. 1-8K.

The system 900 can otherwise be generally similar to the system 100 discussed in detail above with reference to FIGS. 1-8K. For example, the system 900 can include chains, rollers, and/or other structures (e.g., a carousel assembly or system) within the interior of the trailer 907 of the commercial vehicle 901 that are configured to (a) convey a pallet or other cargo into and/or out of the trailer 907 and/or (b) reposition a pallet or other cargo within the interior of the trailer 907. As another example, the system 900 can include a door (not shown) at the opening of the trailer 907 to close off access to the interior of the trailer 907. The door can be manually operated and/or opened or closed via use of a powered opener.

Although the steps of the methods described herein are discussed and/or illustrated in a particular order, the methods described herein are not so limited. In other embodiments, the methods described herein can be performed in different orders. In these and other embodiments, any of the steps of the methods described herein can be performed before, during, and/or after any of the other steps of the methods described herein. Furthermore, a person skilled in the art will readily recognize that the methods described herein can be altered and still remain within these and other embodiments of the present technology. For example, one or more steps of the methods described herein can be omitted and/or repeated in some embodiments.

Although not shown so as to avoid unnecessarily obscuring the description of the embodiments of the technology, any of the forgoing systems and methods described above can include and/or be performed by a computing device configured to direct and/or arrange components of the systems and/or to receive, arrange, store, analyze, and/or otherwise process data received, for example, from the machine and/or other components of the systems. As such, such a computing device includes the necessary hardware and corresponding computer-executable instructions to perform these tasks. More specifically, a computing device configured in accordance with an embodiment of the present technology can include a processor, a storage device, input/output device, one or more sensors, and/or any other suitable subsystems and/or components (e.g., displays, speakers, communication modules, etc.). The storage device can include a set of circuits or a network of storage components configured to retain information and provide access to the retained information. For example, the storage device can include volatile and/or non-volatile memory. As a more specific example, the storage device can include random access memory (RAM), magnetic disks or tapes, and/or flash memory.

The computing device can also include (e.g., non-transitory) computer readable media (e.g., the storage device, disk drives, and/or other storage media) including computer-executable instructions stored thereon that, when executed by the processor and/or computing device, cause the systems to perform one or more of the methods described herein. Moreover, the processor can be configured for performing or otherwise controlling steps, calculations, analysis, and any other functions associated with the methods described herein.

In some embodiments, the storage device can store one or more databases used to store data collected by the systems as well as data used to direct and/or adjust components of the systems. In one embodiment, for example, a database is an HTML file designed by the assignee of the present disclosure. In other embodiments, however, data is stored in other types of databases or data files.

One of ordinary skill in the art will understand that various components of the systems (e.g., the computing device) can be further divided into subcomponents, or that various components and functions of the systems may be combined and integrated. In addition, these components can communicate via wired and/or wireless communication, as well as by information contained in the storage media.

C. Examples

Several aspects of the present technology are set forth in the following examples. Although several aspects of the present technology are set forth in examples directed to systems and methods, these aspects of the present technology can similarly be set forth in examples directed to methods and systems, respectively, in other embodiments. Additionally, these aspects of the present technology may be set forth in examples directed to devices and/or (e.g., non-transitory) computer-readable media in other embodiments.

1. A cargo loading and unloading assembly, comprising:
   a first mechanical arm mountable to a first side of an opening of a truck or trailer; and
   a second mechanical arm mountable to a second side of the opening of the truck or trailer, wherein the second side is opposite to the first side;
   wherein the first and second mechanical arms each include (a) a first portion and (b) a second portion pivotally coupled to the first portion, and
   wherein—
      the first portions of the first and second mechanical arms are configured to (i) vertically raise and lower the second portions of the first and second mechanical arms and (ii) move the second portions laterally along the opening of the truck or trailer, and
      the second portions of the first and second mechanical arms include rollers and are configured to (i) support cargo on the rollers as the first and second mechanical arms are used to hold the cargo off the ground and (ii) selectively convey the cargo at least partially into or at least partially out of the truck or trailer via the rollers.

2. The assembly of example 1 wherein each of the second portions is pivotally coupled to the corresponding first portion at a base region of the second portion.

3. The assembly of example 2 wherein each of the first and second mechanical arms is configured to pivot the corresponding second portion away from the corresponding first portion at least until the corresponding second portion is oriented generally perpendicular to the corresponding first portion.

4. The assembly of any of examples 1-3, further comprising mounting brackets configured to couple the first and second mechanical arms to a frame of the truck or trailer.

5. The assembly of any of examples 1-4, further comprising a mounting bracket configured to couple the first and second mechanical arms to a top portion of the truck or trailer at or proximate the opening of the truck or trailer.

6. The assembly of any of examples 1-5 further comprising linear roller bearings and corresponding guides, and wherein each of the first portions is configured to move laterally along the opening of the truck or trailer using corresponding ones of the linear roller bearings and the corresponding guides.

7. The assembly of any of examples 1-6 wherein each of the mechanical arms includes a hydraulically, electrically, or pneumatically driven rack and pinion system configured to move a corresponding first portion laterally along the opening of the truck or trailer.

8. The assembly of any of examples 1-7 wherein each of the first and second mechanical arms are configured to move laterally in a first direction along the opening of the truck or trailer while the other of the first and second mechanical arms remains stationary or moves laterally in a second direction along the opening of the truck or trailer opposite the first direction.

9. The assembly of any of examples 1-8 wherein each of the first and second mechanical arms is configured to move laterally along the opening of the truck or trailer in a first direction, at a first speed, and at a first time while the other of the first and second mechanical arms moves laterally along the opening of the truck or trailer in the first direction, at the first speed, and at the first time.
10. The assembly of any of examples 1-9 wherein each of the first portions includes a hydraulic cylinder or an electric cylinder configured to raise and lower the corresponding second portion.
11. The assembly of any of examples 1-10 wherein each of the second portions includes:
a body portion; and
a lip portion coupled to the body portion and oriented generally perpendicular to the body portion,
wherein the lip portion includes the rollers, and
wherein the lip portion is configured to be positioned beneath the cargo and to support the cargo as the first and second mechanical arms are used to hold the cargo off the ground.
12. The assembly of example 11 wherein the rollers are passive, freely spinning rollers.
13. The assembly of example 11 or example 12 wherein the body portion of each of the second portions includes a chain and chain pushers, and wherein the chain pushers are configured to retain the cargo on the rollers.
14. The assembly of example 13 further comprising pusher motors configured to actuate the chain such that the chain pushers push the cargo toward or away from the truck or trailer.
15. The assembly of example 11, further comprising actuators configured to drive the rollers of corresponding second portions.
16. The assembly of any of examples 1-15, further comprising a passive, freely spinning roller positioned between the second portions and the truck or trailer.
17. The assembly of any of examples 1-16, further comprising a hydraulic or electric ram configured to push the cargo at least partially out of the truck or trailer and onto the second portions.
18. The assembly of any of examples 1-17, further comprising (a) a door configured to limit access to an interior of the truck or trailer at least in a closed position, and (b) a powered opener configured to move the door between the closed position and an open position.
19. A cargo repositioning system for use within a truck or trailer, the cargo repositioning system comprising:
a plurality of internal chains and a plurality of sets of rollers arranged in a plurality of columns,
wherein internal chains of the plurality of internal chains are configured to support cargo loaded into the truck or trailer and to shift the cargo along a longitudinal axis of the truck or trailer, and
wherein the sets of rollers are configured to selectively move the cargo generally perpendicular to the longitudinal axis of the truck or trailer and from one column of the plurality of columns to another column of the plurality of columns.
20. The cargo repositioning system of example 19 wherein each column of the plurality of columns includes an internal chain of the plurality of internal chains at or proximate edges of the columns.
21. The cargo repositioning system of example 20 wherein at least one column of the plurality of columns includes another internal chain of the plurality of internal chains positioned between the internal chains positioned at or proximate edges of the columns.

22. The cargo repositioning system of any of examples 19-21 wherein internal chains of the plurality of internal chains are freely moving, driven, or both freely moving and driven.
23. The cargo repositioning system of any of examples 19-22 wherein at least a portion of some of the internal chains in the plurality of internal chains are configured to extend toward an opening of the truck or trailer.
24. The cargo repositioning system of any of examples 19-23 wherein, to move the cargo generally perpendicular to the longitudinal axis of the truck or trailer, the sets of rollers are configured to:
move toward a top of the truck or trailer to lift the cargo off of internal chains of the one column;
roll to move the cargo generally perpendicular to the longitudinal axis of the truck or trailer and to the other column; and
move toward a bottom of the truck or trailer to lower the cargo onto internal chains of the other column.
25 The cargo repositioning system of any of examples 19-24, further comprising (a) a door configured to limit access to an interior of the truck or trailer at least in a closed position, and (b) a powered opener configured to move the door between the closed position and an open position.
26. A cargo loading and unloading system, comprising:
the assembly of any of examples 1-18; and/or
the cargo repositioning system of any of examples 19-25.
27. A method of loading cargo into a truck or trailer using the cargo loading and unloading system of example 26, the method comprising:
lowering the second portions of the first and second mechanical arms;
laterally moving the first and second mechanical arms toward the cargo;
positioning the second portions beneath the cargo;
lifting the second portions such that the cargo is supported in the air by the second portion and such that the cargo is lifted to a height of an opening of the truck or trailer; and
conveying the cargo at least partially into the truck or trailer using rollers on the second portions.
28. The method of example 27, further comprising deploying the second portions such that the second portions are positioned generally perpendicular to the corresponding first portions of the first and second mechanical arms.
29. The method of example 27 or example 28 wherein laterally moving the first and second mechanical arms toward the cargo includes applying a clamping force to the cargo to align the cargo with a longitudinal axis of the truck or trailer.
30. The method of any of examples 27-29, further comprising laterally shifting the cargo with respect to the opening of the truck or trailer while the cargo is supported off the ground by the second portion.
31. The method of any of examples 27-30, further comprising opening a door of the cargo loading and unloading system using a powered opener of the cargo loading and unloading system, to provide access to an interior of the truck or trailer.
32. A method of repositioning cargo within a truck or trailer, the method comprising:
identifying a location of cargo of interest within the truck or trailer;
shifting a plurality of pieces of cargo within the truck or trailer until the cargo of interest is positioned at or proximate an opening of the truck or trailer, wherein shifting the plurality of pieces of cargo within the truck or trailer includes conveying a first piece of cargo along a longitudinal axis of the truck or trailer using internal chains built into the truck or trailer and/or transferring a second piece of cargo across pallet columns of the truck or trailer using rollers built into the truck or trailer; and conveying the cargo of interest out of the truck or trailer.

33. The method of example 32 wherein identifying the location of the cargo of interest includes identifying the location using a powered RFID tag affixed to the cargo of interest or computer vision.

34. The method of example 32 or example 33, further comprising:

conveying, using the internal chains, a third piece of cargo out of the truck or trailer and onto mechanical arms coupled to the truck or trailer at the opening of the truck or trailer, wherein the third piece of cargo is conveyed out of the truck or trailer before shifting the plurality of pieces of cargo; and conveying the third piece of cargo into the truck or trailer after the cargo of interest is positioned at or proximate the opening of the truck or trailer.

35. The method of any of examples 32-34 wherein transferring the second piece of cargo across the pallet columns of the truck or trailer includes lifting the second piece of cargo off of the internal chains using the rollers, moving the second piece of cargo generally perpendicular to the longitudinal axis of the truck or trailer and to another pallet column using the rollers, and retracting the rollers to lower the second piece of cargo onto the internal chains.

36. The method of any of examples 32-35, further comprising, before conveying the cargo of interest out of the truck or trailer, opening a door of the truck or trailer using a powered opener such that the cargo of interest can pass from within the truck or trailer to outside of the truck or trailer.

37. A method of unloading cargo from a truck or trailer using the cargo loading and unloading system of example 26, the method comprising:

aligning, at an opening of the truck or trailer, the second portions of the first and second mechanical arms with (a) a height of the cargo within the truck or trailer and (b) a width of the cargo;

conveying the cargo toward the opening of the truck or trailer using internal chains supporting the cargo within the truck or trailer; and conveying the cargo onto the second portions from within the truck or trailer.

38. The method of example 37 wherein conveying the cargo toward the opening or conveying the cargo onto the second portions includes extending the internal chains toward the second portions.

39. The method of example 37 or example 38 wherein conveying the cargo onto the second portions includes conveying the cargo onto the second portions (a) using a passive roller positioned between the internal chains and the second portions, (b) a hydraulic or electric ram, or (c) both.

40. The method of any of examples 37-39 wherein conveying the cargo onto the second portions includes driving rollers on the second portions to pull the cargo at least part of the way out of the truck or trailer.

41. The method of any of examples 37-39 wherein conveying the cargo toward the opening of the truck or trailer or conveying the cargo onto the second portions includes any of the methods of examples 32-36.

42. The method of any of examples 37-41, further comprising (a) lowering the second portions and positioning the cargo at a deployment site on or proximate the ground, or (b) transferring the cargo into another truck or trailer without first positioning the cargo at the deployment site.

43. A method of transferring cargo between two trucks, two trailers, or a truck and a trailer, the method comprising:

transferring a first piece of cargo from within a first truck or trailer onto one of (a) second portions of mechanical arms mounted to the first truck or trailer at or proximate an opening of the first truck or trailer or (b) second portions of mechanical arms mounted to a second truck or trailer at or proximate an opening of the second truck or trailer;

transferring a second piece of cargo from within the second truck or trailer onto the other of (a) the second portions of the mechanical arms mounted to the first truck or trailer at or proximate the opening of the first truck or trailer or (b) the second portions of the mechanical arms mounted to the second truck or trailer at or proximate the opening of the second truck or trailer;

conveying the first piece of cargo into the second truck or trailer via the opening of the second truck or trailer; and conveying the second piece of cargo into the first truck or trailer via the opening of the first truck or trailer.

44. The method of example 43, further comprising aligning an opening of the first truck or trailer with an opening of the second truck or trailer.

45. The method of example 43 or example 44, further comprising:

opening a door of the first truck using a powered opener to provide access to an interior of the first truck; or opening a door of the second truck using a powered opener to provide access to an interior of the second truck.

46. A liftgate for a cargo loading and unloading assembly, the liftgate comprising:

a top side and a bottom side opposite the top side, the liftgate configured to support cargo on the top side and to pivotably connect to mechanical arms of the cargo loading and unloading assembly;

a first lateral dimension and a second lateral dimension oriented generally perpendicular to the first lateral dimension;

a pushing mechanism at the top side of the liftgate, having a pushing portion aligned generally parallel with the second lateral dimension, and configured push against the cargo in a direction generally parallel with the first lateral dimension at least when the cargo is positioned on the top side of the liftgate.

47. The liftgate of example 46, wherein the pushing mechanism further includes a scissor mechanism configured to move the pushing portion in one or more directions generally parallel with the first lateral dimension.

48. The liftgate of example 46 or example 47 wherein:

the pushing mechanism is a first pushing mechanism and is coupled to a first side of the liftgate;

the pushing portion is a first pushing portion;

the direction is a first direction;

the liftgate further comprises a second pushing mechanism at the top side of the liftgate and coupled to a second side of the liftgate opposite the first side; and
the second pushing mechanism has a second pushing portion aligned generally parallel with the second lateral dimension, and is configured to push against the cargo in a second direction generally parallel with the first lateral dimension and generally opposite the first direction.

49. The liftgate of any of examples 46-48, further comprising one or more passive rollers at the top side of the liftgate and configured to facilitate moving the cargo (a) in at least one direction generally parallel to the second lateral dimension and/or (b) in at least one direction generally parallel to the first lateral dimension.

50. The liftgate of any of examples 46-49, further comprising one or more active rollers at the top side of the liftgate and configured to facilitate moving the cargo (a) in at least one direction generally parallel to the second lateral dimension and/or (b) in at least one direction generally parallel to the first lateral dimension.

D. Conclusion

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, although steps are presented in a given order above, alternative embodiments may perform steps in a different order. Furthermore, the various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same features and/or additional types of other features are not precluded. Moreover, as used herein, the phrases "based on," "depends on," "as a result of," and "in response to" shall not be construed as a reference to a closed set of conditions. For example, an exemplary step that is described as "based on condition A" may be based on both condition A and condition B without departing from the scope of the present disclosure. In other words, as used herein, the phrase "based on" shall be construed in the same manner as the phrase "based at least in part on" or the phrase "based at least partially on."

Spatially relative terms, such as "beneath," "below," "over," "under," "above," "upper," "top," "bottom," "left," "right," "center," "middle," "forward," "away," and the like, are used herein for ease of description to describe one element or feature's relationship relative to another element(s) or feature(s) as illustrated in the figures. It will be understood that the spatially relative terms are intended to encompass different orientations of the device or system in use or operation in addition to the orientation depicted in the figures. For example, if a device or system in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein are interpreted accordingly. In addition, it will also be understood that when an element is referred to as being "between" two other elements, it can be the only element between the two other elements, or one or more intervening elements may also be present.

From the foregoing, it will also be appreciated that various modifications may be made without deviating from the disclosure or the technology. For example, one of ordinary skill in the art will understand that various components of the technology can be further divided into subcomponents, or that various components and functions of the technology may be combined and integrated. In addition, certain aspects of the technology described in the context of particular embodiments may also be combined or eliminated in other embodiments. Furthermore, although advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

What is claimed is:

1. A cargo loading and unloading assembly, comprising:
a first mechanical arm mountable to a first side of an opening of a truck or trailer; and
a second mechanical arm mountable to a second side of the opening of the truck or trailer, wherein the second side is opposite to the first side;
wherein the first and second mechanical arms each include (a) a first portion and (b) a second portion pivotally coupled to the first portion, and
wherein—
the first portions of the first and second mechanical arms are configured to (i) vertically raise and lower the second portions of the first and second mechanical arms and (ii) move the second portions laterally along the opening of the truck or trailer,
the second portions of the first and second mechanical arms each include (a) a body portion and (b) a lip portion coupled to the body portion, oriented generally perpendicular to the body portion, including rollers, and configured to be positioned beneath an item of cargo and to support the item of cargo on the rollers as the first and second mechanical arms are jointly used to hold the item of cargo off the ground, the body portion of the second portion of the first mechanical arm includes a chain or a chain pusher, and the second portion of the first mechanical arm is configured to on the rollers as the first and second mechanical arms are used to hold the convey the item of cargo at least partially into or at least partially out of the truck or trailer via the rollers when the chain or the chain pusher is selectively actuated.

2. The assembly of claim 1 wherein each of the second portions is pivotally coupled to the corresponding first portion at a base region of the second portion.

3. The assembly of claim 2 wherein each of the first and second mechanical arms is configured to pivot the corresponding second portion away from the corresponding first portion at least until the corresponding second portion is oriented generally perpendicular to the corresponding first portion.

4. The assembly of claim 2 wherein each of the first and second mechanical arms is configured to pivot the corresponding second portion between (a) a first state in which the corresponding second portion is oriented generally parallel to the corresponding first portion and (b) a second state in which the second portion is oriented generally perpendicular to the corresponding first portion.

5. The assembly of claim 1, further comprising mounting brackets configured to couple the first and second mechanical arms to a frame of the truck or trailer.

6. The assembly of claim 1, further comprising a mounting bracket configured to couple the first and second mechanical arms to a top portion of the truck or trailer at or proximate the opening of the truck or trailer.

7. The assembly of claim 1 further comprising linear roller bearings and corresponding guides, and wherein each of the first portions is configured to move laterally along the opening of the truck or trailer using corresponding ones of the linear roller bearings and the corresponding guides.

8. The assembly of claim 1 wherein each of the mechanical arms includes a hydraulically, electrically, or pneumatically driven rack and pinion system configured to move a corresponding first portion laterally along the opening of the truck or trailer.

9. The assembly of claim 1 wherein one of the first and second mechanical arms is configured to move laterally in a first direction along the opening of the truck or trailer while the other of the first and second mechanical arms remains stationary or moves laterally in a second direction along the opening of the truck or trailer opposite the first direction.

10. The assembly of claim 1 wherein one of the first and second mechanical arms is configured to move laterally along the opening of the truck or trailer in a first direction, at a first speed, and at a first time while the other of the first and second mechanical arms moves laterally along the opening of the truck or trailer in the first direction, at the first speed, and at the first time.

11. The assembly of claim 1 wherein each of the first portions includes a hydraulic cylinder or an electric cylinder configured to raise and lower the corresponding second portion.

12. The assembly of claim 1 wherein the rollers are passive, freely spinning rollers.

13. The assembly of claim 1 wherein the body portion of the second portion of the first mechanical arm includes the chain pusher, and wherein the chain pusher is configured to push the item of cargo toward or away from the truck or trailer when the chain pusher is selectively actuated.

14. The assembly of claim 1, wherein the rollers are driven rollers that are configured to shift the item of cargo when actuated.

15. The assembly of claim 1, further comprising a passive, freely spinning roller positioned between the second portions and the truck or trailer.

16. The assembly of claim 1 wherein the body portion of the second portion of the first mechanical arm includes the chain pusher, and wherein the chain pusher is configured to retain the item of cargo on the rollers.

17. The assembly of claim 1 wherein:
the chain or the chain pusher of the body portion of the second portion of the first mechanical arm is a first chain or a first chain pusher, respectively; and
the body portion of the second portion of the second mechanical arm includes a second chain or a second chain pusher.

18. The assembly of claim 17 wherein:
the chain or the chain pusher of the body portion of the second portion of the first mechanical arm is a first chain or a first chain pusher, respectively;
the body portion of the second portion of the first mechanical arm includes both the first chain and the first chain pusher; and
the body portion of the second portion of the second mechanical arm includes a second chain and a second chain pusher.

19. The assembly of claim 1 wherein the body portion of the second portion of the first mechanical arm includes both the chain and the chain pusher.

20. The assembly of claim 1, further comprising:
first mounting brackets configured to couple the first and second mechanical arms to a chassis of the truck or trailer; and
a second mounting bracket configured to couple the first and second mechanical arms to a top portion of the truck or trailer at or proximate the opening of the truck or trailer.

* * * * *